(12) United States Patent
Fujieda et al.

(10) Patent No.: US 11,777,356 B2
(45) Date of Patent: Oct. 3, 2023

(54) ROTATING ELECTRIC MACHINE

(71) Applicant: DENSO CORPORATION, Kariya (JP)

(72) Inventors: Masahito Fujieda, Nisshin (JP); Kenichirou Takagi, Nisshin (JP); Toshiaki Uga, Kariya (JP); Yoshihisa Shuji, Kariya (JP); Hiroshi Endo, Kariya (JP)

(73) Assignee: DENSO CORPORATION, Kariya (JP)

(*) Notice: Subject to any disclaimer, the term of this patent is extended or adjusted under 35 U.S.C. 154(b) by 284 days.

(21) Appl. No.: 17/347,344

(22) Filed: Jun. 14, 2021

(65) Prior Publication Data
US 2021/0391765 A1 Dec. 16, 2021

(30) Foreign Application Priority Data
Jun. 12, 2020 (JP) ................. 2020-102710

(51) Int. Cl.
H02K 3/28 (2006.01)
H02K 1/16 (2006.01)
H02K 3/12 (2006.01)
H02K 3/48 (2006.01)

(52) U.S. Cl.
CPC ............ H02K 3/28 (2013.01); H02K 1/165 (2013.01); H02K 3/12 (2013.01); H02K 3/48 (2013.01); H02K 2213/03 (2013.01)

(58) Field of Classification Search
CPC ......... H02K 3/12; H02K 3/28; H02K 2213/03
See application file for complete search history.

(56) References Cited

U.S. PATENT DOCUMENTS 8,916,999 B2 * 12/2014 Imai ............... H02K 1/2746
  310/179
10,050,484 B2 8/2018 Tamura
2010/0181851 A1 7/2010 Shinkawa
2014/0125187 A1 5/2014 Suzuki et al.
2020/0328646 A1 10/2020 Miyawaki

FOREIGN PATENT DOCUMENTS

JP 2008-104238 A 5/2008
JP 2012-016195 A 1/2012
JP 2013-081356 A 5/2013
JP 2014-217136 A 11/2014

* cited by examiner

Primary Examiner — Ramon M Barrera
(74) Attorney, Agent, or Firm — Oliff PLC

(57) ABSTRACT

A rotating electric machine includes a stator and a rotor. The stator includes a stator core that has a plurality of slots that are arranged in a circumferential direction and a stator winding that has a plurality of phase coils that are wound in the slots. The rotor is arranged so as to oppose the stator in a radial direction and has a plurality of magnetic poles in the circumferential direction. In the rotating electric machine, each of the phase coils has a plurality of series-connection coil groups that each includes n unit coils that are arranged to be wound in the circumferential direction. In each of the series-connection coil groups, a first end thereof is connected to a phase terminal for a respective phase and a second end is connected to a neutral point, and the series-connection coil groups are connected in parallel.

17 Claims, 34 Drawing Sheets

ROTATING ELECTRIC MACHINE

CROSS-REFERENCE TO RELATED APPLICATIONS

This application is based on and claims the benefit of priority from Japanese Patent Application No. 2020-102710, filed on Jun. 12, 2020. The entire disclosure of the above application is incorporated herein by reference.

BACKGROUND

Technical Field

The present invention relates to a rotating electric machine.

Related Art

A known rotating electric machine includes a stator core that has a plurality of slots in a circumferential direction and a stator winding that is wound in the slots. When a square-wave voltage is applied, a resonance phenomenon occurs in the stator winding as a result of high-frequency components, and the voltage is amplified.

SUMMARY

One aspect of the present disclosure provides a rotating electric machine that includes a stator and a rotor. The stator includes a stator core that has a plurality of slots that are arranged in a circumferential direction and a stator winding that has a plurality of phase coils that are wound in the slots. The rotor is arranged so as to oppose the stator in a radial direction and has a plurality of magnetic poles in the circumferential direction. In the rotating electric machine, each of the phase coils has a plurality of series-connection coil groups that each includes n unit coils that are arranged to be wound in the circumferential direction. In each of the series-connection coil groups, a first end thereof is connected to a phase terminal for a respective phase and the other end is connected to a neutral point, and the series-connection coil groups are connected in parallel.

BRIEF DESCRIPTION OF THE DRAWINGS

In the accompanying drawings:

FIGS. 15A and 15B are diagrams of slot housing positions of unit coils;

FIGS. 21A and 21B are diagrams of the slot housing positions of the unit coils;

FIG. 33 is a diagram of the slot housing positions of the unit coils;

DESCRIPTION OF THE EMBODIMENTS

Figure 1:
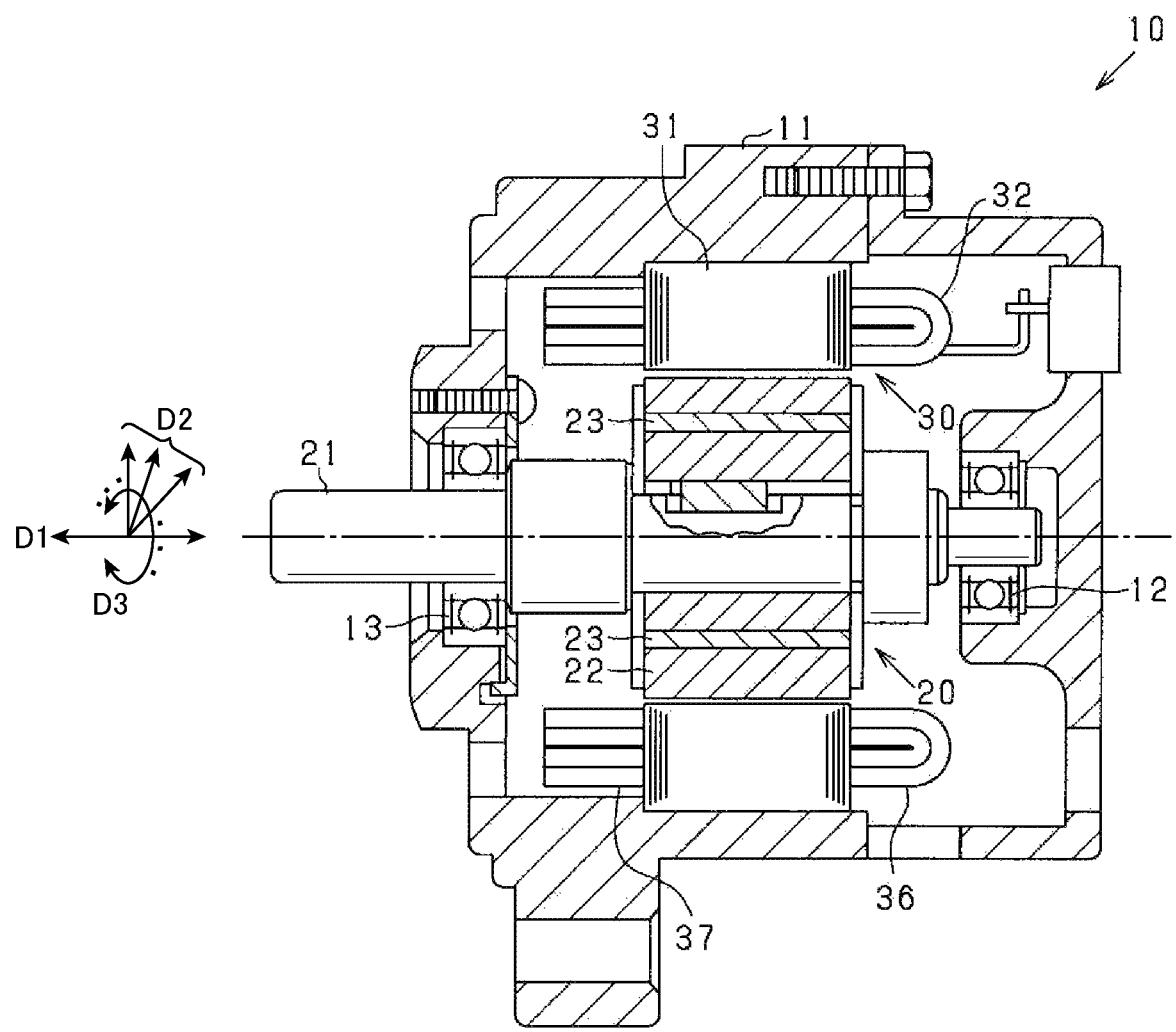
FIG. 1 is a cross-sectional view of an overall structure of a rotating electric machine.

Conventionally, a rotating electric machine that includes a stator core that has a plurality of slots in a circumferential direction and a stator winding that is wound in the slots is known. The following state is known to occur in a rotating electric machine such as this. That is, when a square-wave voltage is applied, a resonance phenomenon occurs in the stator winding as a result of high-frequency components, and this voltage is amplified (refer to JP-A-2013-081356).

When a maximum interphase voltage increases as a result of voltage amplification, shorting of a current may occur.

Therefore, insulation performance between phases is required to be improved. However, to improve insulation performance between phases, an insulating film may be made thicker or the like. As a result, increase in interphase distance becomes an issue. That is, decrease in space factor (density) of the winding, increase in size, or the like becomes an issue.

Here, in the rotating electric machine in JP-A-2013-081356, in a stator winding that is formed by wave winding, when a phase winding of the same phase is divided from a first end to a second end into four windings, and the divided windings are a first partial winding, a second partial winding, a third partial winding, and a fourth partial winding, in order from the the first end, the first partial winding and the fourth partial winding are housed in differing slots of the same phase. As a result, magnetic coupling between the first partial winding and the fourth partial winding is weakened. Mutual inductance can be made close to zero, and resonance can be suppressed. Consequently, the insulation performance that is required can be reduced and the interphase distance can be shortened.

Here, in addition to the stator winding that has the wave winding structure, a stator winding that has a lap winding structure is known. The stator winding that has the lap winding structure is configured to have a plurality of unit coils that are formed by lap winding. A phase coil for a respective phase is configured such that the plurality of unit coils are connected in series. In this case, in the configuration in which the plurality of unit coils are connected in series, the following state can be considered. That is, for example, resonance currents that are in opposite directions may flow through a unit coil on a phase terminal side and a unit coil on a neutral point side of each phase. A surge voltage may be generated as a result. Furthermore, decrease in insulation performance as a result of the surge voltage becomes a concern.

It is thus desired to provide a rotating electric machine that is capable of suitably actualizing improvement in insulation performance.

A plurality of aspects disclosed in this specification employ technical measures that differ from one another to achieve respective objects. Objects, features, and effects disclosed in this specification will be further clarified with reference to detailed descriptions that follow and accompanying drawings.

A first aspect provides a rotating electric machine that includes: a stator that includes a stator core that has a plurality of slots that are arranged in a circumferential direction and a stator winding that has a plurality of phase coils that are wound in the slots; and a rotor that is arranged so as to oppose the stator in a radial direction and has a plurality of magnetic poles in the circumferential direction.

In this rotating electric machine, each of the phase coils has a plurality of series-connection coil groups that each includes n unit coils that are arranged to be wound in the circumferential direction. In each of the series-connection coil groups, a first end thereof is connected to a phase terminal for a respective phase and a second end is connected to a neutral point, and the series-connection coil groups are connected in parallel.

In at least any of the phase coils, at least the first end in the circumferential direction of an i-th unit coil, i being a natural number that is any of 1 to n, in an order of connection from the phase terminal and respective first ends in the circumferential direction of an ($\alpha$+1)-th unit coil, a being a remainder of i divided by n, and a ($\beta$+1)-th unit coil, $\beta$ being a remainder of i-2 divided by n, are housed in slots of a same phase within a same magnetic pole. In addition, respective both first and second ends in the circumferential direction of the ($\alpha$+1)-th unit coil and the ($\beta$+1)-th unit coil are housed in slots of the same phase within the same magnetic pole.

In the rotating electric machine configured as described above, each phase coil of the stator winding has a plurality of series-connection coil groups that each includes n unit coils. In each of the series-connection coil groups, a first end thereof is connected to a phase terminal of each phase and a second end is connected to a neutral point. The series-connection coil groups are connected in parallel to each other in this state. In this case, the configuration is advantageous in terms of achieving higher output in the rotating electric machine.

In addition, in the stator winding, in each phase coil, a resonance phenomenon may occur in opposite directions between unit coils of differing numbers in the order of connection from the phase terminal as a result of high-frequency components that are generated in accompaniment with switching during coil energization. An increase in a voltage difference (shared voltage) between unit coils can be considered as a result thereof. This is thought to cause decrease in insulation performance in the stator winding.

In this regard, according to the first aspect, in at least any of the phase coils, at least the first end in the circumferential direction of an i-th unit coil in the order of connection from the phase terminal and respective first ends in the circumferential direction of an ($\alpha$+1)-th unit coil, $\alpha$ being a remainder of i divided by n, and a ($\beta$+1)-th unit coil, $\beta$ being a remainder of i−2 divided by n, are housed in slots of a same phase within a same magnetic pole. In addition, respective both first and second ends in the circumferential direction of the ($\alpha$+1)-th unit coil and the ($\beta$+1)-th unit coil are housed in slots of the same phase within the same magnetic pole.

In this case, the resonance phenomenon can be suppressed as a result of magnetic coupling between the ($\alpha$+1)-th unit coil and the ($\beta$+1)-th unit coil. That is, as a result of a voltage at one unit coil being transmitted to a voltage at another unit coil in the slots of the same phase within the same magnetic pole, canceling of a resonance voltage can be achieved. As a result, an increase in the voltage difference (shared voltage) between the unit coils can be suppressed. Moreover, improvement in insulation performance can be suitably implemented.

Here, a specific description of the ($\alpha$+1)-th unit coil and the ($\beta$+1)-th unit coil is as follows.

For example, when i=5 and n=8, a quotient of 5(i) divided by 8(n) is 0 and a remainder is 5. Therefore, $\alpha$=5 and the ($\alpha$+1)-th unit coil is a 6th unit coil. In addition, the quotient of 3(i−2) divided by 8(n) is 0 and the remainder is 3. Therefore, $\beta$=3 and the ($\beta$+1)-th unit coil is a 4th unit coil. In this case, the i-th unit coil, the ($\alpha$+1)-th unit coil, and the ($\beta$+1)-th unit coil are respectively the 5th unit coil, the 6th unit coil, and the 4th unit coil.

In addition, when i=1 and n=8, the quotient of 1(i) divided by 8(n) is 0 and the remainder is 1. Therefore, $\alpha$=1 and the ($\alpha$+1)-th unit coil is a 2nd unit coil. In addition, the quotient of −1(i−2) divided by 8(n) is −1 and the remainder is 7. Therefore, $\beta$=7 and the ($\beta$+1)-th unit coil is an 8th unit coil. In this case, the i-th unit coil, the ($\alpha$+1)-th unit coil, and the ($\beta$+1)-th unit coil are respectively the 1st unit coil, the 2nd unit coil, and the 8th unit coil.

Furthermore, when i=8 and n=8, the quotient of 8(i) divided by 8(n) is 1 and the remainder is 0. Therefore, $\alpha$=0 and the ($\alpha$+1)-th unit coil is a 1st unit coil. In addition, the quotient of 6(i−2) divided by 8(n) is 0 and the remainder is 6. Therefore, $\beta$=6 and the ($\beta$+1)-th unit coil is a 7th unit coil.

In this case, the i-th unit coil, the (α+1)-th unit coil, and the (β+1)-th unit coil are respectively the 8th unit coil, the 1st unit coil, and the 7th unit coil.

Here, if i is defined as a natural number that is any of 1 to n, where the n-th unit coil is immediately before the 1st unit coil, and the 1st unit coil is immediately after the n-th unit coil, the i-th unit coil, the (α+1)-th unit coil, and the (β+1)-th unit coil are respectively the i-th unit coil, an (i+1)-th unit coil, and an (i−1)-th unit coil. In this case, for example, when n=8, 8th (n-th) unit coil is before the 1st unit coil, and the 1st unit coil is immediately after the 8th (n-th) unit coil.

A second aspect is according to the first aspect in which the series-connection coil group includes the unit coil that is wound on a first side in the circumferential direction from the phase terminal to the neutral point and the unit coil that is wound on a second side in the circumferential direction, and the i-th unit coil is arranged in a foldback position in the winding direction.

In the above-described configuration, in the series-connection coil group, the winding direction of the unit coils is folded back by the i-th unit coil from the phase terminal. In addition, with reference to the i-th unit coil that is arranged at a foldback position, the (i−1)-th unit coil (corresponding to the (β+1)-th unit coil) and the (i+1)-th unit coil (corresponding to the (α+1)-th unit coil) are housed in slots of the same phase within the same magnetic pole. As a result, the configuration in which the (i±1)-th unit coils are housed in slots of the same phase within the same magnetic pole can be suitably obtained.

A third aspect is according to the first or second aspect in which each of the series-connection coil groups is provided in a circumferential-direction region that is less than a single revolution around the stator core, and the series-connection coil groups that differ from each other are arranged so as to be arrayed in the circumferential direction.

As a result of the above-described configuration, the unit coil on the phase terminal side and the unit coil on the neutral point side can be housed in slots of the same phase within the same magnetic pole, between the series-connection coil groups. Consequently, the resonance voltage can be reduced between series-connection coil groups that differ from each other as a result of magnetic coupling between these series-connection coil groups.

A fourth embodiment is according to any one of the first to third embodiments in which at least respective first ends in the circumferential direction of the i-th unit coil in one series-connection coil group of two series-connection coil groups that are included in the phase coil of a same phase and a j-th unit coil in the other series-connection coil group are housed in slots of the same phase within the same magnetic pole, and i≠j.

In the above-described configuration, the unit coils that are housed in slots of the same phase within the same magnetic pole are included in series-connection coil groups that differ from each other in the phase coil of the same phase. Order-of-connection numbers i and j of the unit coils differ from each other. In this case, a configuration for suppressing the resonance phenomenon can be easily obtained by a combination of unit coils being housed in slots of the same phase within the same magnetic pole. In addition, a suitable configuration for suppressing a secondary resonance in addition to the primary resonance can be obtained.

A fifth aspect is according to the fourth aspect in which in the i-th unit coil, n/4<i≤3n/4 is established, and in the j-th unit coil, at least one of j≤n/4 and j>3n/4 is established.

In the above-described configuration, for example, when n=8, 2<i≤6, and j≤2 or j>6. In this case, the combination of unit coils that are housed in slots of the same phase within the same magnetic pole is a combination of a unit coil that is close to the phase terminal or the neutral point and a unit coil that is close to a center position from the phase terminal to the neutral point. A configuration that strongly suppresses secondary resonance can be obtained.

A sixth aspect is according to any one of the first to fifth aspects in which, in at least any of the phase coils, when a k-th unit coil in the order of connection from the phase terminal and a k-th unit coil in the order of connection from the neutral point are considered to be symmetrical coils, at least respective first ends in the circumferential direction of the symmetrical coils that are present from the phase terminal to the neutral point are housed in slots of the same phase within the same magnetic pole.

In the above-described configuration, in each phase coil, a combination of unit coils that are symmetrical coils that are corresponding in terms of the order of connection from the phase terminal and the order of connection from the neutral point is prescribed. The resonance phenomenon is suppressed in the unit coil on the phase terminal side and the unit coil on the neutral point side that compose the symmetrical coils as a result of magnetic coupling that occurs between the unit coil on the phase terminal side and the unit coil on the neutral point side. Consequently, a surge voltage that is generated as a result of resonance can be suitably reduced.

A seventh aspect is according to the sixth aspect in which, in the series-connection coil group of at least any of the phases, in n/2 unit coils from the phase terminal to an intermediate point, when an m-th unit coil in the order of connection from the phase terminal and an m-th unit coil in the order of connection from the intermediate point are first symmetrical coils, at least respective first ends of the first symmetrical coils that are present from the phase terminal to the intermediate point are housed in slots of the same phase within the same magnetic pole.

In addition, in n/2 unit coils from the neutral point to an intermediate point, when an m-th unit coil in the order of connection from the neutral point and an m-th unit coil in the order of connection from the intermediate point are second symmetrical coils, at least respective first ends of the second symmetrical coils that are present from the phase terminal to the intermediate point are housed in slots of the same phase within the same magnetic pole.

In the phase coils of the stator winding, a secondary resonance occurs in addition to a primary resonance based on a frequency of switching. In this regard, according to the present aspect, in a series-connection coil group of phase coils, magnetic coupling occurs between first symmetrical coils, which are n/2 unit coils from the phase terminal to an intermediate point, and second symmetrical coils, which are n/2 unit coils from the neutral point to an intermediate point, leading to suppression of secondary resonance. Consequently, an increase in the voltage difference (shared voltage) between unit coils attributed to the secondary resonance can be suppressed.

An eighth aspect provides a rotating electric machine that includes: a stator that includes a stator core that has a plurality of slots that are arranged in a circumferential direction and a stator winding that has a plurality of phase coils that are wound in the slots; and a rotor that is arranged so as to oppose the stator in a radial direction and has a plurality of magnetic poles in the circumferential direction.

In the rotating electric machine, each of the phase coils has a plurality of series-connection coil groups that each includes n unit coils that are arranged to be wound in the circumferential direction. In each of the series-connection coil groups, a first end thereof is connected to a phase terminal for a respective phase and a second end is connected to a neutral point, and the series-connection coil groups are connected in parallel to each other.

In at least any of the phase coils, when a k-th unit coil in the order of connection from the phase terminal and a k-th unit coil in the order of connection from the neutral point are considered to be symmetrical coils, at least respective first ends in the circumferential direction of the symmetrical coils that are present from the phase terminal to the neutral point are housed in slots of the same phase within the same magnetic pole.

In the rotating electric machine configured as described above, each phase coil of the stator winding has a plurality of series-connection coil groups that each includes n unit coils. In each of the series-connection coil groups, a first end thereof is connected to a phase terminal of each phase and a second end is connected to a neutral point. The series-connection coil groups are connected in parallel to each other in this state. In this case, the configuration is advantageous in terms of achieving higher output in the rotating electric machine.

In addition, in the stator winding, in the phase coil, a resonance phenomenon may occur in opposite directions between unit coils of differing numbers in the order of connection from the phase terminal as a result of high-frequency components that are generated in accompaniment with switching during coil energization. An increase in a voltage difference (shared voltage) between unit coils can be considered as a result thereof.

More specifically, the resonance phenomenon occurring in opposite directions between the k-th unit coil in the order of connection from the phase terminal and the k-th unit coil in the order of connection from the neutral point can be considered. This is thought to cause decrease in insulation performance in the stator winding.

In this regard, according to the present aspect, in the phase coil, when the combination of a k-th unit coil in the order of connection from the phase terminal and a k-th unit coil in the order of connection from the neutral point is considered to be symmetrical coils, at least respective first ends in the circumferential direction of the symmetrical coils that are present from the phase terminal to the neutral point are housed in slots of the same phase within the same magnetic pole.

In this case, the resonance phenomenon can be suppressed in the unit coil on the phase terminal side and the unit coil on the neutral point side that compose the symmetrical coils as a result of magnetic coupling between the unit coil on the phase terminal side and the unit coil on the neutral point side. That is, as a result of a voltage at one unit coil being transmitted to a voltage at another unit coil in the slots of the same phase within the same magnetic pole, canceling of the resonance voltage can be achieved. As a result, increase in the voltage difference (shared voltage) between the unit coils can be suppressed. Moreover, improvement in insulation performance can be suitably implemented.

A ninth aspect is according to the eighth aspect in which the series-connection coil group includes the unit coil that is wound on a first side in the circumferential direction from the phase terminal to the neutral point and the unit coil that is wound on a second side in the circumferential direction, each of the series-connection coil groups is provided in a circumferential-direction region that is less than a single revolution around the stator core, and the series-connection coil groups that differ from each other are arranged so as to be arrayed in the circumferential direction.

In the above-described configuration, in the series-connection coil group, the unit coils that are provided to be wound in the circumferential direction are arranged so as to fold back towards a reverse side in the circumferential direction. In addition, each of the series-connection coil groups is provided in a circumferential-direction region that is less than a single revolution around the stator core. The series-connection coil groups that differ from each other are arranged so as to be arrayed in the circumferential direction. Consequently, the configuration in which at least respective first ends in the circumferential direction of the symmetrical coils are housed in slots of the same phase within the same magnetic pole can be suitably obtained.

A tenth aspect is according to the eighth aspect or the ninth aspect in which, in the series-connection coil group of at least any of the phases, in n/2 unit coils from the phase terminal to an intermediate point, when an m-th unit coil in the order of connection from the phase terminal and an m-th unit coil in the order of connection from the intermediate point are first symmetrical coils, at least respective first ends of the first symmetrical coils that are present from the phase terminal to the intermediate point are housed in slots of the same phase within the same magnetic pole.

In addition, in n/2 unit coils from the neutral point to an intermediate point, when an m-th unit coil in the order of connection from the neutral point and an m-th unit coil in the order of connection from the intermediate point are second symmetrical coils, at least respective first ends of the second symmetrical coils that are present from the phase terminal to the intermediate point are housed in slots of the same phase within the same magnetic pole.

In the phase coils of the stator winding, a secondary resonance occurs in addition to a primary resonance based on a frequency of switching. In this regard, according to the present aspect, in a series-connection coil group of phase coils, magnetic coupling occurs between first symmetrical coils, which are n/2 unit coils from the phase terminal to an intermediate point, and second symmetrical coils, which are n/2 unit coils from the neutral point to an intermediate point, leading to suppression of secondary resonance. The secondary resonance is suppressed as a result of the magnetic coupling therebetween. Consequently, an increase in the voltage difference (shared voltage) between the unit coils attributed to the secondary resonance can be suppressed.

An eleventh aspect is according to any one of the first to tenth aspects in which the number of slots for a respective phase for a respective magnetic pole in the stator core is 2x (x being a natural number). The phase coil has a crossover portion that connects unit coils to each other in the series-connection coil group. The unit coils are provided such that conducting wires that are wound by lap winding are arrayed in a plurality of layers in the radial direction inside the slots, and a slot pitch that is an interval in the circumferential direction at which the unit coils are housed in the slots is a y-slot pitch that is a slot pitch that amounts to a single magnetic pole. The crossover portions are provided at at least any of the y-slot pitch, a (y−1)-slot pitch, and a (y+1)-slot pitch.

In the above-described configuration, the unit coils are provided such that conducting wires that are wound by lap winding are arrayed in a plurality of layers in the radial direction inside the slots. Unit coils that are adjacent to each other in the circumferential direction are connected to each other by the crossover portion on an innermost side or an outermost side in the radial direction. In this case, in the configuration in which the unit coils of a same phase are housed in slots that are provided two for a respective phase for a respective magnetic pole, the crossover portions are provided at at least one of the y-slot pitch and the (y±1)-slot pitch. As a result, a configuration that is suitable in terms of reversing the extending direction at the crossover portion (the winding orientation in the circumferential direction) is obtained. In addition, a length of the crossover portion can be made as short as possible.

First Embodiment

An embodiment of a rotating electric machine of the present invention will hereinafter be described. According to the present embodiment, the rotating electric machine is implemented as a traveling motor to generate traveling power (torque) for an electric vehicle.

First, an overall configuration of a rotating electric machine 10 will be described. FIG. 1 is a cross-sectional view of an overall structure of the rotating electric machine 10 according to the present embodiment. In descriptions below, a direction in which a rotational center axis of the rotating electric machine 10 extends is an axial direction D1. A direction that extends in a radiating manner from the rotational center is a radial direction D2. A direction that extends in a circumferential manner around the rotational center axis is a circumferential direction D3. As shown in FIG. 1, the rotating electric machine 10 is an inner-rotor-type three-phase alternating-current rotating electric machine. The rotating electric machine 10 is configured to include a housing 11, a rotor 20, and a stator 30.

The rotor 20 is configured to include a rotation shaft 21, a rotor core 22, and a permanent magnet 23. The rotor core 22 is fixed to the rotation shaft 21. In addition, the rotation shaft 21 is supported to the housing 11 by a set of bearings 12 and 13 so as to freely rotate. A plurality of permanent magnets 23 are arranged at a predetermined pitch in the circumferential direction D3 of the rotor core 22. The permanent magnets 23 are magnetized such that polarities of the permanent magnets 23 alternate in the circumferential direction D3. As a result, a plurality of magnetic poles are formed in the circumferential direction D3. Here, for example, a structure of the rotor 20 may be replaced by various well-known types, such as a winding-field type in which a field winding is wound around a Lundell pole core.

Figure 2:
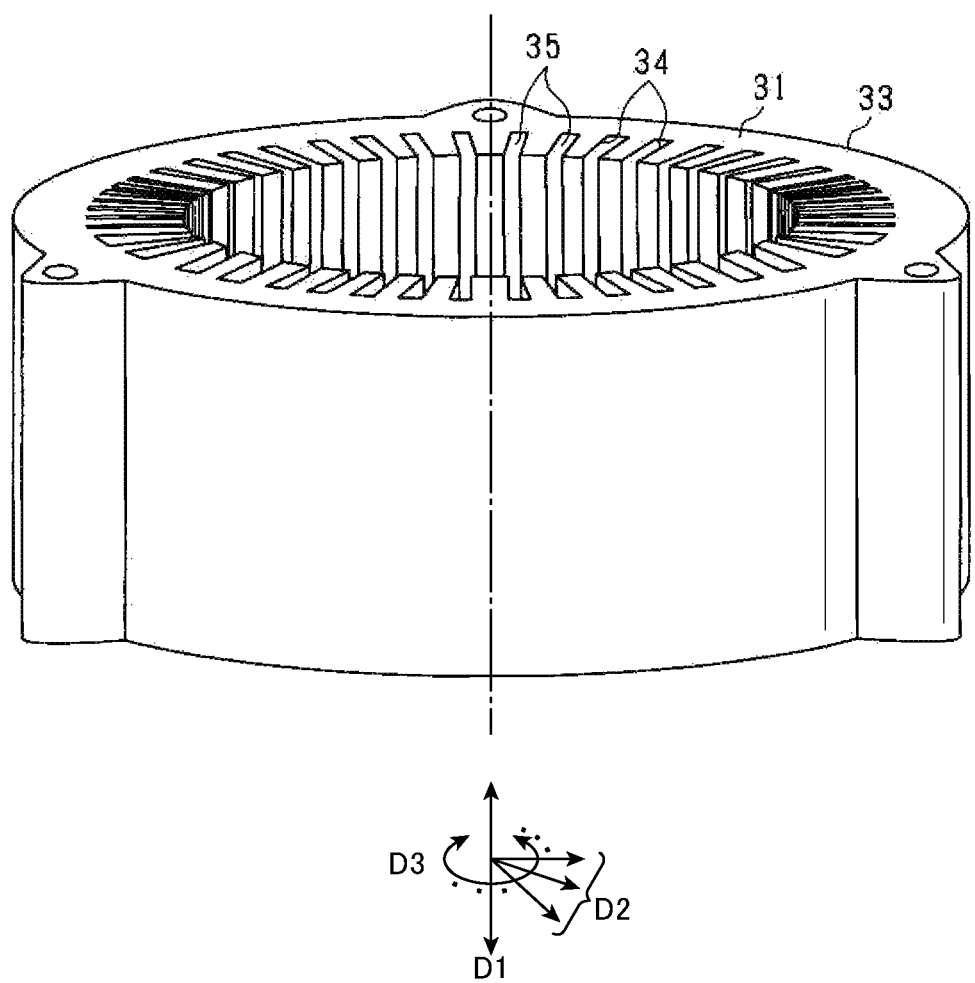
FIG. 2 is a perspective view of a stator core.

The stator 30 is arranged on an outer side in the radial direction of the rotor 20. The stator 30 is configured to include a stator core 31 and a stator winding 32. The stator core 31 has a circular cylindrical shape and is fixed on an inner circumferential side of a peripheral wall of the housing 11. The stator core 31 is configured by a laminated steel plate in which electromagnetic steel plates are laminated in the axial direction D1. As shown in FIG. 2, the stator core 31 has an annular back yoke 33, and a plurality of teeth 34 that extend from the back yoke 33 towards an inner side in the radial direction D2. Slots 35 are formed in a compartmentalized manner between the teeth 34. The rotating electric machine 10 according to the present embodiment has eight magnetic poles, four pole pairs, and two phase slots for a respective magnetic pole. Forty-eight slots 35 are formed in the circumferential direction D3 in the stator core 31.

The stator winding 32 is wound in the slots 35 of the stator core 31. In addition, a first coil end portion of the stator winding 32 protrudes in the axial direction from a first end surface of the stator core 31 in the axial direction D1. A second coil end portion of the stator winding 32 protrudes in the axial direction from a second end surface of the stator core 31 in the axial direction D1.

Figure 3A:
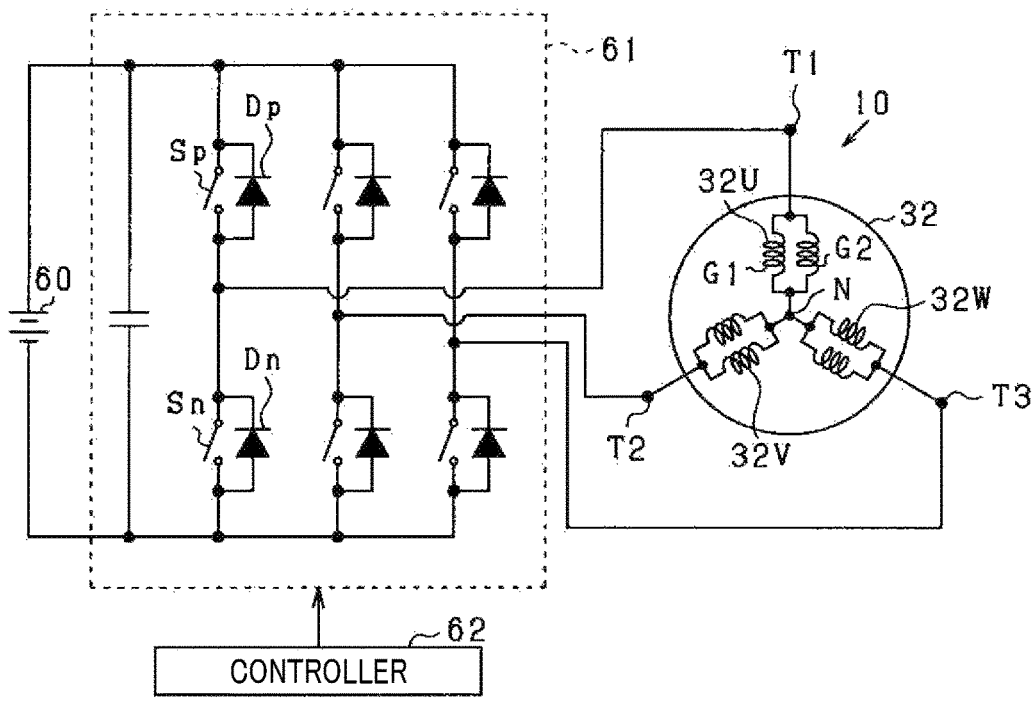
FIG. 3A and FIG. 3B are circuit diagrams of an electrical configuration of a stator winding.
Figure 3B:
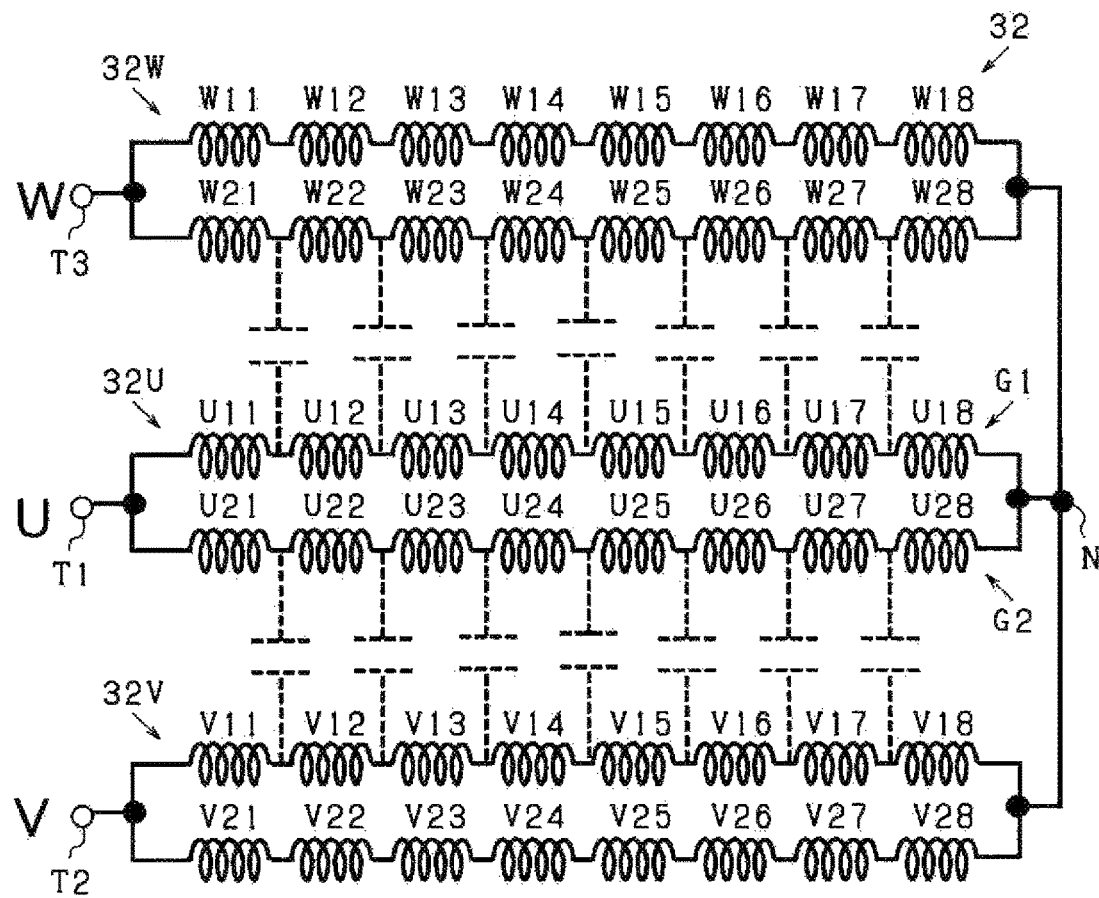

FIGS. 3A and 3B are circuit diagrams of an electrical configuration related to the stator winding 32. As shown in FIG. 3A, the stator winding 32 has a U-phase coil 32U, a V-phase coil 32V, and a W-phase coil 32W as phase coils. The stator winding 32 is configured to have a star connection (Y-connection) as a result of the phase coils 32U, 32V, and 32W being connected at a neutral point N. According to the present embodiment, each of the phase coils 32U, 32V, and 32W has a winding structure of a two-parallel connection.

As shown in FIG. 3B, the phase coils 32U, 32V, and 32W each have two series-connection coil groups G1 and G2 (series-connection bodies) that are made of a plurality of unit coils. The phase coils 32U, 32V, and 32W are each configured such that the series-connection coil groups G1 and G2 are connected in parallel. Each unit coil is wound so as to straddle two slots that are separated at a predetermined slot pitch. Unit coils are formed by a coil conducting wire being wound in an overlapping manner. In addition, as a result of the unit coils being connected to each other by a crossover portion, the plurality of unit coils are connected in series.

Figure 4:
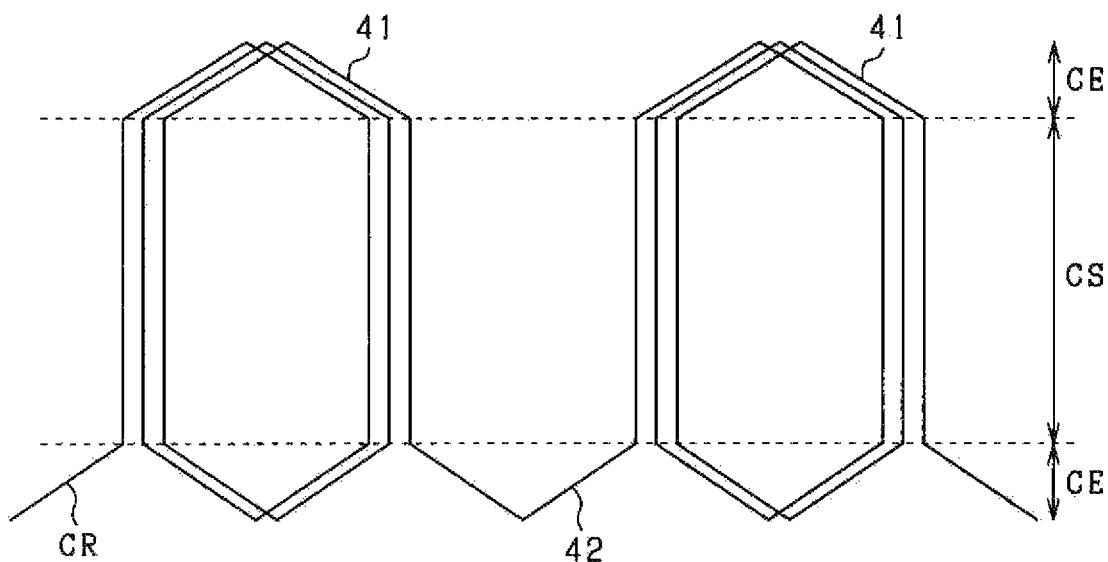
FIG. 4 is a diagram of a configuration of unit coils that have a lap winding structure.

FIG. 4 shows a configuration of unit coils 41 that have a lap winding structure. Here, in FIG. 4, an area labelled by CS in the axial direction (up/down direction in FIG. 4) is a coil side portion in which the conducting wire is housed inside the slot 35. An area labelled by CE is a coil end portion in which the conducting wire protrudes from the slot 35 in the axial direction. According to the present embodiment, the plurality of unit coils 41 are formed using a conducting wire CR that is made of a flat conducting wire that has a substantially rectangular cross-section, such that the conducting wire CR is wound in an overlapping manner in multiple layers. According to the present embodiment, the unit coils 41 have the same number of turns. In addition, a portion that connects the unit coils 41 to each other is a crossover portion 42. Here, the conducting wire CR may be a winding wire that has a circular cross-section.

Figure 5:
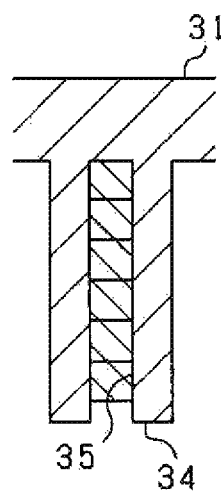
FIG. 5 is a diagram of a state in which conducting wires are housed in a slot.

As shown in FIG. 5, the conducting wire CR is arranged in the slot 35 of the stator core 31 so as to be arrayed in a plurality of layers in the radial direction. In this case, the conducting wire CR is wound by lap winding in order from the outer side in the radial direction or from the inner side in the radial direction. As a result of the conducting wire CR being wound in this manner, conductors that amount to the number of turns are arranged in an array in the radial direction inside the slot 35.

Figure 6:
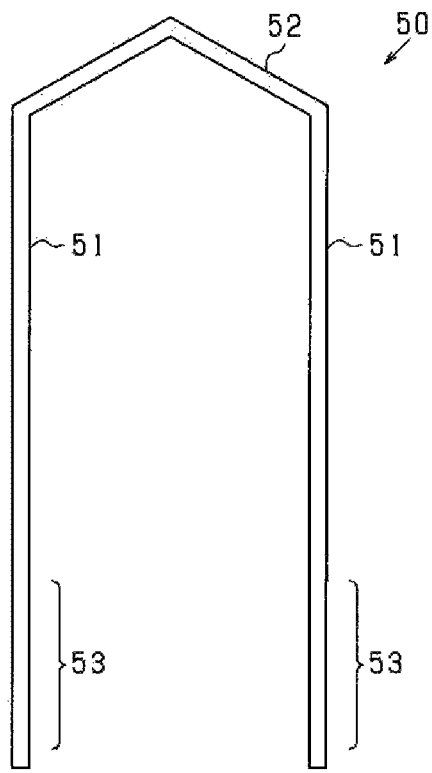
FIG. 6 is a diagram of a configuration of a conductor segment.

For example, as the conducting wire CR, a conductor segment 50 shown in FIG. 6 can be used. The conductor segment 50 is formed such that a flat conducting wire is bent into a substantially U-like shape. The conductor segment 50 has a pair of straight portions 51 and a turn portion 52 that connects the pair of straight portions 51. The straight portion 51 has a length that is greater than an axial length of the stator core 31. A tip end portion of the straight portion 51 opposite that contacting the turn portion 52 is a margin portion 53. In this case, in a state in which the conductor segment 50 is inserted into the slot 35, the margin portion 53 of the straight portion 51 protrudes from the slot 35. The respective margin portions 53 of differing conductor segments 50 are joined together by welding or the like, thereby connecting the conductor segments 50 to each other.

Here, the unit coils 41 of the phase coil can also be configured using a continuous wire, instead of having a segment structure in which the plurality of conductor segments 50 are used.

Returning to FIG. 3B, a configuration of the phase coils 32U, 32V, and 32W will be described. Here, the phase coils 32U, 32V, and 32W each include the plurality of unit coils 41. In the description below, for convenience, the unit coil 41 that is included in the phase coil 32U is referred to as a unit coil U. The unit coil 41 that is included in the phase coil 32V is referred to as a unit coil V. The unit coil 41 that is included in the phase coil 32W is referred to as a unit coil W.

The U-phase coil 32U includes the series-connection coil group G1 and the series-connection coil group G2, and is configured such that the series-connection coil groups G1 and G2 are connected in parallel. The series-connection coil group G1 is configured by eight unit coils U11, U12, U13, U14, U15, U16, U17, and U18 being electrically connected in this order. The series-connection coil group G2 is configured by eight unit coils U21, U22, U23, U24, U25, U26, U27, and U28 being electrically connected in this order. In the U-phase coil 32U, a first end of each of the series-connection coil groups G1 and G2 on the unit coil U11 or the unit coil U21 side is connected to a U-phase terminal T1. A second end of each of the series-connection coil groups G1 and G2 on the unit coil U18 or the unit coil U28 side is connected to the neutral point N. Here, according to the present embodiment, the number of coils, i,e., n, in each of the series-connection coil groups G1 and G2 is 8.

In a similar manner, the V-phase coil 32V includes the series-connection coil group G1 and the series-connection coil group G2, and is configured such that the series-connection coil groups G1 and G2 are connected in parallel. The series-connection coil group G1 is configured by eight unit coils V11, V12, V13, V14, V15, V16, V17, and V18 being electrically connected in this order. The series-connection coil group G2 is configured by eight unit coils V21, V22, V23, V24, V25, V26, V27, and V28 being electrically connected in this order. In the V-phase coil 32V, a first end of each of the series-connection coil groups G1 and G2 on the unit coil V11 or the unit coil V21 side is connected to a V-phase terminal T2. A second end of each of the series-connection coil groups G1 and G2 on the unit coil V18 or the unit coil V28 side is connected to the neutral point N.

In a similar manner, the W-phase coil 32W includes the series-connection coil group G1 and the series-connection coil group G2, and is configured such that the series-connection coil groups G1 and G2 are connected in parallel. The series-connection coil group G1 is configured by eight unit coils W11, W12, W13, W14, W15, W16, W17, and W18 being electrically connected in this order. The series-connection coil group G2 is configured by eight unit coils W21, W22, W23, W24, W25, W26, W27, and W28 being electrically connected in this order. In the W-phase coil 32W, a first end of each of the series-connection coil groups G1 and G2 on the unit coil W11 or the unit coil W21 side is connected to a W-phase terminal T3. A second end of each of the series-connection coil groups G1 and G2 on the unit coil W18 or the unit coil W28 side is connected to the neutral point N.

As shown in FIG. 3A, an inverter 61 is connected between a battery 60 and the phase terminals T1 to T3. The inverter 61 has a plurality of switching elements. Specifically, the inverter 61 is a full-bridge circuit that has the same number of upper arms and the same number of lower arms as the number of phases of the stator winding 32. The inverter 61 configures a three-phase full-wave rectifier circuit. The inverter 61 configures a drive circuit that drives the rotating electric machine 10 by adjusting electric power that is supplied to the rotating electric machine 10. That is, the inverter 61 has switches Sp and Sn as the switching elements for a respective phase. An intermediate connection point of a series-connection body that is made of the switches Sp and Sn for a respective phase is connected to a corresponding phase terminal among the phase terminals T1 to T3 of the phase coils 32U, 32V, and 32W. As a result of switching being performed in the inverter 61, an energization current that flows to the rotating electric machine 10 is adjusted.

The inverter 61 includes an upper arm switch Sp and a lower arm switch Sn for a respective phase. According to the present embodiment, a voltage-control-type semiconductor switching element is used as each of the switches Sp and Sn. Specifically, an N-channel metal-oxide semiconductor field-effect transistor (MOSFET) is used. An upper arm diode Dp is connected in anti-parallel to the upper arm switch Sp. A lower arm diode Dn is connected in anti-parallel to the lower arm switch Sn. According to the present embodiment, body diodes of the switches Sp and Sn are used as the diodes Dp and Dn. Here, the diode is not limited to the body diode. For example, a diode that is a component that is separate from the switches Sp and Sn may be used.

When a vehicle is driven, a switching operation of the switches Sp and Sn is appropriately performed based on a command from a controller 62. A three-phase alternating-current voltage is applied from the battery 60 to the stator winding 32, through the inverter 61. The rotor 20 rotates as a result of the applied voltage. The rotation shaft 21 of the rotor 20 is directly connected to a crank shaft of an engine (not shown). Alternatively, the rotation shaft 21 of the rotor 20 is connected to the crank shaft by a clutch, a gear, and the like. When the rotation shaft 21 of the rotor 20 is directly connected to the crank shaft, the engine is started by the rotation of the rotation shaft 21 of the rotor 20.

The rotating electric machine 10 may be configured as described below.

That is, in the inner-rotor-type rotating electric machine 10, when a value that is obtained by an outer diameter of the stator 30 (i.e., a diameter on an outer circumference side of the stator 30) being divided by an outer diameter of the rotor 20 (i.e., a diameter on an outer circumference side of the rotor 20) is an outer diameter ratio of the stator 30 and the rotor 20, the outer diameter ratio is 1.2 or more and 1.7 or less.

When a value that is obtained by a lamination thickness of the stator core 31 (i.e., a core thickness dimension in the axial direction) being divided by the outer diameter of the rotor 20 (i.e., the diameter on the outer circumference side of the rotor 20) is a lamination thickness-to-rotor outer diameter ratio, the lamination thickness-to-rotor outer diameter ratio is equal to or greater than 0.6. In this configuration, the rotating electric machine 10 is an elongated shaft type rather than a flat type. The rotating electric machine 10 is designed for high-voltage use.

When a value that is obtained by a coil end height on a first side of the stator 30 being divided by the lamination thickness of the stator core 31 (i.e., the core thickness dimension in the axial direction) is a coil end-to-lamination thickness ratio, the coil end-to-lamination thickness ratio is equal to or less than 0.25. In the stator winding 32 that has the segment structure as described above, the coil end height is low. Output density can be increased.

Hereafter, a detailed configuration of the winding structure of the stator 30 including characteristic sections according to the present embodiment will be described. However, here, before the detailed configuration according to the present embodiment is described, a development process of the rotating electric machine 10 according to the present embodiment and a winding structure of another stator that serves as a comparison example will be described.

A technical background leading to the development of the rotating electric machine 10 according to the present embodiment is as follows. That is, in recent years, in accompaniment with regulations regarding gas emission, transition from gasoline- and diesel-engine automobiles to electric vehicles such as hybrid cars, fuel cell-powered cars, and electric cars has been promoted in countries around the world. Among these electric vehicles, focus is being placed on fuel cell-powered cars and electric cars that emit less exhaust gas.

However, in fuel cell-powered cars and electric cars, provision of driving power during traveling cannot be shared between engine output and electric motor output as in hybrid cars. Driving power is required to be provided by the output from only the electric motor under all traveling conditions.

As a result, compared to the electric motor of a hybrid car, the electric motor of a fuel cell-powered car or an electric car is required to provide a greater output. At the same time, the electric motor of a fuel cell-powered car or an electric car is required to enable traveling over a longer distance with a smaller amount of hydrogen or fewer charging cycles. The electric motor of a fuel cell-powered car or an electric car is also required to be smaller in size and lighter in weight, and have higher efficiency. To achieve a larger output from the electric motor, two measures, that is, an increase in rotation speed and an increase in torque (an increase in diameter or an increase in lamination thickness) can be considered. However, taking into consideration a traveling speed of a car, increase in torque is appropriate.

In addition, taking into consideration differences in required torque based on vehicle size, an increase in lamination thickness is effective as a measure for reducing manufacturing costs because, if the cross-sectional shape is identical, a pressed electromagnetic steel plate item can be used as a common component. Therefore, an increase in lamination thickness is used by many companies. Meanwhile, if the increase in lamination thickness progresses, two issues described below arise.

Figure 7:
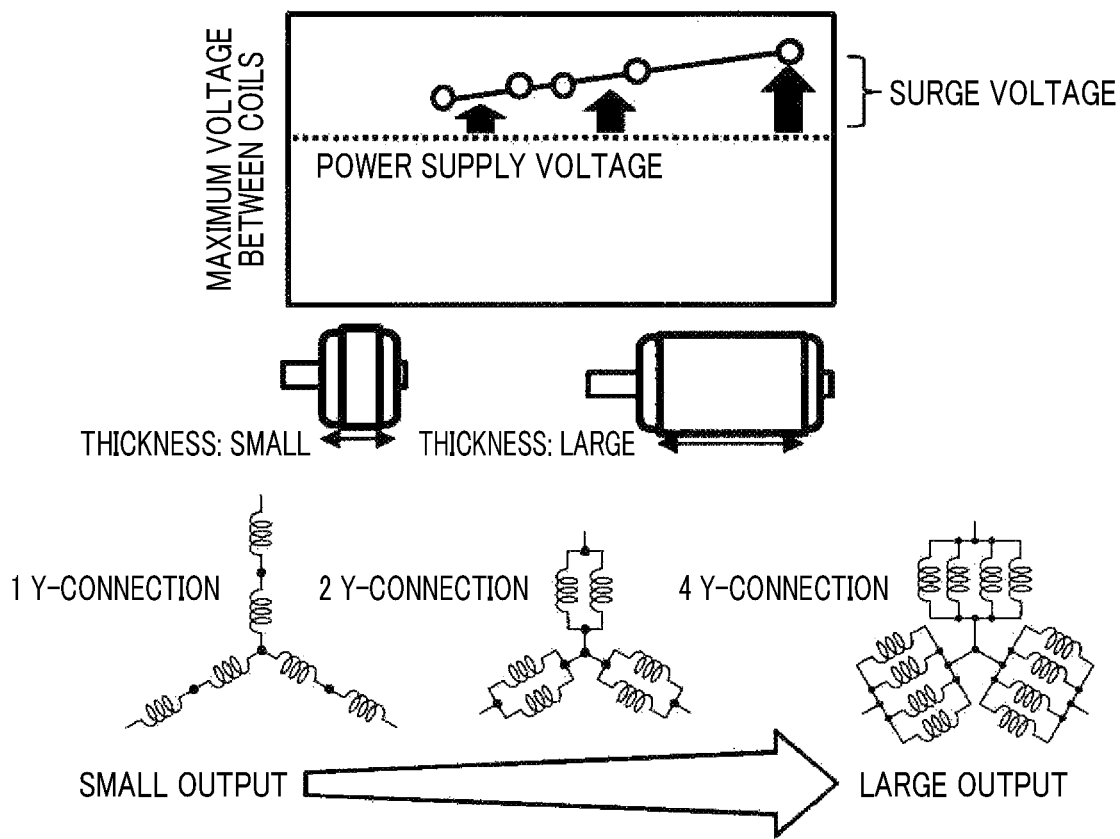
FIG. 7 is a diagram of a relationship among a lamination thickness of the stator core (configured by a laminated steel plate), surge voltage, and coil connection.

First, an induced voltage that is generated when the electric motor performs regeneration increases in proportion to the lamination thickness. If the induced voltage exceeds an output voltage limit of the inverter, control can no longer be performed. As a means for preventing this issue, as shown in FIG. 7, the number of series connections being changed as a result of some of the coils in the electric motor being changed to parallel connection so as to prevent the induced voltage from exceeding the output voltage limit of the inverter can be considered.

Figure 8:
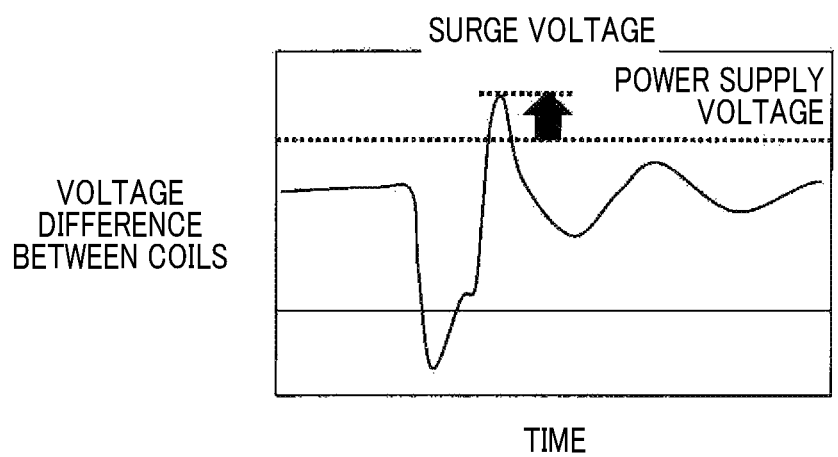
FIG. 8 is a diagram of an increase in a voltage difference (shared voltage) between coils caused by a surge voltage.

Second, a transient voltage increase referred to as a surge voltage is known to occur during switching of the inverter. As shown in FIG. 8, in accompaniment with the surge voltage being generated, a voltage difference (shared voltage) between coils increases. In addition, because the surge voltage increases in accompaniment with the increase in lamination thickness, a maximum voltage that is generated between the coils in the electric motor tends to increase.

In this case, when the maximum voltage between coils exceeds a withstand voltage between conducting wires that are used in the coils, a weak discharge phenomenon that is referred to as partial discharge occurs. An insulating film layer on a surface of the conducting wire becomes damaged. A short-circuit fault may ultimately occur between the coils. To prevent this short-circuit fault, a thickness of the insulating film layer is required to be increased so as to increase the withstand voltage between conducting wires. However, as a result of the electric motor being increased in size by an amount amounting to the thickness of the film layer with output being the same, achieving both prevention of a short-circuit fault and reduction in size and weight becomes difficult.

The rotating electric machine 10 according to the present embodiment has been achieved in light of issues such as those described above. In the high-output rotating electric machine 10 for an electric vehicle, increase in maximum voltage between coils is suppressed even under a condition in which thickness is increased and parallel connection is used. Size and weight reduction and high insulation reliability are obtained.

Figure 9:
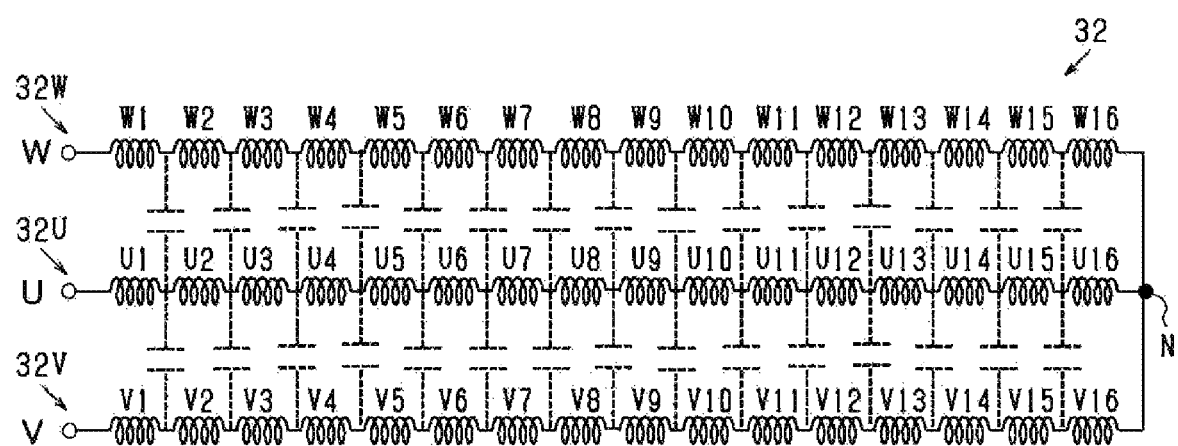
FIG. 9 is a diagram of a series-connection stator winding.
Figure 10:
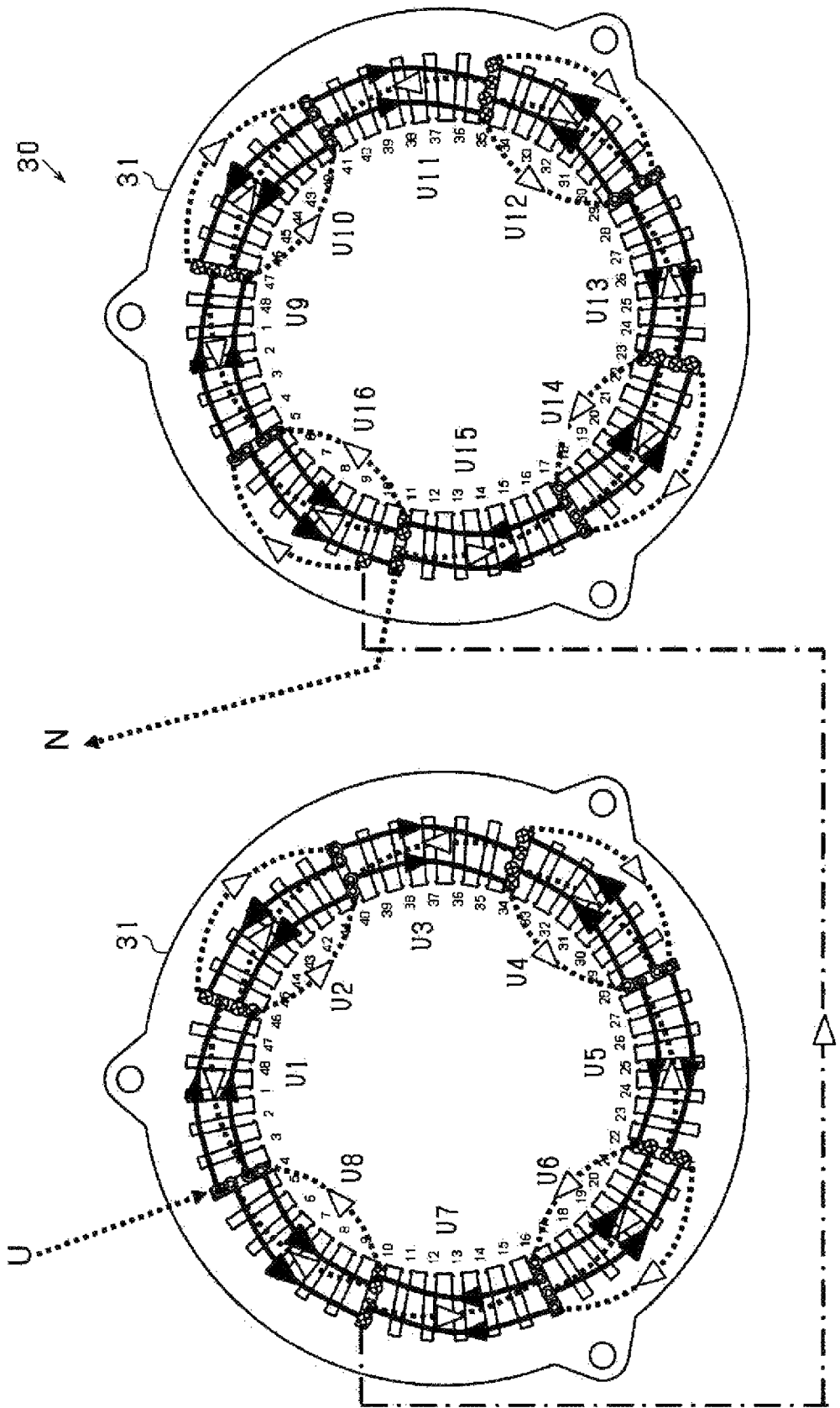
FIG. 10 is a diagram of a winding state of the series-connection stator winding.
Figure 11:
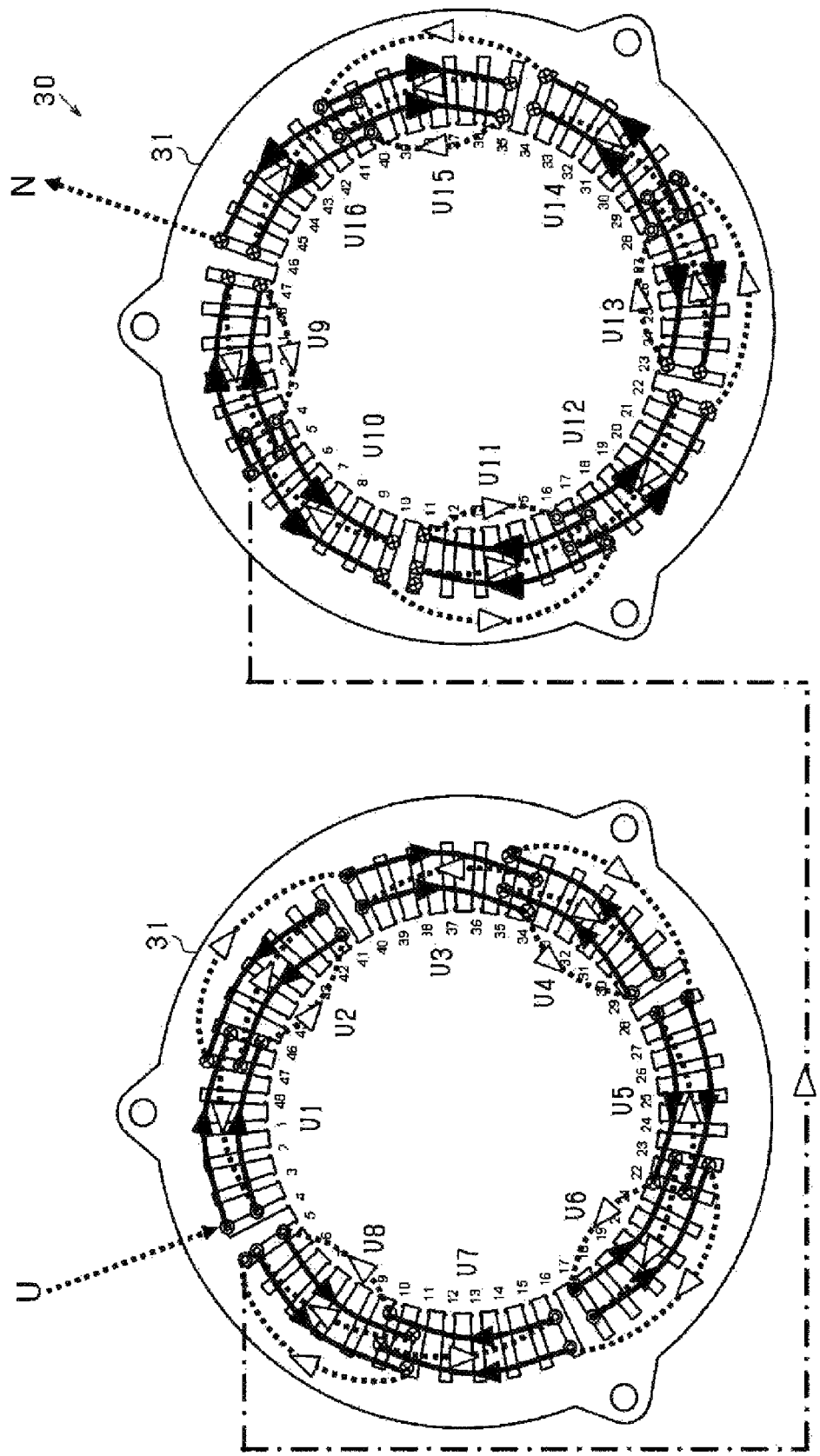
FIG. 11 is a diagram of a winding state of the series-connection stator winding.

As the winding structure of the comparison example, a configuration of the stator 30 in which the unit coils are connected without being connected in parallel in the phase coils 32U, 32V, and 32W is shown in FIGS. 9 to 11. Among the drawings, FIG. 9 shows a coil connection of the stator winding 32 of the stator 30 shown in FIGS. 10 and 11. Here, the configurations of the stator 30 shown in FIGS. 10 and 11 differ from that of the stator 30 used in the rotating electric machine 10 according to the present embodiment. However, the same reference numbers are used for convenience.

As shown in FIG. 9, the U-phase coil 32U has a total of sixteen unit coils U1, U2, U3, . . . , U16 that are connected in series between the U-phase terminal T1 and the neutral point N. In a similar manner, the V-phase coil 32V has a total of sixteen unit coils V1, V2, V3, . . . , V16 that are connected in series between the V-phase terminal T2 and the neutral point N. The W-phase coil 32W has a total of sixteen unit coils W1, W2, W3, . . . , W16 that are connected in series between the W-phase terminal T3 and the neutral point N.

FIGS. 10 and 11 show an order of connection of the unit coils from the U-phase terminal T1 in the stator winding 32 in which parallel connection is not used and only serial connection is used. FIGS. 10 and 11 are diagrams of the order of connection of the plurality of unit coils in the stator core 31, from a plan view. In FIGS. 10 and 11, only the U-phase coil 32U is shown among the three phase coils 32U, 32V, and 32W. In addition, in FIGS. 10 and 11, for convenience of description, two stator cores 31 at a same orientation are shown on a left-hand side and a right-hand side. In both left-hand and right-hand drawings, numbers 1 to 48 are used as slot numbers, in order in a counter-clockwise direction.

Furthermore, in FIGS. 10 and 11, the order of connection is indicated by arrows with the U-phase terminal T1 as a starting point and the neutral point N as an end point. Among connection portions of each unit coil that connect over the predetermined slot pitch, the connection portion that is provided on a first end side of the stator 30 in the axial direction is indicated by a solid-line arrow. The connection portion that is provided on a second end side in the axial direction of the stator 30 is indicated by a broken-line arrow. Among arrow portions that are indicated by broken lines, the arrow portion that is shown so as to extend further towards the inner side or the outer side in the radial direction than the slot of the stator core 31 is the crossover portion that connects the unit coils. Although not shown, this similarly applies to configurations of the other phase coils, that is, the V-phase coil 32V and the W-phase coil 32W. Here, aspects of the drawings are also identical in similar drawings described below.

In the configuration in FIG. 10, as shown in the left-hand drawing, the unit coils U1 to U8 are arranged to be wound in a clockwise direction as a first revolution, with the U-phase terminal T1 as the starting point. In addition, as shown in the right-hand drawing, the unit coils U9 to U16 are arranged to be wound in the clockwise direction as a second revolution. In the present configuration, whereas the slot numbers of the slots in which the unit coils U1 to U8 of the first revolution are housed are 4, 46, 40, 34, . . . , the slot numbers of the slots in which the unit coils U9 to U16 are housed are 5, 47, 41, 35, . . . . The unit coils of the first revolution and the unit coils of the second revolution are arranged so as to be shifted by a single slot in the circumferential direction.

Furthermore, in the configuration in FIG. 11, as shown in the left-hand drawing, the unit coils U1 to U8 are arranged to be wound in the clockwise direction as the first revolution, with the U-phase terminal T1 as the starting point. In addition, as shown in the right-hand drawing, the unit coils U9 to U16 are arranged to be wound in the counter-clockwise direction as the second revolution. In the present configuration, the slot numbers of the slots in which the unit coils U1 to U8 of the first revolution are housed and the slot numbers of the slots in which the unit coils U9 to U16 of the second revolution are housed coincide, and are in both revolutions 5, 4, 47, 46, 41, 40, 35, 34, . . . .

Figure 12:
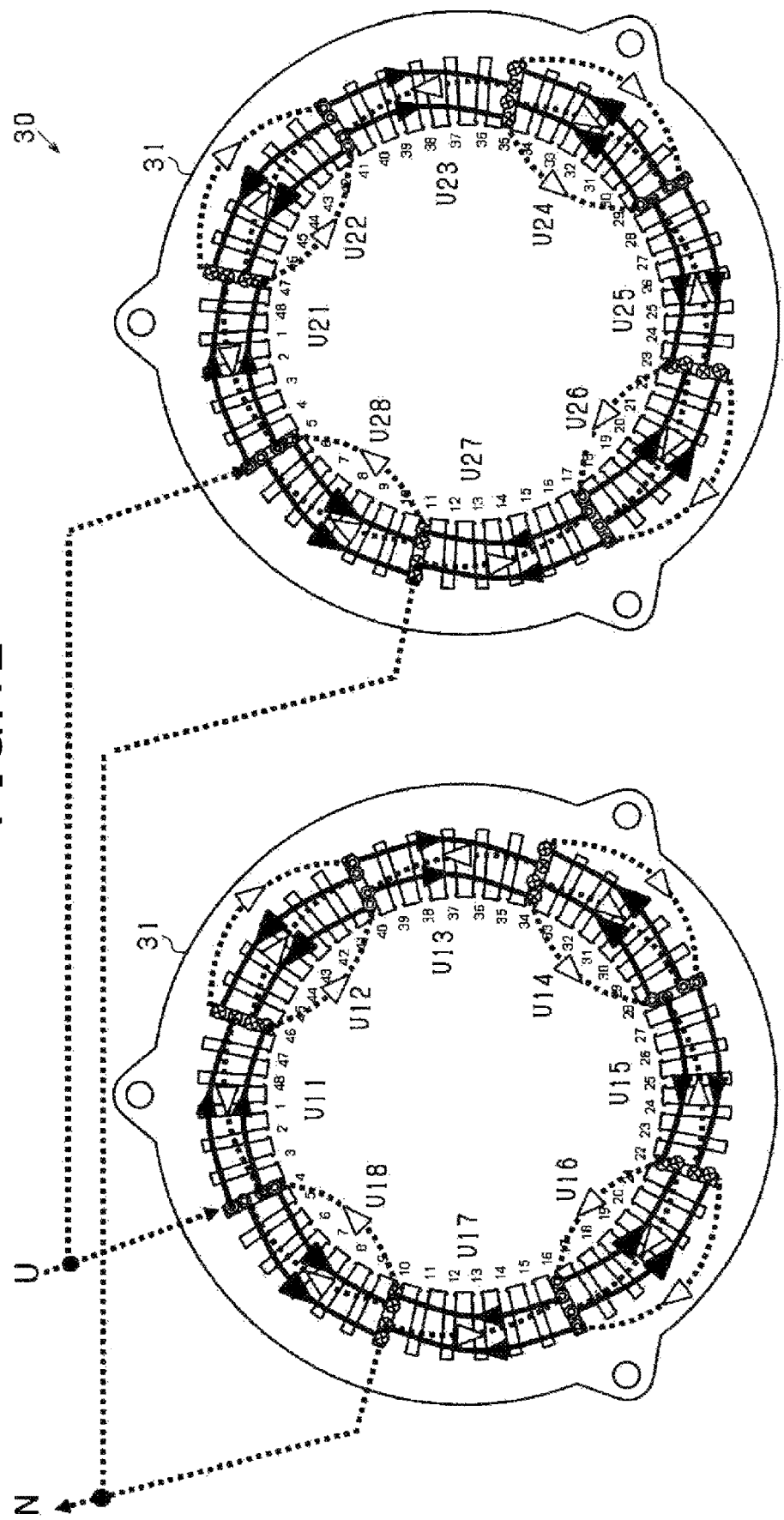
FIG. 12 is a diagram of a winding state of a parallel-connection stator winding.
Figure 13:
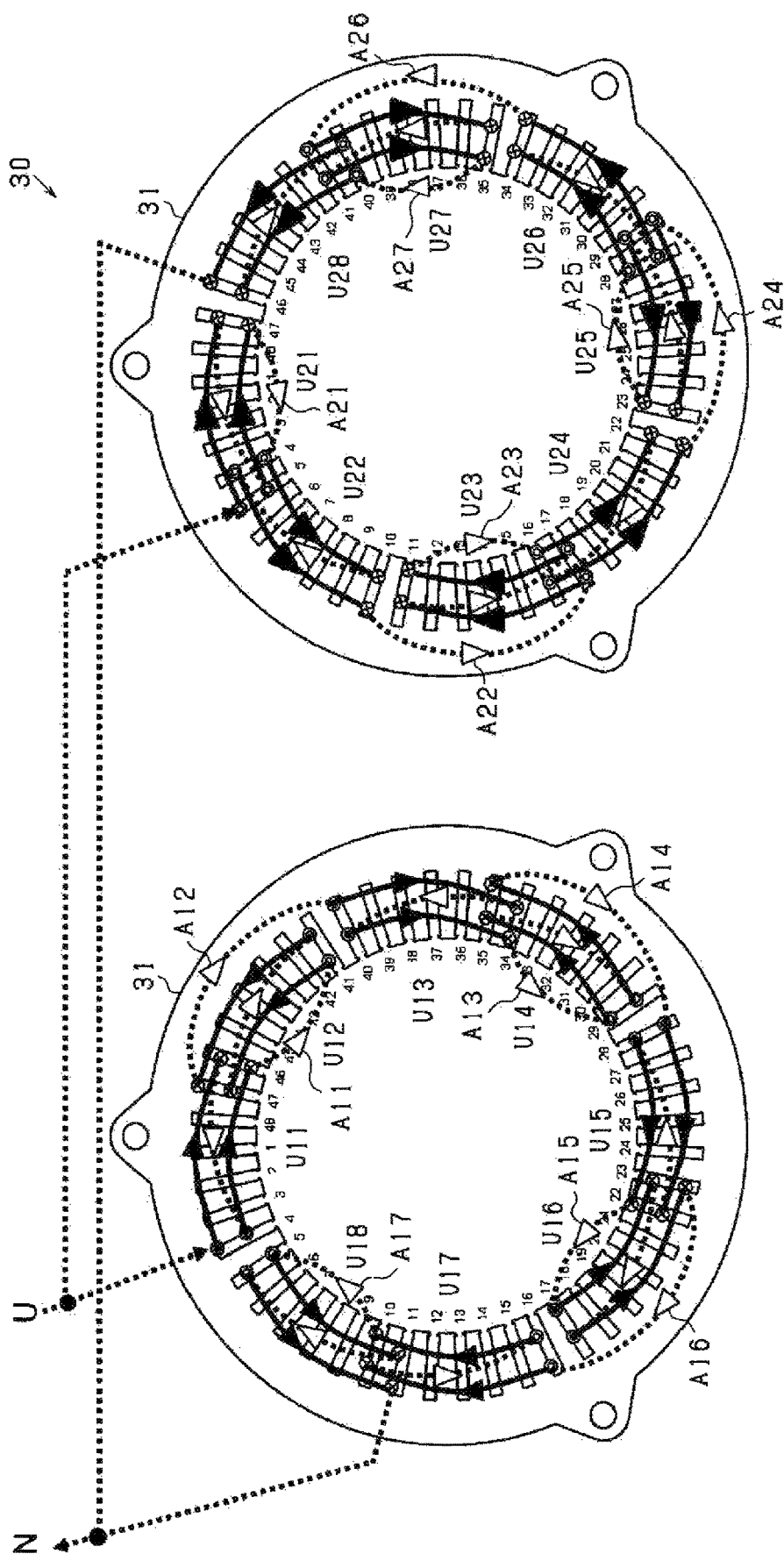
FIG. 13 is a diagram of a winding state of the parallel-connection stator winding.

Winding structures in FIGS. 10 and 11 in which the parallel connection is not used are simply changed to winding structures in which the parallel connection is used in FIGS. 12 and 13. The electrical configurations of the stator winding 32 shown in FIGS. 12 and 13 are both identical to that in FIG. 3B. The configuration is such that the two series-connection coil groups G1 and G2 are connected in parallel to each other. That is, in the configurations shown in FIG. 12 and FIG. 13, the U-phase coil 32U has the unit coils U11 to U18 as the series-connection coil group G1 and the unit coils U21 to U28 as the series-connection coil group G2.

Of the configurations, in the configuration in FIG. 12, as shown in the left-hand drawing, a first series-connection coil group G1 is arranged such that the unit coils U11 to U18 are wound in the clockwise direction with the U-phase terminal T1 as the starting point. In addition, as shown in the right-hand drawing, a second series-connection coil group G2 is arranged such that the unit coils U21 to U28 be wound in the clockwise direction with the U-phase terminal T1 as the starting point. In this case, whereas the slot numbers of the slots in which the unit coils U11 to U18 of the first series-connection coil group G1 are housed are 4, 46, 40, 34, . . . , the slot numbers of the slots in which the unit coils U21 to U28 of the second series-connection coil group G2 are housed are 5, 47, 41, 35, . . . . The unit coils 21 to U28 of the second series-connection coil group G2 are arranged so as to be shifted by a single slot in the circumferential direction from the unit coils U11 to U18 of the first series-connection coil group G1.

In this case, in the first and second series-connection coil groups G1 and G2, regarding all unit coils that correspond in terms of the order of connection from the phase terminal, housing slots that house these corresponding unit coils are shifted from each other by a single slot. As a result, a phase difference occurs between the induced voltage that is generated in the unit coils U11 to U18 of the series-connection coil group G1 and the induced voltage that is generated in the unit coils U21 to U28 of the series-connection coil group G2. Therefore, in the configuration in which the first and second series-connection coil groups G1 and G2 are connected in parallel, generation of a circulating current that does not contribute to the output becomes a concern. In this regard, the configuration in FIG. 12 has disadvantages.

Meanwhile, in the configuration in FIG. 13, as shown in the left-hand drawing, the first series-connection coil group G1 is arranged such that the unit coils U11 to U18 be wound in the clockwise direction with the U-phase terminal T1 as the starting point. In addition, as shown in the right-hand drawing, the second series-connection coil group G2 is arranged such that the unit coils U21 to U28 be wound in the counter-clockwise direction with the U-phase terminal T1 as the starting point. In this case, the slot numbers of the slots in which the unit coils U11 to U18 of the first series-connection coil group G1 are housed and the slot numbers of the slots in which the unit coils U21 to U28 of the second series-connection coil group G2 are housed coincide, and are in both cases 5, 4, 47, 46, 41, 40, 35, 34, . . . . Therefore, in the configuration in which the first and second series-connection coil groups G1 and G2 are connected in series, generation of the circulating current is suppressed.

In FIG. 13, in the first series-connection coil group G1, the unit coils U11 to U18 are connected in series by crossover portions A11 to A17. When viewed with the U-phase terminal T1 as the starting point, a crossover direction (corresponding to a winding direction in the circumferential direction) of all of the crossover portions A11 to A17 is the clockwise direction. In the second series-connection coil group G2, the unit coils U21 to U28 are connected in series by crossover portions A21 to A27. When viewed with the U-phase terminal T1 as the starting point, the crossover direction of all of the crossover portions A21 to A27 is the counter-clockwise direction.

A slot pitch of the unit coils U11 to U18 and a slot pitch of the unit coils U21 to U28 are both a six-slot pitch that is a slot pitch that amounts to a single magnetic pole. In addition, among the crossover portions A11 to A17 and A21 to A27, the crossover portions A11, A13, . . . , A21, A23, . . . and the like that are arranged on the inner side in the radial direction have a five-slot pitch. The crossover portions A12, A14, . . . , A22, A24, . . . and the like that are arranged on the outer side in the radial direction have a seven-slot pitch. When a magnetic pole pitch is generalized as a y-slot pitch, the crossover portions on the inner side in the radial direction are provided at a (y−1)-slot pitch and the crossover portions on the outer side in the radial direction are provided at a (y+1)-slot pitch. Here, a configuration of the crossover portions (the slot pitches of the crossover portions) may be that in which the slot pitch on the inner side in the radial direction and the slot pitch on the outer side in the radial direction are reversed from that described above.

Next, a principle behind an occurrence of maximum potential difference between coils will be described with reference to the configuration of parallel connection shown in FIG. 13.

A pulse width modulation (PWM) waveform on a rectangular wave that is outputted from the inverter contains frequency components of high frequencies that are equal to or higher than several hundred kHz. Stray capacitance between the stator core 31 and the stator winding 32, and stray capacitance between coils are present. A portion between coils act as a capacitor. Here, these stray capacitances are represented by stray capacitance C.

Figure 14A:
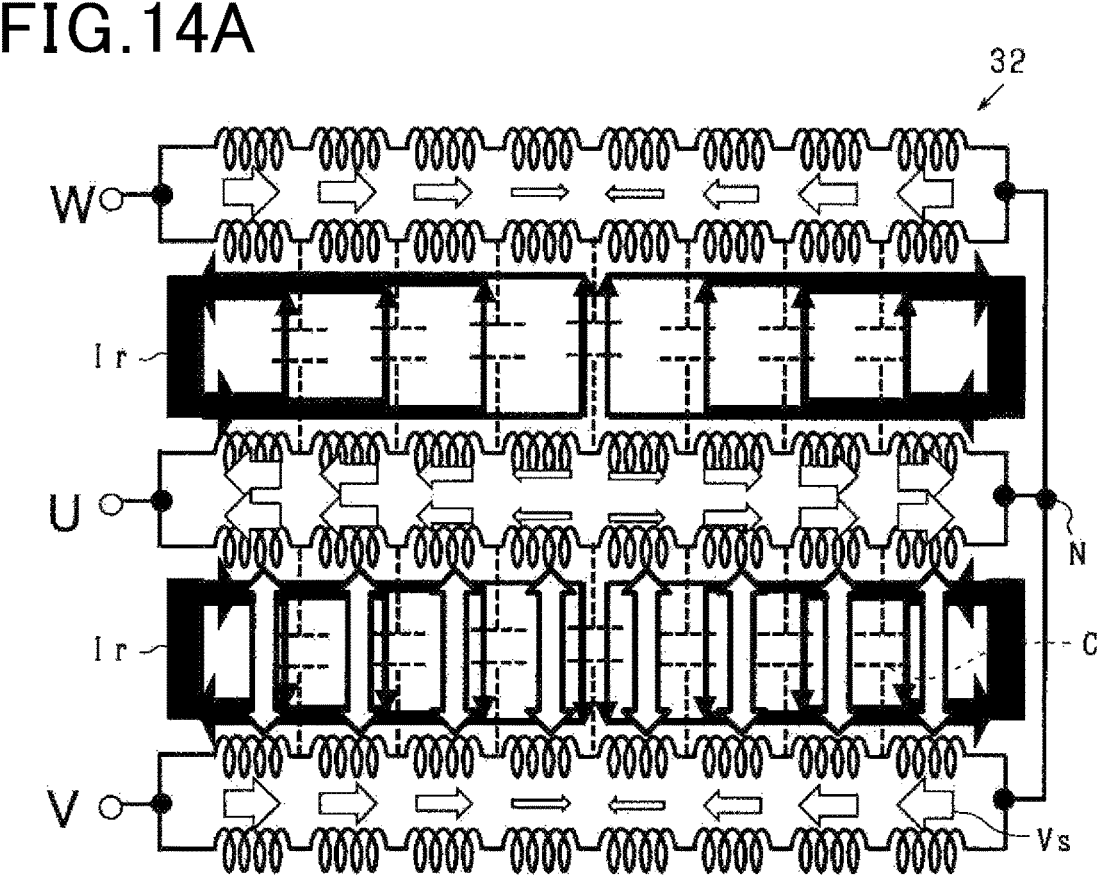
FIGS. 14A to 14C are diagrams for explaining a resonance current and a surge voltage in phase coils.

At the instant the inverter performs switching, a resonance phenomenon occurs in the phase coils 32U, 32V and 32W as a result of coil inductance and the stray capacitance between the stator core 31 and the stator winding 32. At this time, the resonance phenomenon can be considered to occur in opposite directions between the unit coils of differing numbers in the order of connection from the phase terminal of each phase, and an increase in voltage difference (shared voltage) between unit coils as a result thereof. This principle will be described with reference to FIGS. 14A to 14C. Here, reference numbers are omitted in FIG. 14A. However, the winding structure shown in FIG. 14A is identical to that in FIG. 3B. Here, issues encompassed by the stator winding 32 that has a configuration of two-parallel connection will be described.

As shown in FIG. 14A, at the instant the inverter performs switching, a resonance current Ir (surge current) flows to each unit coil through the stray capacitance C, and the resonance phenomenon occurs. Here, an orientation of an arrow in FIG. 14A indicates a direction of the resonance current Ir. A thickness of the arrow indicates a magnitude of the resonance current Ir.

At this time, symmetrical resonance currents Ir flow through the unit coils on the phase terminal side of each phase and the unit coils on the neutral point N side. That is, the direction in which the current flows is opposite between the resonance current Ir that flows to the unit coils on the phase terminal side and the resonance current Ir that flows to the unit coils on the neutral point N side. In addition, the resonance current Ir increases towards the phase terminal and the neutral point N. The resonance current Ir is zero at an intermediate point between the phase terminal and the neutral point N. In FIG. 14A, the surge voltage Vs that is generated by the resonance current Ir is indicated by an arrow. A direction and a thickness of the arrow respectively correspond to an orientation (polarity or application direction) of the surge voltage Vs and a magnitude of the surge voltage Vs.

Figure 14B:
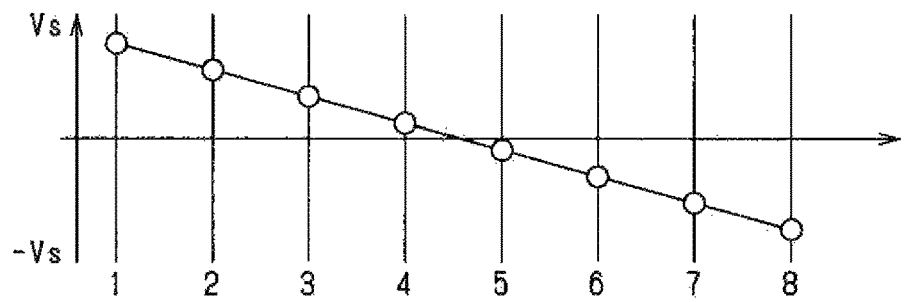

FIG. 14B shows the surge voltage Vs at each unit coil of the V phase. In this case, the direction of the resonance current Ir differs between the unit coils on the phase terminal side and the unit coils on the neutral point N side. Therefore, the polarity of the surge voltage Vs differs. Here, the orientation of the surge voltage Vs that is generated between the unit coils is opposite between the U-phase coil 32U and the V-phase coil 32V.

Figure 14C:
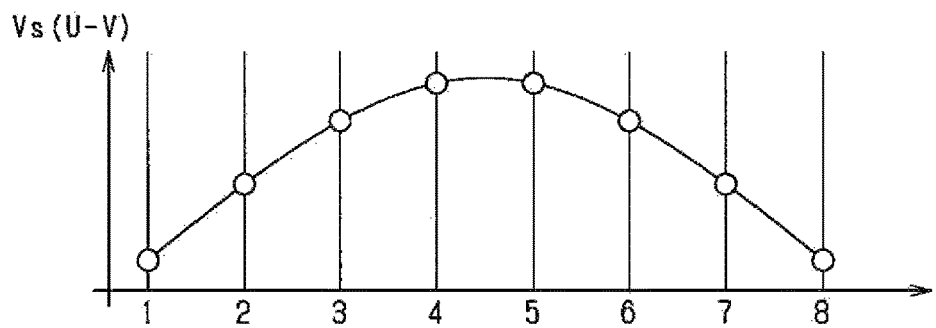

As described above, when the surge voltage Vs is generated in the phase coils, for example, between the U-phase coil 32U and the V-phase coil 32V, a resonance voltage that made of a total sum of the surge voltages Vs at the unit coils of the U-phase coil 32U and the V-phase coil 32V is generated. The resonance voltage is obtained by the surge voltage Vs of the U-phase coil 32U and the surge voltage Vs of the V-phase coil 32V being added. The resonance voltage is generated between the phase terminal and the neutral point N as shown in FIG. 14C, and is at maximum at an intermediate point between the phase terminal and the neutral point N. This is primary resonance that is generated at the lowest frequency in the resonance phenomenon. That is, between the phase terminal and the neutral point N, primary resonance in which the phase terminal and the neutral point N are nodes and the intermediate point between the phase terminal and the neutral point N is an antinode is generated between the phase terminal and the neutral point N.

To achieve suppression of resonance in the stator winding 32, the rotating electric machine 10 according to the present embodiment is configured such that respective first ends in the circumferential direction of the unit coils in which the surge voltages that are in differing directions from each other are generated are housed in a same slot or adjacent slots. Hereafter, as a configuration that is suitable for suppressing the primary resonance, the configuration in FIG. 13 described above will be described again.

In the configuration in FIG. 13, in the first series-connection coil group G1, the unit coils U11 to U18 are arranged so as to be wound in the clockwise direction. In the second series-connection coil group G2, the unit coils U21 to U28 are arranged so as to be wound in the counter-clockwise direction.

Here, slot housing positions of the unit coils will be described with reference to FIGS. 15A and 15B. Here, when the series-connection coil groups G1 and G2 are divided into four from the U-phase terminal T1 to the neutral point N, the series-connection coil groups G1 and G2 have a first coil group Ua that includes the unit coils U11, U12, U21, and U22, a second coil group Ub that includes the unit coils U13, U14, U23, and U24, a third coil group Uc that includes the unit coils U15, U16, U25, and U26, and a fourth coil group Ud that includes the unit coils U17, U18, U27, and U28.

Figures 15A, 15B:
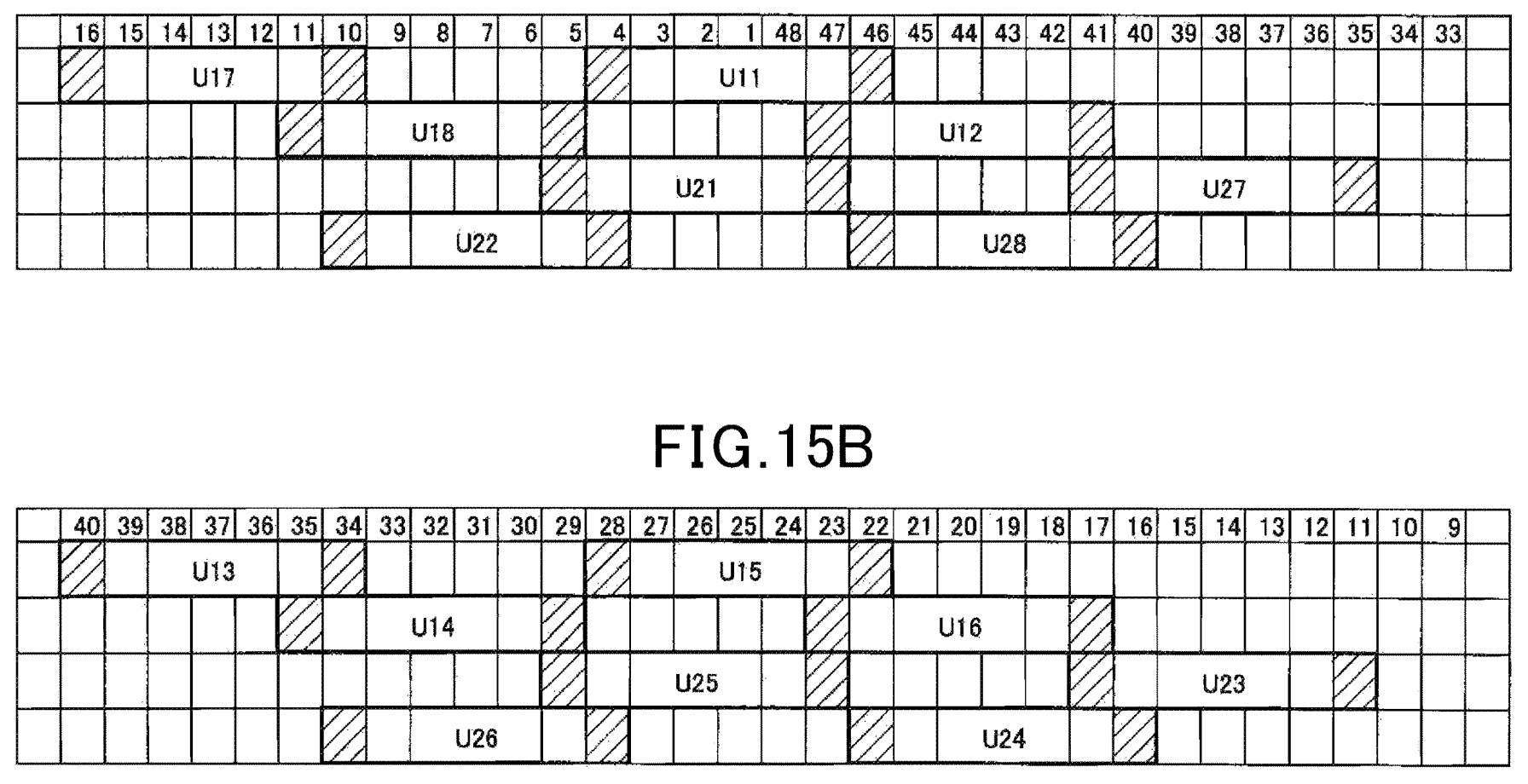

FIG. 15A is a diagram of the slot housing positions of the unit coils in the first coil group Ua and the fourth coil group Ud. FIG. 15B is a diagram of the slot housing positions of the unit coils in the second coil group Ub and the third coil group Uc. In these drawings, a slot that is in a conducting-wire housing position of each unit coil is shaded by hatching.

As shown in FIG. 15A and FIG. 15B, in the U-phase coil 32U, when a k-th unit coil in the order of connection from the U-phase terminal T1 and a k-th unit coil in the order of connection from the neutral point N are considered to be symmetrical coils, the configuration is such that at least respective first ends in the circumferential direction of the symmetrical coils from the U-phase terminal T1 to the neutral point N are housed in slots of the same phase within the same magnetic pole.

Specifically, when k=1, the symmetrical coils are the combination of: (i) the unit coils U11 and U21; and (ii) the unit coils U18 and U28. In this case, respective first ends in the circumferential direction of the unit coil U11 and the unit coil U28 are housed in the same 46th slot. Respective first ends in the circumferential direction of the unit coil U21 and the unit coil U18 are housed in the same 5th slot. Furthermore, in addition, respective first ends in the circumferential direction of the unit coils U11 and U18 are housed in adjacent 4th and 5th slots. Respective first ends in the circumferential direction of the unit coils U21 and U28 are housed in adjacent 46th and 47th slots.

When k=2, the symmetrical coils are the combination of: (i) the unit coils U12 and U22; and (ii) the unit coils U17 and U27. In this case, respective first ends in the circumferential direction of the unit coil U12 and the unit coil U27 are housed in the same 41st slot. Respective first ends in the circumferential direction of the unit coil U22 and the unit coil U17 are housed in the same 10th slot.

When k=3, the symmetrical coils are the combination of: (ii) the unit coils U13 and U23; and (ii) the unit coils U16 and U26. In this case, respective first ends in the circumferential direction of the unit coil U13 and the unit coil U26 are housed in the same 34th slot. Respective first ends in the circumferential direction of the unit coil U23 and the unit coil U16 are housed in the same 17th slot.

When k=4, the symmetrical coils are the combination of: (i) the unit coils U14 and U24; and (ii) the unit coils U15 and U25. In this case, respective first ends in the circumferential direction of the unit coil U14 and the unit coil U25 are housed in the same 29th slot. Respective first ends in the circumferential direction of the unit coil U24 and the unit coil U15 are housed in the same 22nd slot.

Figure 16:
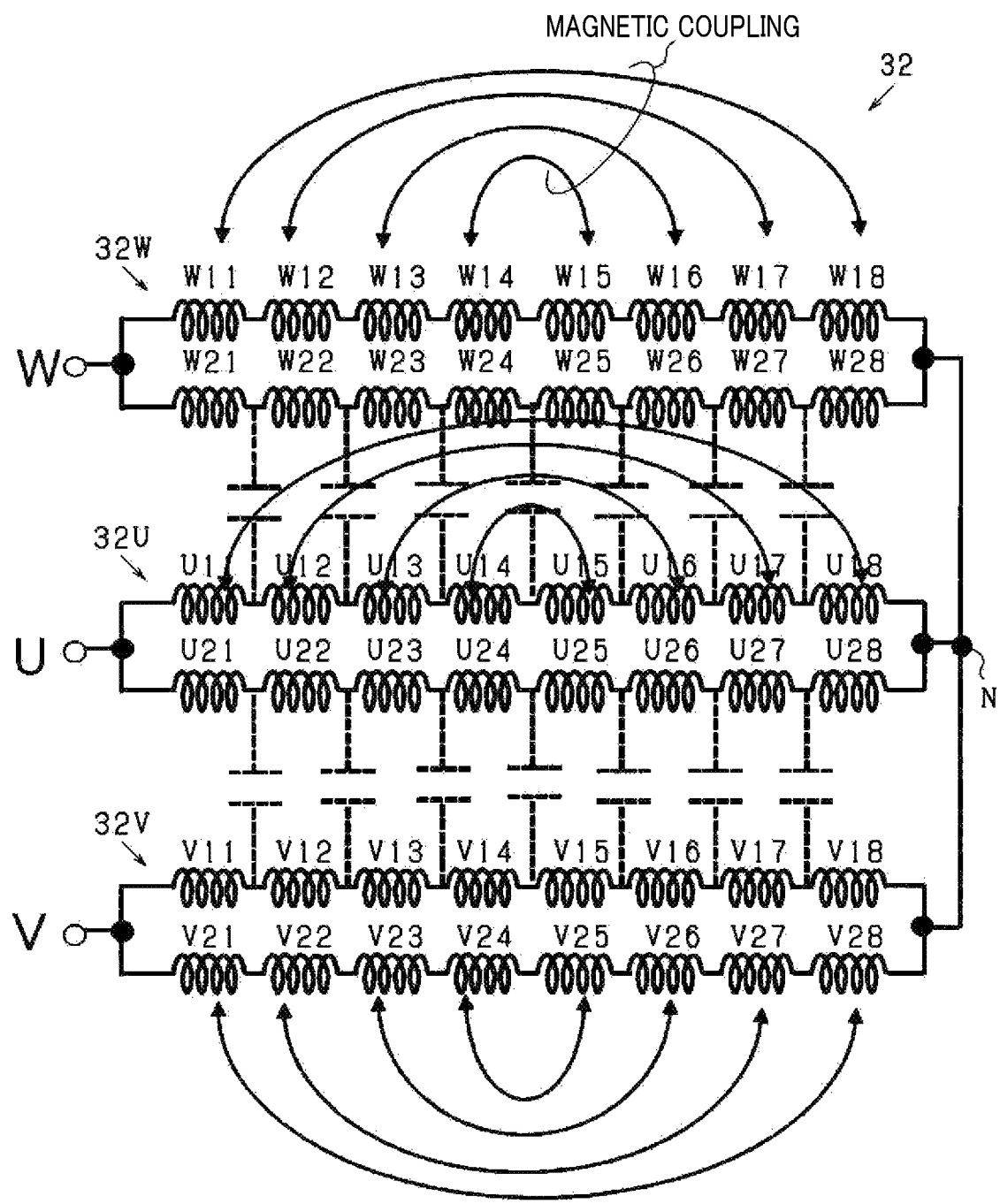
FIG. 16 is a diagram of an electrical configuration of the phase coils.

As a result of the unit coils being arranged as described above, as shown in FIG. 16, mutual magnetic coupling can occur between the coils that are housed in the same slot. The surge voltage that is generated in a primary resonance phenomenon can be reduced. That is, the surge voltage that is generated as a result of the primary resonance is symmetrical between the phase terminal side and the neutral point N side, and the polarities are opposite each other. However, as a result of magnetic coupling occurring between the phase terminal side and the neutral point N side, the surge voltage is transmitted between the phase terminal side and the neutral point N side by electromagnetic induction, based on the principles of a transformer. As a result, the surge voltage is reduced.

Figure 17A:
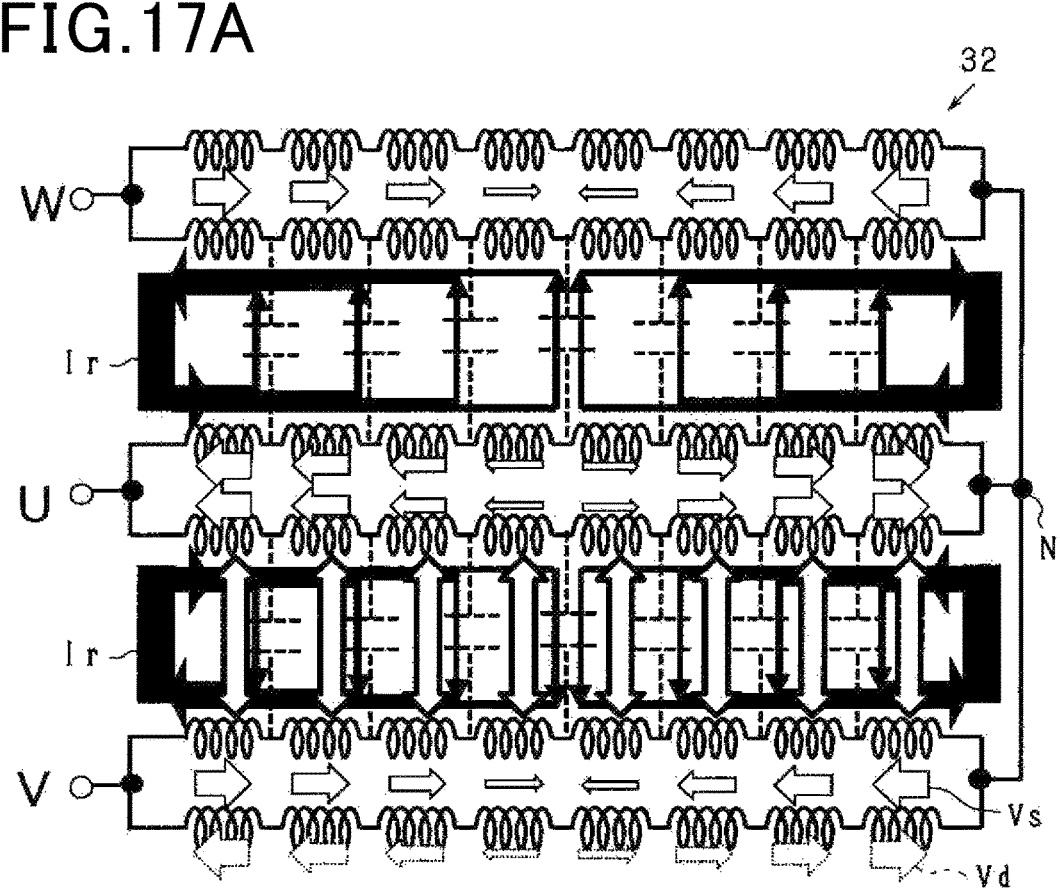
FIGS. 17A to 17C are diagrams for explaining the resonance current and the surge voltage in the phase coils.
Figure 17B:
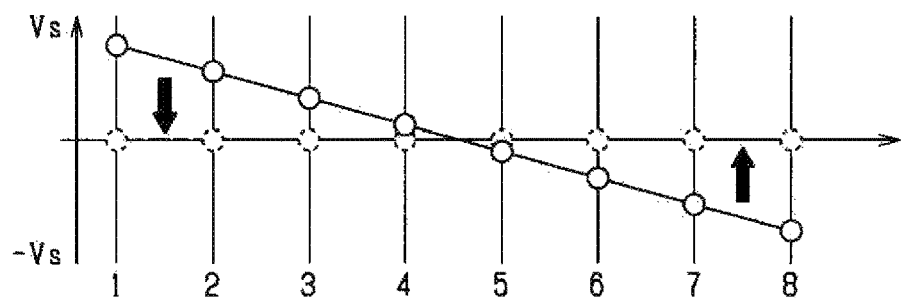
Figure 17C:
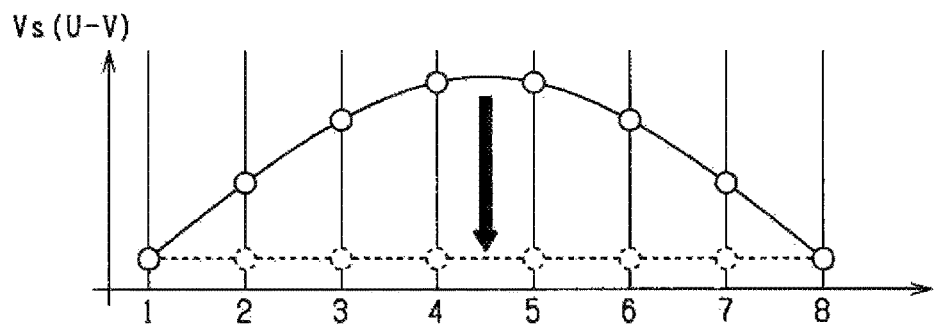

In FIG. 17A, an induced voltage Vd that is generated as a result of magnetic coupling between the phase terminal side and the neutral point N side is indicated by a broken-line arrow. The induced voltage Vd is generated between the unit coils that are in positions that are symmetrical to each other between the phase terminal and the neutral point N (that is, between the unit coils that compose the symmetrical coils). As a result, as shown in FIG. 17B, a voltage in a direction opposite the surge voltage Vs that is generated in the unit coils is induced. An effect of suppressing the surge voltage that is generated between coils is achieved. Furthermore, the resonance voltage is reduced as shown in FIG. 17C.

The configuration shown in FIG. 13 is such that, in the U-phase coil 32U, a first end in the circumferential direction of an i-th unit coil from the U-phase terminal T1 and respective first ends in the circumferential direction of an (i−1)-th unit coil and an (i+1)-th unit coil are housed in slots of the same phase within the same magnetic pole. In addition, respective both first and second ends in the circumferential direction of the (i−1)-th unit coil and the (i+1)-th unit coil are housed in slots of the same phase within the same magnetic pole. Here, when the number of series-connection coils from the phase terminal to the neutral point N is n, i is a natural number that is any of 1 to n, where the n-th unit coil is immediately before the 1st unit coil, and the 1st unit coil is immediately after the n-th unit coil.

The i-th unit coil, the (i−1)-th unit coil, and the (i+1)-th unit coil can be defined in the following manner, when the number of series-connection coils from the phase terminal to the neutral point N is n and i is a natural number that is any of 1 to n. That is, among the i-th, (i−1)-th, and (i+1)-th unit coils, the (i+1)-th unit coil can be defined as an (α+1)-th unit coil (α being a remainder of i divided by n) and the (i−1)-th unit coil can be defined as a (β+1)-th unit coil (β being a remainder of i−2 divided by n).

Specifically, as shown in FIGS. 15A and 15B, when i=5, on a first end side (left end side in the drawings) in the circumferential direction of the unit coil U15 that is the fifth unit coil from the U-phase terminal T1, the first end of the unit coil U15 and the respective first ends in the circumferential direction of the unit coils U14 and U26 that are the fourth and sixth unit coils are housed in slots of the same phase within the same magnetic pole. In addition, respective both first and second ends in the circumferential direction of the unit coils U14 and U26 are housed in slots of the same phase within the same magnetic pole.

In a similar manner, on a second end side (right end side in the drawings) in the circumferential direction of the unit coil U15, the second end of the unit coil 15 and respective first ends in the circumferential direction of the unit coils U24 and U16 that are the fourth and sixth unit coils are housed in slots of the same phase within the same magnetic pole. In addition, respective both first and second ends in the circumferential direction of the unit coils U24 and U16 are housed in slots of the same phase within the same magnetic pole. Here, the foregoing description regarding the unit coil 15 similarly applies to the unit coil U25 that is also the fifth unit coil from the U-phase terminal T1.

In the rotating electric machine 10, a winding structure that is similar to that in FIG. 13 may be used for the V-phase coil 32V and the W-phase coil 32W, other than the U-phase coil 32U, as well. As a result, the primary resonance is appropriately suppressed in the phase coil of each phase.

Moreover, the inventors of the present invention have newly found that the above-described resonance phenomenon occurs at a plurality of frequencies in differing resonance modes, even in a same rotating electric machine. Hereafter, secondary resonance that is generated at a frequency that is approximately twice a primary resonance frequency will be described.

Figure 18A:
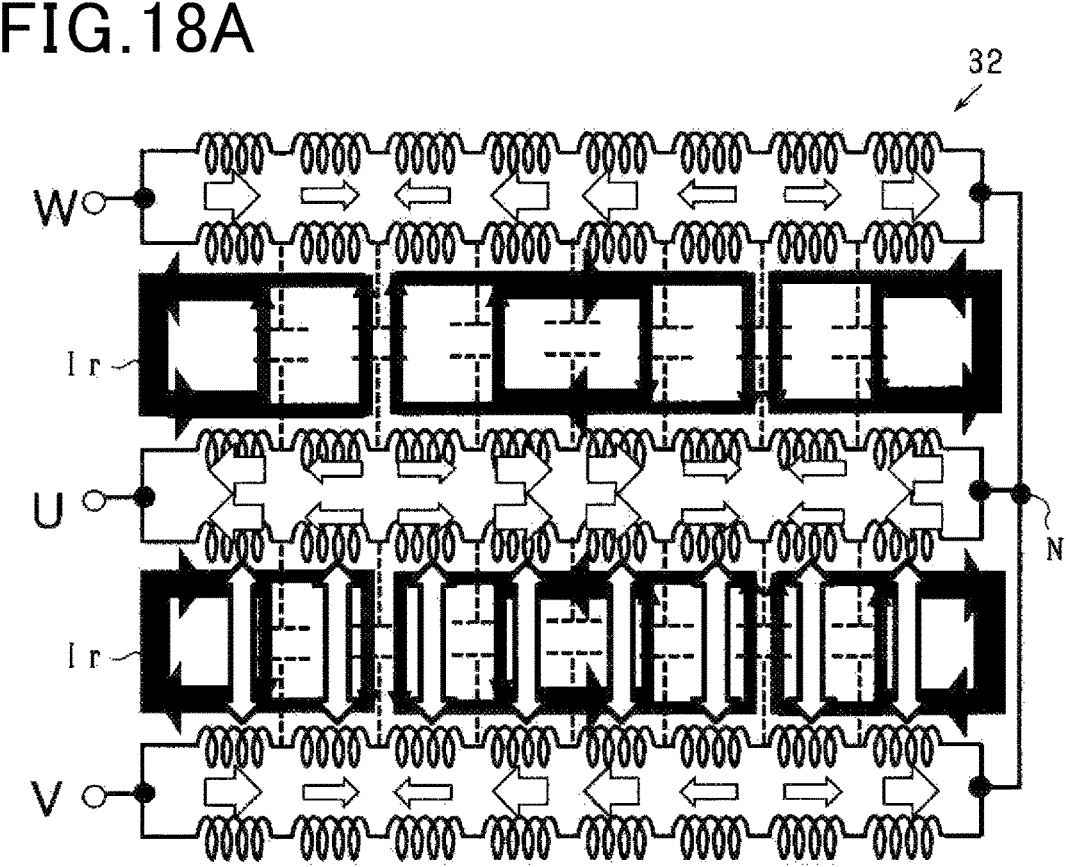
FIGS. 18A to 18C are diagrams for explaining the resonance current and the surge voltage in the phase coils.

The secondary resonance is generated at a resonance period that is half that of the primary resonance. As shown in FIG. 18A, the secondary resonance is generated as a result of the resonance currents Ir that are symmetrical between a half (left half) on the phase terminal side and a half (right half) on the neutral point N side flowing between the phase point and the neutral point N.

Figure 18B:
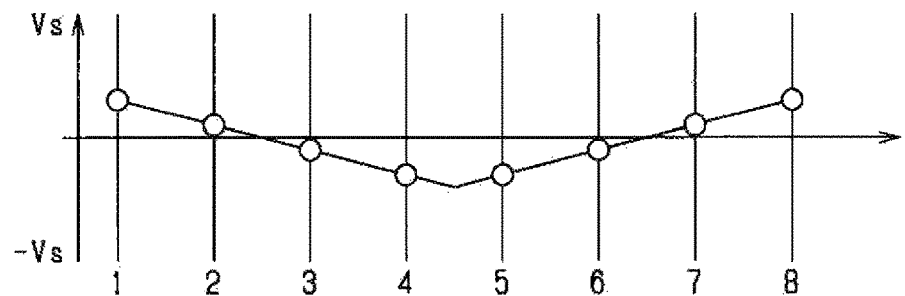
Figure 18C:
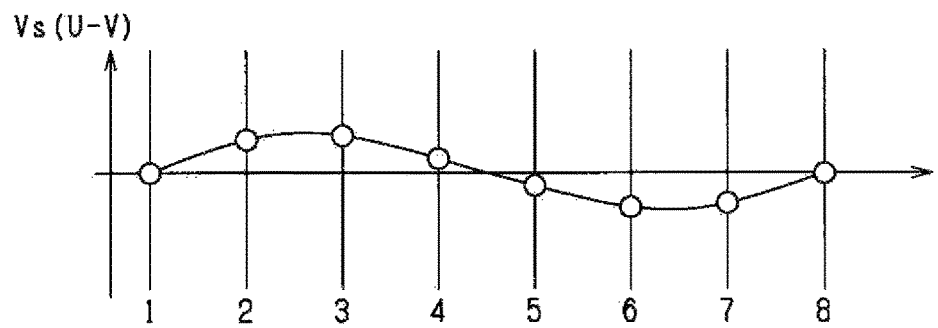

In this case, as shown in FIG. 18B, the surge voltage Vs is generated in opposite directions between the half on the phase terminal side and the half on the neutral point N side. In addition, as shown in FIG. 18C, the resonance voltage is generated between the phase terminal and the neutral point N. Maximum values of the resonance voltage on a positive side and a negative side are reached at a position that is one-fourth of the way between the phase terminal and the neutral point N and a position that is three-fourths of the way between the phase terminal and the neutral point N.

Figure 19A:
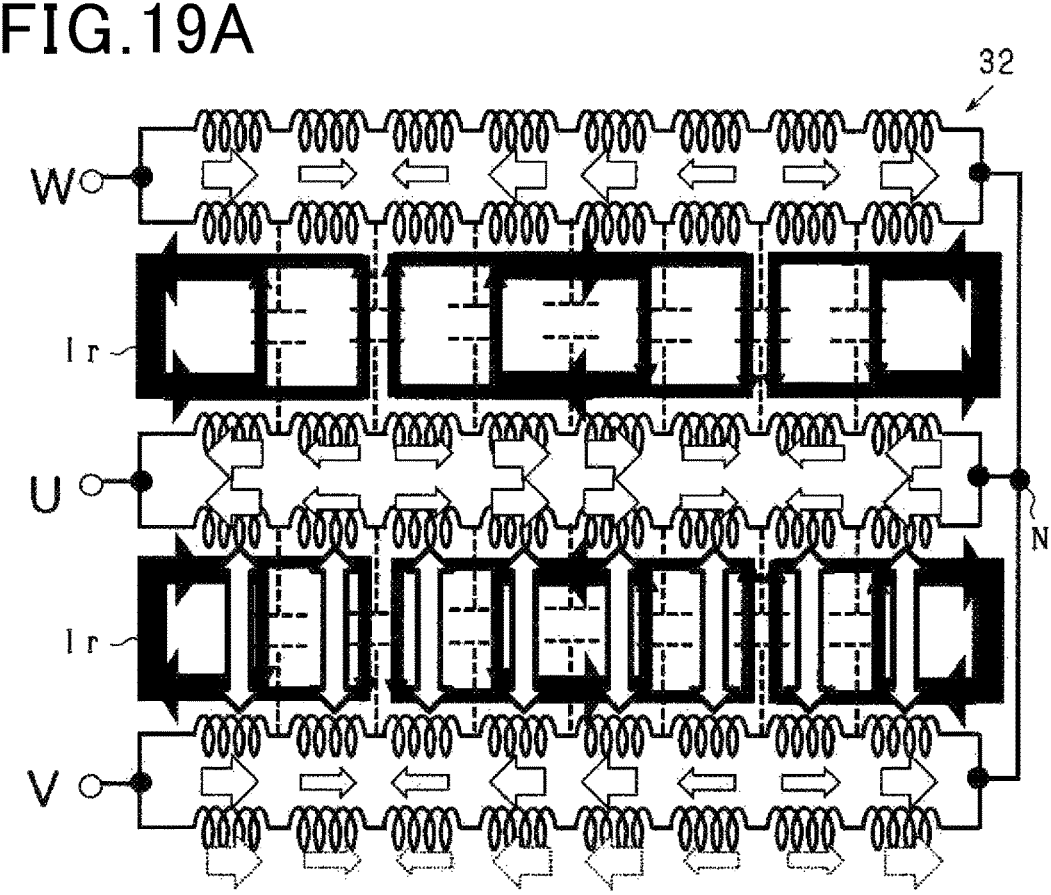
FIGS. 19A to 19C are diagrams for explaining the resonance current and the surge voltage in the phase coils.
Figure 19B:
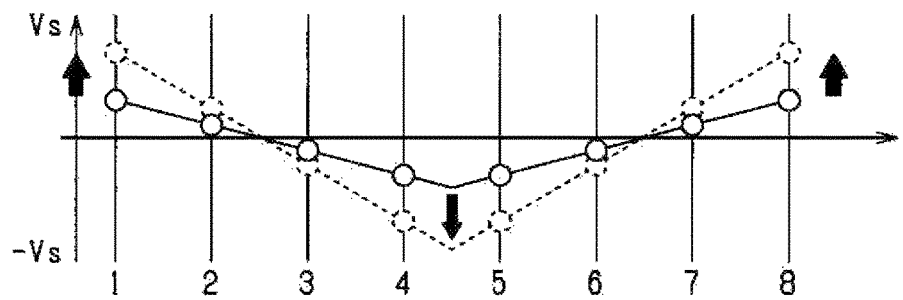
Figure 19C:
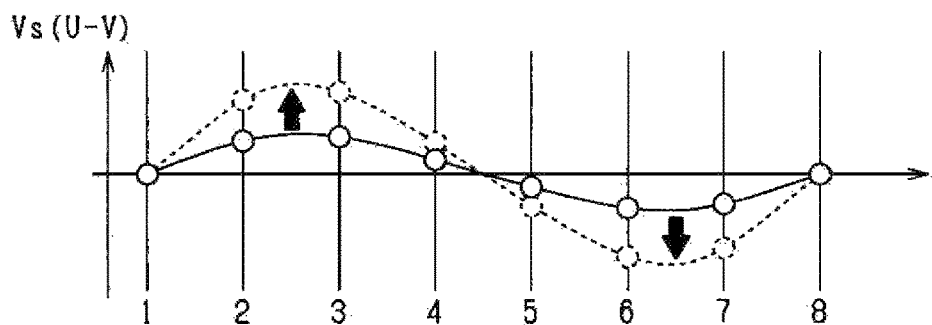

Here, under conditions of the secondary resonance, as shown in FIG. 19B, as a result of a voltage in the same direction as the surge voltage that is generated in each of the series-connection coil groups being induced, the surge voltage that is generated between the unit coils being amplified can be considered. In this case, even when the surge voltage that is generated as a result of the primary resonance is suppressed, the surge voltage that is generated as a result of the secondary resonance is amplified. Therefore, the surge voltage that is generated as a result of the secondary resonance becomes dominant, and increase in the maximum voltage between coils becomes a concern.

Figure 20:
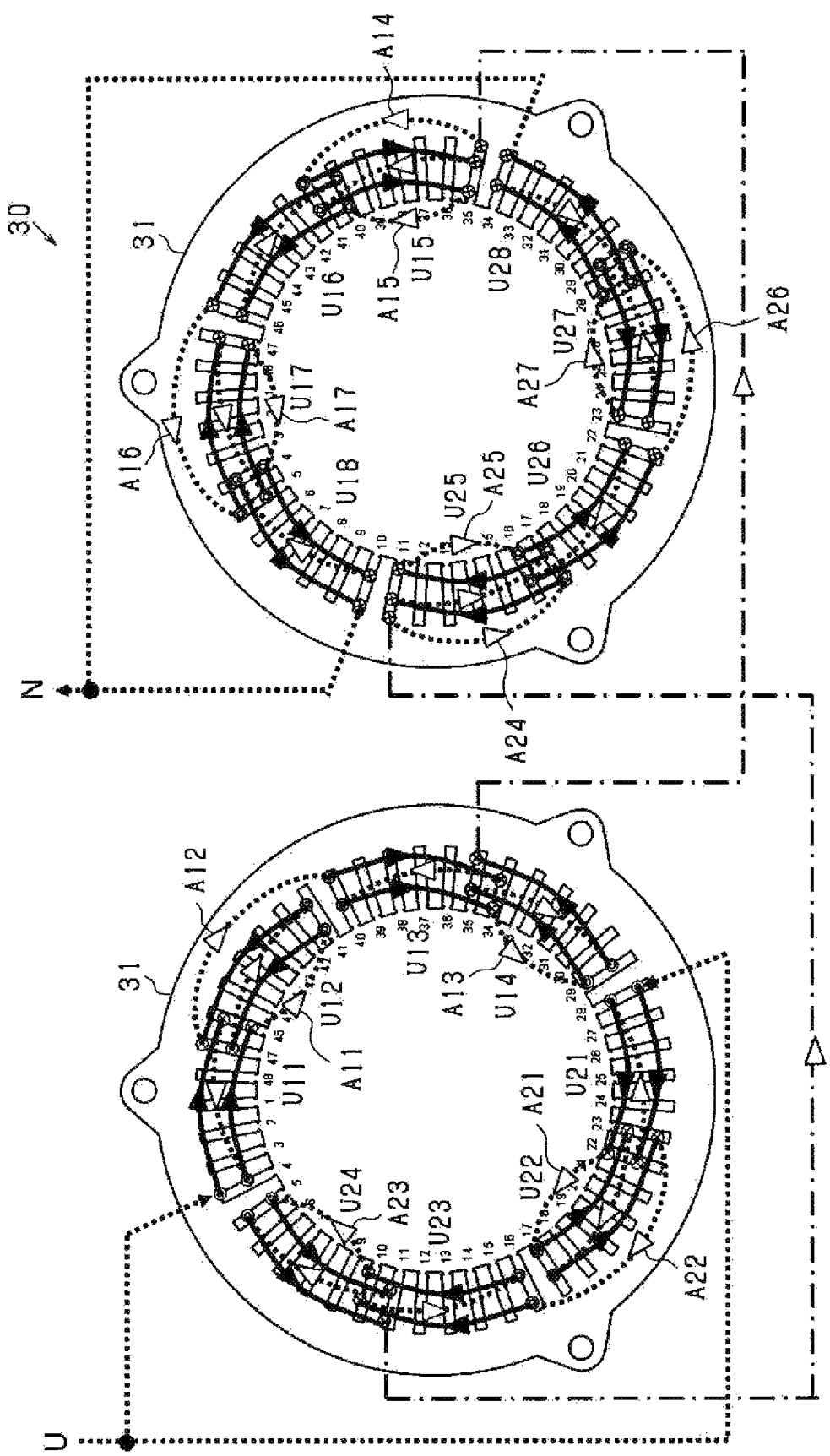
FIG. 20 is a diagram of a winding state of the parallel-connection stator winding.

A configuration that is suitable for enabling suppression of the secondary resonance is a configuration shown in FIG. 20.

In the configuration in FIG. 20, in a manner similar to that in FIG. 13 described above, the U-phase coil 32U has the unit coils U11 to U18 as the first series-connection coil group G1, and the unit coils U21 to U28 as the second series-connection coil group G2. In addition, as a difference with the configuration in FIG. 13, in the series-connection coil groups G1 and G2, the unit coils are arranged to be wound in such a manner that the unit coils of each of the first and second series-connection coil groups G1 and G2 fold back in the circumferential direction at a position that is midway in terms of the order of connection from the U-phase terminal T1.

Specifically, in the first series-connection coil group G1, the unit coils U11 to U14 are arranged to be wound in the clockwise direction. The remaining unit coils U15 to U18 are arranged to be wound in the counter-clockwise direction. In addition, in the second series-connection coil group G2, the unit coils U21 to U24 are arranged to be wound in the clockwise direction. The remaining unit coils U25 to U28 are arranged to be wound in the counter-clockwise direction.

In this case, the first and second series-connection coil groups G1 and G2 includes the unit coils that is wound on the first side in the circumferential direction with the U-phase terminal T1 as the starting point, and the unit coils that is wound on the second side in the circumferential direction. In addition, the first and second series-connection coil groups G1 and G2 are each provided over a circumferential-direction region that is less than a single revolution around the stator core 31. The series-connection coil groups that differ from each other are arranged so as to be arrayed in the circumferential direction.

In the configuration in FIG. 20, the crossover portion is provided in the following manner. When viewed with the U-phase terminal T1 as the starting point, in the series-connection coil group G1, the crossover direction of the crossover portions A11 to A13 is the clockwise direction. The crossover direction of the crossover portions A14 to A17 is the counter clockwise direction. In this case, the crossover portion A14 is a reverse crossover portion in which the crossover direction is reversed in relation to that of the preceding crossover portion A13. In addition, in the series-connection coil group G2, the crossover direction of the crossover portions A21 to A23 is the clockwise direction. The crossover direction of the crossover portions A24 to A27 is the counter clockwise direction. In this case, the crossover portion A24 is a reverse crossover portion in which the crossover direction is reversed in relation to that of the preceding crossover portion A23.

The slot pitch of the unit coils U11 to U18 and the slot pitch of the unit coils U21 to U28 are both a six-slot pitch that is a slot pitch that amounts to a single magnetic pole. In addition, among the crossover portions A11 to A17 and A21 to A27, the crossover portions A11, A13, . . . , A21, A23, . . . and the like that are arranged on the inner side in the radial direction have a five-slot pitch. The crossover portions A12, A14, . . . , A22, A24, . . . and the like that are arranged on the outer side in the radial direction have a six- or seven-slot pitch.

Figures 21A, 21B:
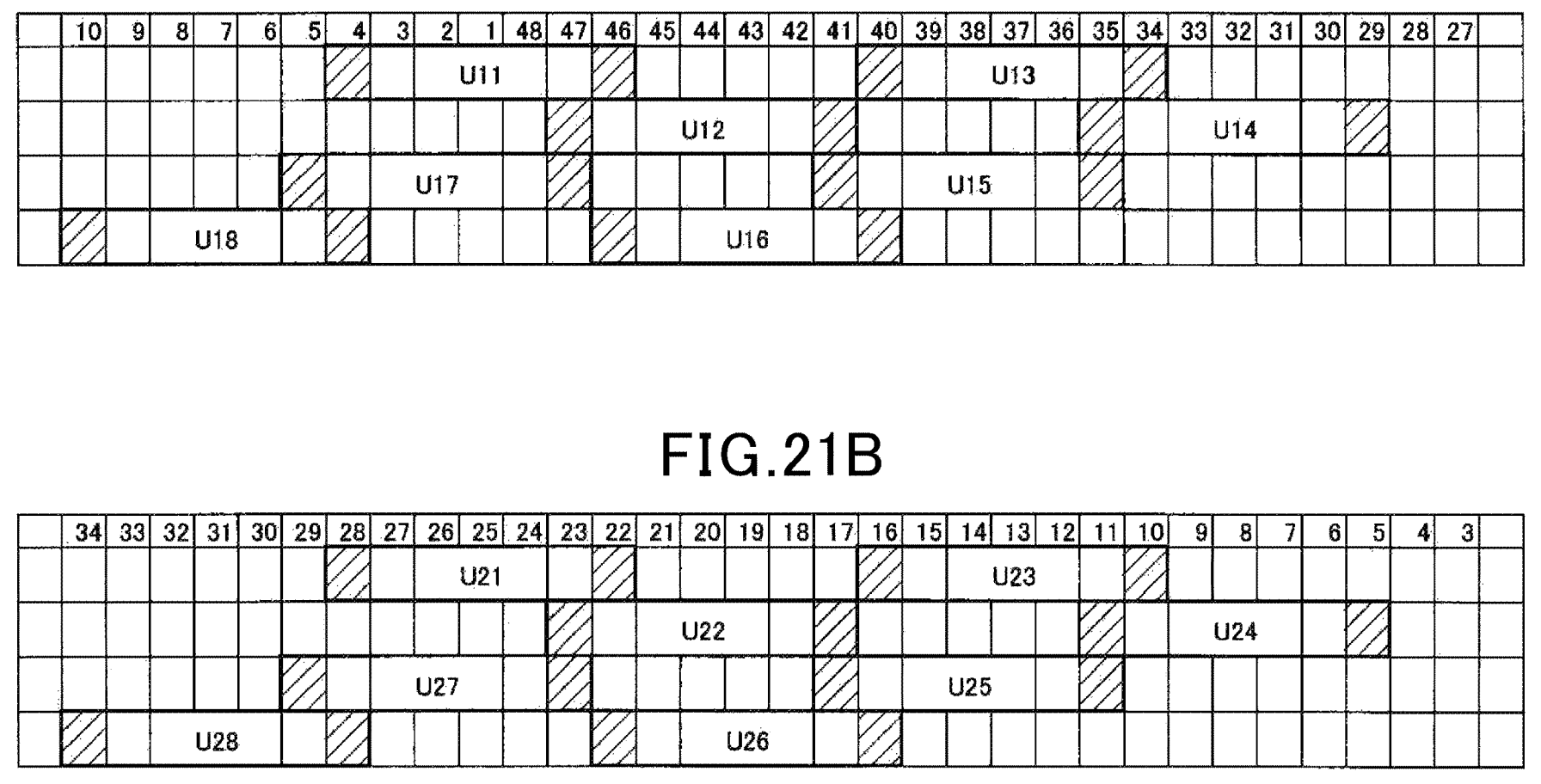

The slot housing positions of the unit coils will be described with reference to FIGS. 21A and 21B. FIG. 21A is a diagram of the slot housing positions of the unit coils in the series-connection coil group G1. FIG. 21B is a diagram of the slot housing positions of the unit coils in the series-connection coil group G2.

As shown in FIGS. 21A and 21B, in the U-phase coil 32U, when a k-th unit coil in the order of connection from the U-phase terminal T1 and a k-th unit coil in the order of connection from the neutral point N are considered to be symmetrical coils, the configuration is such that respective first ends in the circumferential direction of the symmetrical coils from the U-phase terminal T1 to the neutral point N are housed in slots of the same phase within the same magnetic pole.

Specifically, when k=1, the symmetrical coils are the combination of: (i) the unit coils U11 and U21; and (ii) the unit coils U18 and U28. In this case, respective first ends in the circumferential direction of the unit coil U11 and the unit coil U18 are housed in the same 4th slot. Respective first ends in the circumferential direction of the unit coil U21 and the unit coil U28 are housed in the same 28th slot.

When k=2, the symmetrical coils are the combination of: (i) the unit coils U12 and U22; and (ii) the unit coils U17 and U27. In this case, respective first ends in the circumferential direction of the unit coil U12 and the unit coil U17 are housed in the same 47th slot. Respective first ends in the circumferential direction of the unit coil U22 and the unit coil U27 are housed in the same 23rd slot.

When k=3, the symmetrical coils are the combination of: (i) the unit coils U13 and U23; and (ii) the unit coils U16 and U26. In this case, respective first ends in the circumferential direction of the unit coil U13 and the unit coil U16 are housed in the same 40th slot. Respective first ends in the circumferential direction of the unit coil U23 and the unit coil U26 are housed in the same 16th slot.

When k=4, the symmetrical coils are the combination of: (i) the unit coils U14 and U24; and (ii) the unit coils U15 and U25. In this case, respective first ends in the circumferential direction of the unit coil U14 and the unit coil U15 are housed in the same 35th slot. Respective first ends in the circumferential direction of the unit coil U24 and the unit coil U25 are housed in the same 11th slot.

The arrangements of the unit coils shown in FIGS. 21A and 21B form a configuration that can contribute to suppression of the primary resonance.

In addition, in the configuration in FIG. 20, the secondary resonance can be suppressed as a result of a configuration described below being provided. Here, with a center position between the U-phase terminal T1 and the neutral point N in each of the series-connection coil groups G1 and G2 as the intermediate point, the four (n/2 coils, n being an even number) unit coils (U11 to U14 and U12 to U24) from the U-phase terminal T1 to the intermediate point are a first-half coil group and the four (n/2 coils) unit coils (U15 to U18 and U25 to U28) from the neutral point N to the intermediate point are a second-half coil group.

Furthermore, in the first-half coil group, when an m-th unit coil in the order of connection from the U-phase terminal T1 and an m-th unit coil in the order of connection from the intermediate point are considered to be first symmetrical coils, the configuration is such that at least respective first ends in the circumferential direction of the first symmetrical coils that are present from the U-phase terminal T1 to the intermediate point are housed in slots of the same phase within the same magnetic pole. In addition, in the second-half coil group, when an m-th unit coil in the order of connection from the neutral point N and an m-th unit coil in the order of connection from the intermediate point are considered to be second symmetrical coils, the configuration is such that at least respective first ends in the circumferential direction of the second symmetrical coils that are present from the neutral point N to the intermediate point are housed in slots of the same phase within the same magnetic pole.

A specific configuration of the foregoing configuration will be described with reference to FIGS. 21A and 21B.

In the first-half coil group, when m=1, the first symmetrical coils are the combination of: (i) the unit coils U11 and U21; and (ii) the unit coils U14 and U24. In this case, respective first ends in the circumferential direction of the unit coil U11 and the unit coil U24 are housed in adjacent 4th and 5th slots. Respective first ends in the circumferential direction of the unit coil U21 and the unit coil U14 are housed in adjacent 28th and 29th slots. Here, the adjacent 4th and 5th slots and the adjacent 28th and 29th slots correspond to slots of the same phase within the same magnetic pole.

In the first-half coil group, when m=2, the first symmetrical coils are the combination of: (i) the unit coils U12 and U22; and (ii) the unit coils U13 and U23. In this case, respective first ends in the circumferential direction of the unit coil U12 and the unit coil U13 are housed in adjacent 40th and 41st slots. Respective first ends in the circumferential direction of the unit coil U22 and the unit coil U23 are housed in adjacent 16th and 17th slots.

Furthermore, in the second-half coil group, when m=1, the second symmetrical coils are the combination of: (i) the unit coils U15 and U25; and (ii) the unit coils U18 and U28. In this case, respective first ends in the circumferential direction of the unit coil U15 and the unit coil U28 are housed in adjacent 34th and 35th slots. Respective first ends in the circumferential direction of the unit coil U25 and the unit coil U18 are housed in adjacent 10th and 11th slots.

In the second-half coil group, when m=2, the second symmetrical coils are the combination of: (i) the unit coils U16 and U26; and (ii) the unit coils U17 and U27. In this case, respective first ends in the circumferential direction of the unit coil U16 and the unit coil U17 are housed in adjacent 46th and 47th slots. Respective first ends in the circumferential direction of the unit coil U26 and the unit coil U27 are housed in adjacent 22nd and 23rd slots.

Here, for example, respective first ends in the circumferential direction of the unit coil U11 and the unit coil U24 of the differing first and second series-connection coil groups G1 and G2 are housed in the adjacent 4th and 5th slots. Respective first ends in the circumferential direction of the unit coil U21 and the unit coil U14 of the differing first and second series-connection coil groups G1 and G2 are housed in the adjacent 28th and 29th slots. In this case, regarding the two unit coils that are housed in the slots of the same phase within the same magnetic pole, when the unit coil of the first series-connection coil group is i-th and the unit coil of the second series-connection coil group is j-th, $i \neq j$.

In addition, when the number of series-connection coils in each of the first and second series-connection coil groups G1 and G2 is n, $n/4 < i \leq 3n/4$ is established in the i-th unit coil and $j \leq n/4$ is established in the j-th unit coil. That is, according to the present embodiment, n=8. In each of the adjacent 4th and 5th slots and the adjacent 28th and 29th slots, the first unit coil (the unit coil that satisfies $j \leq n/4$) and the fourth unit coil (the unit coil that satisfies $n/4 < i \leq 3n/4$) are housed as the unit coils of the differing first and second series-connection coil groups G1 and G2.

Furthermore, respective first ends in the circumferential direction of the unit coil U15 and the unit coil U28 of the differing first and second series-connection coil groups G1 and G2 are housed in the adjacent 34th and 35th slots. Respective first ends in the circumferential direction of the unit coil U18 and the unit coil U25 of the differing first and second series-connection coil groups G1 and G2 are housed in the adjacent 10th and 11th slots. In this case as well, $i \neq j$ is established. In addition, $n/4 < i \leq 3n/4$ is established in the i-th unit coil and $j > 3n/4$ is established in the j-th unit coil. That is, in each of the adjacent 34th and 35th slots and the adjacent 10th and 11th slots, the eighth unit coil (i.e., the unit coil that satisfies $j > 3n/4$) and the fifth unit coil (the unit coil that satisfies $n/4 < i \leq 3n/4$) are housed as the unit coils of the differing first and second series-connection coil groups G1 and G2.

In a similar manner, in the combination of unit coils (i.e., the combination of: (i) the unit coils U12 and U22; and (ii) the unit coils U13 and U23) that are housed in the adjacent 16th and 17th slots, and the combination of unit coils (i.e., the combination of: (i) the unit coils U16 and U26; and (ii) the unit coils U17 and U27) that are housed in the adjacent 22nd and 23rd slots as well, when the unit coil of the first series-connection coil group is i-th and the unit coil of the second series-connection coil group is j-th, $n/4 < i \leq 3n/4$ and $j \leq n/4$ or $j > 3n/4$ are established.

Figure 22:
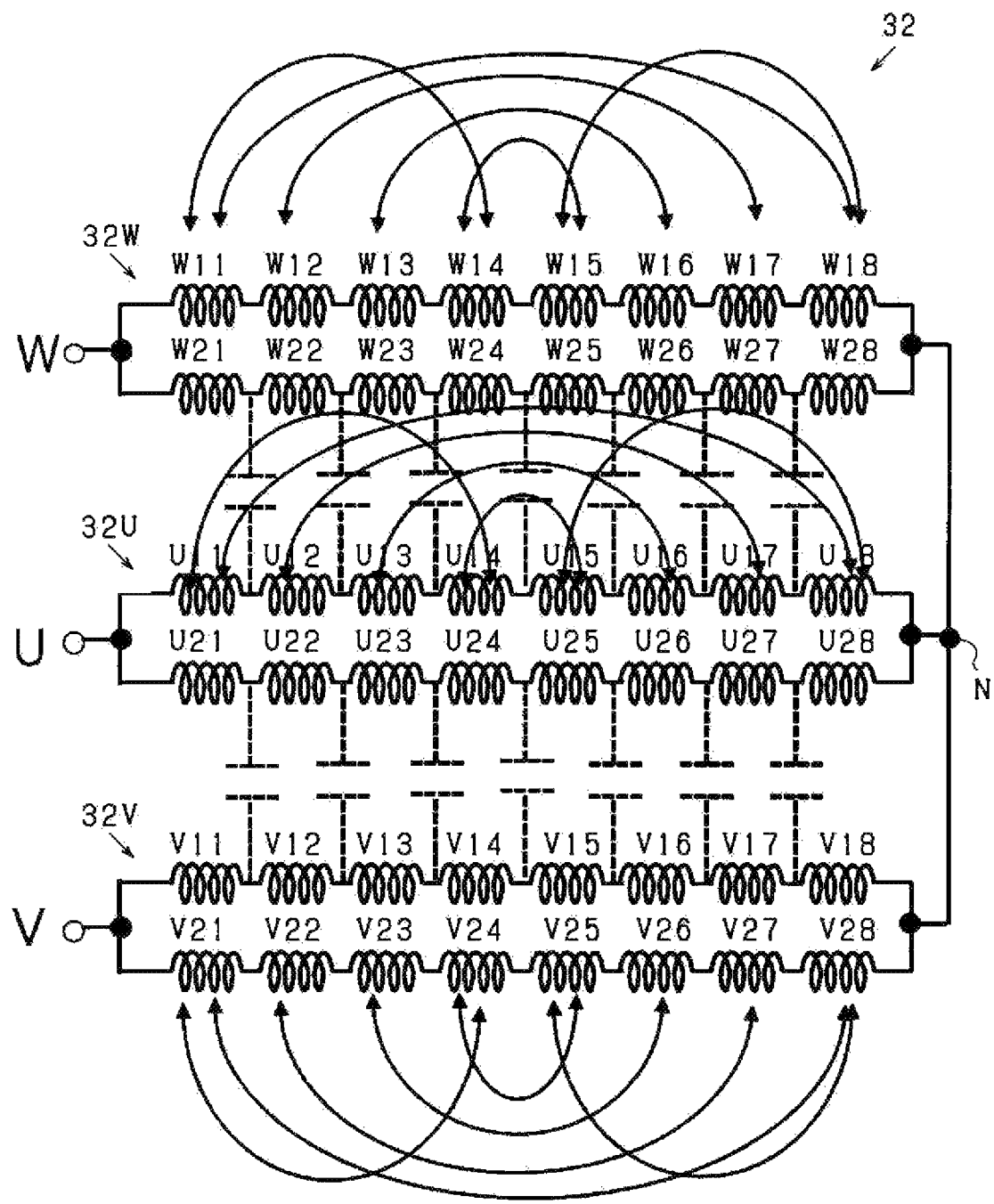
FIG. 22 is a diagram of an electrical configuration of the phase coils.

As a result of the unit coils being arranged as described above, as shown in FIG. 22, mutual magnetic coupling can occur between the coils that are housed in the same slot or adjacent slots (i.e., slots of the same phase within the same magnetic pole). The surge voltage that is generated in the primary and secondary resonance phenomena can be reduced. That is, the surge voltage that is generated as a result of the primary resonance is symmetrical between the phase terminal side and the neutral point N side, and the polarities are opposite each other. However, as a result of magnetic coupling occurring between the phase terminal side and the neutral point N side, the surge voltage is transmitted between the phase terminal side and the neutral point N side by electromagnetic induction, based on principles of a transformer. As a result, the surge voltage that is generated as a result of the primary resonance is reduced. Furthermore, magnetic coupling occurs between the phase terminal side and the neutral point N side in the first-half coil groups and the second-half coil groups of the series-connection coil groups G1 and G2, as well. Therefore, the surge voltage that is generated as a result of the secondary resonance is reduced.

Figure 23A:
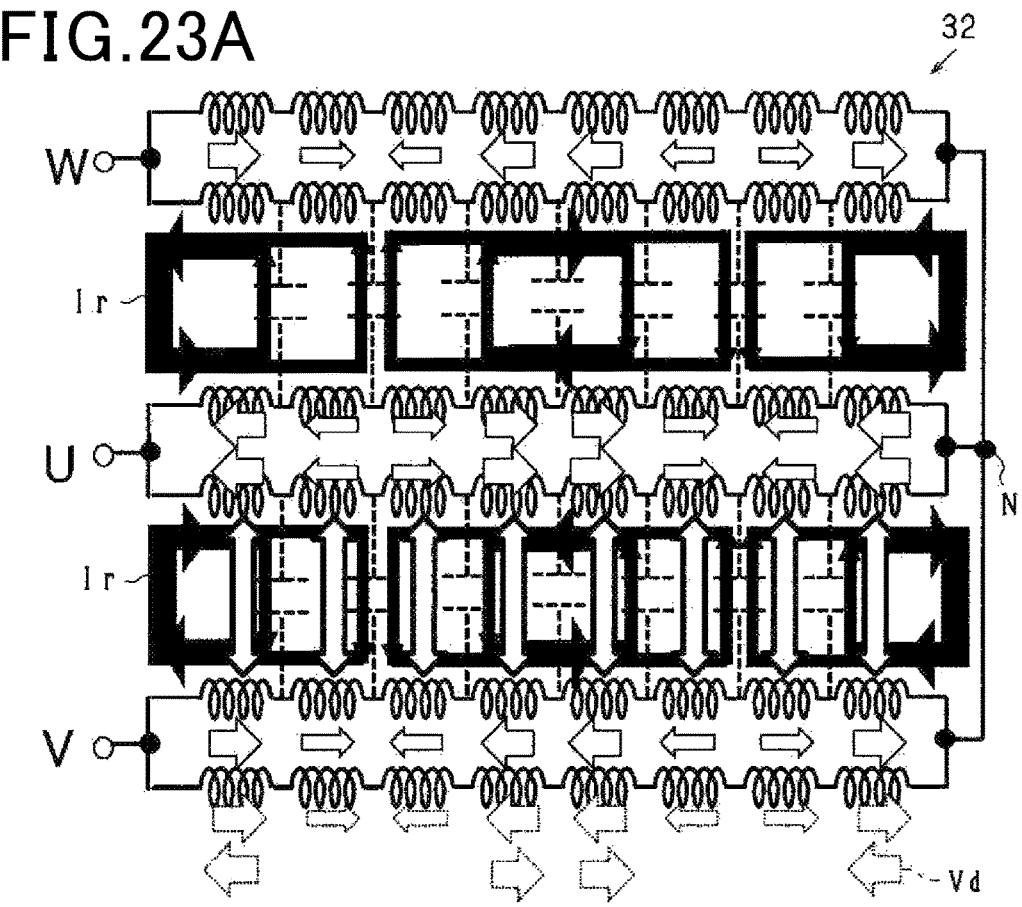
FIGS. 23A to 23C are diagrams for explaining the resonance current and the surge voltage in the phase coils.

In FIG. 23A, the induced voltage Vd that is generated as a result of magnetic coupling between the phase terminal side and the intermediate point side, and the induced voltage Vd that is generated as a result of magnetic coupling between the neutral point N side and the intermediate point side are indicated by broken-line arrows. The induced voltage Vd is generated between the unit coils that are in symmetrical positions in the first-half coil group (i.e., the unit coils that compose the first symmetrical coils), and between the unit coils that are in symmetrical positions in the second-half coil group (i.e., the unit coils that compose the second symmetrical coils).

Figure 23B:
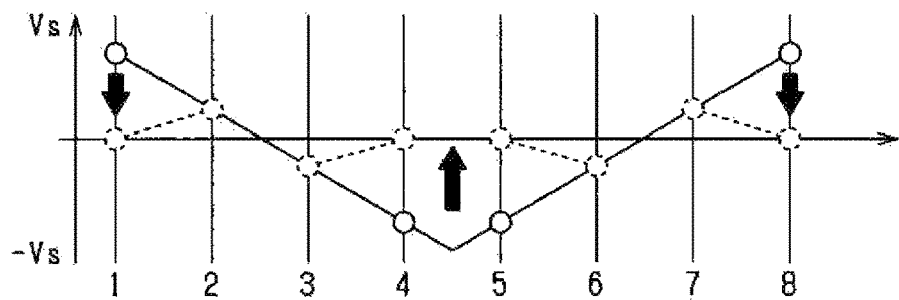
Figure 23C:
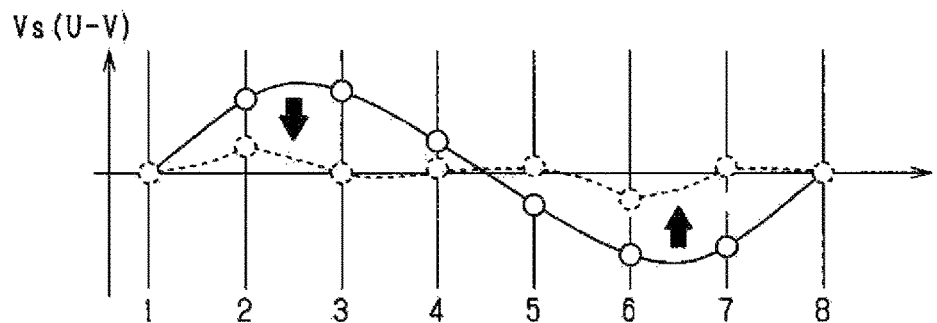
Figure 24:
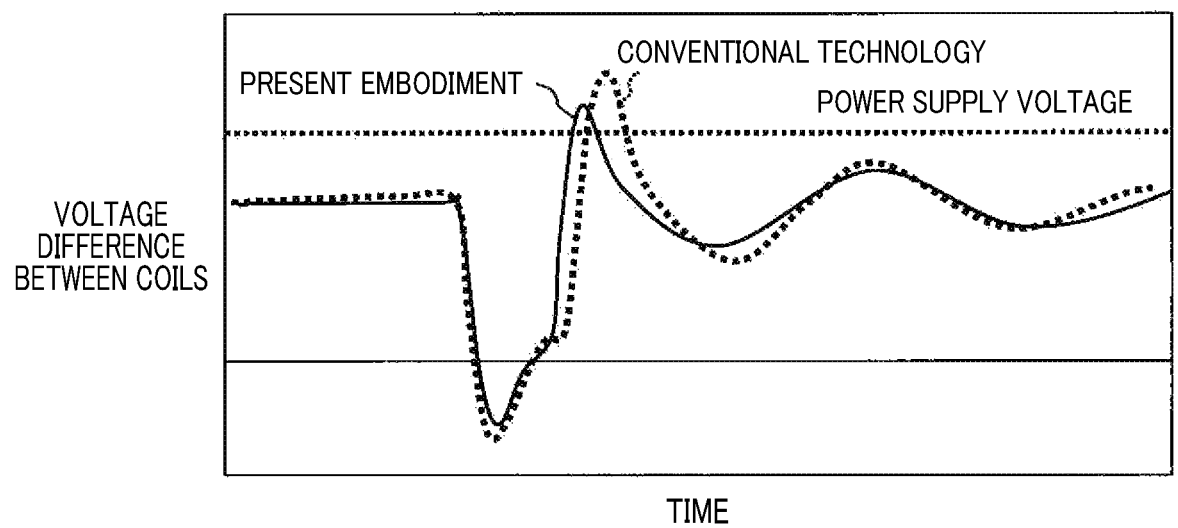
FIG. 24 is a diagram showing behavior of the surge voltage against time.

As a result, as shown in FIG. 23B, a voltage that is in a direction opposite the surge voltage Vs that is generated in the unit coils is induced. The effect of suppressing the surge voltage that is generated between coils is achieved. Furthermore, the resonance voltage is reduced as shown in FIG. 23C. Consequently, as shown in FIG. 24, according to the present embodiment indicated by a solid line, compared to a conventional technology indicated by a broken line, the effect of the surge voltage is suppressed and the voltage difference (shared voltage) between the coils is reduced.

In the configuration shown in FIG. 20, the series-connection coil groups G1 and G2 of the U-phase coil 32 include the unit coils that are wound on the first side in the circumferential direction and the unit coils that are wound on the second side in the circumferential direction. The i-th coil from the U-phase terminal T1 is arranged in a foldback position in the winding direction. In addition, in the series-connection coil groups G1 and G2, a first end in the circumferential direction of the i-th unit coil and respective first ends in the circumferential direction of the (i−1)-th unit coil and the (i+1)-th unit coil are housed in slots of the same phase within the same magnetic pole. Furthermore, respective both first and second ends in the circumferential direction of the (i−1)-th unit coil and the (i+1)-th unit coil are housed in slots of the same phase within the same magnetic pole.

Specifically, as shown in FIG. 21A, the series-connection coil group G1 includes the unit coils U11 to U14 that are wound on a first side in the circumferential direction and the unit coils U15 to U18 that are wound on a second side in the circumferential direction. The fourth unit coil U14 from the U-phase terminal T1 is arranged in the foldback position in the winding direction. In addition, as shown in FIG. 21B, the series-connection group G2 includes the unit coils U21 to U24 that are wound on the first side in the circumferential direction and the unit coils U25 to U28 that are wound on the second side in the circumferential direction. The fourth unit coil U24 from the U-phase terminal T1 is arranged in the foldback position in the winding direction (in the circumferential direction).

In addition, on a first end side (left end side in the drawing) in the circumferential direction of the unit coil 14, a first end of the unit coil U14 and respective first ends in the circumferential direction of the unit coils U13 and U15 that are the third and fifth unit coils are housed in slots of the same phase within the same magnetic pole. Furthermore, respective both first and second ends in the circumferential direction of the unit coil U13 and the unit coil U15 are housed in slots of the same phase within the same magnetic pole.

In a similar manner, on first end side (left end side in the drawing) in the circumferential direction of the unit coil 24, a first end of the unit coil U24 and respective first ends in the circumferential direction of the unit coils U23 and U25 that are the third and fifth unit coils are housed in slots of the same phase within the same magnetic pole. Furthermore, respective both first and second ends in the circumferential direction of the unit coil U23 and the unit coil U25 are housed in slots of the same phase within the same magnetic pole.

In the rotating electric machine 10, a winding structure that is similar to that in FIG. 20, FIG. 21A, and FIG. 21B may be used for the V-phase coil 32V and the W-phase coil 32W, other than the U-phase coil 32U, as well. As a result, the primary resonance and the secondary resonance are appropriately suppressed in the phase coil of each phase.

Variation Example of the Configuration in FIG. 20

Figure 25:
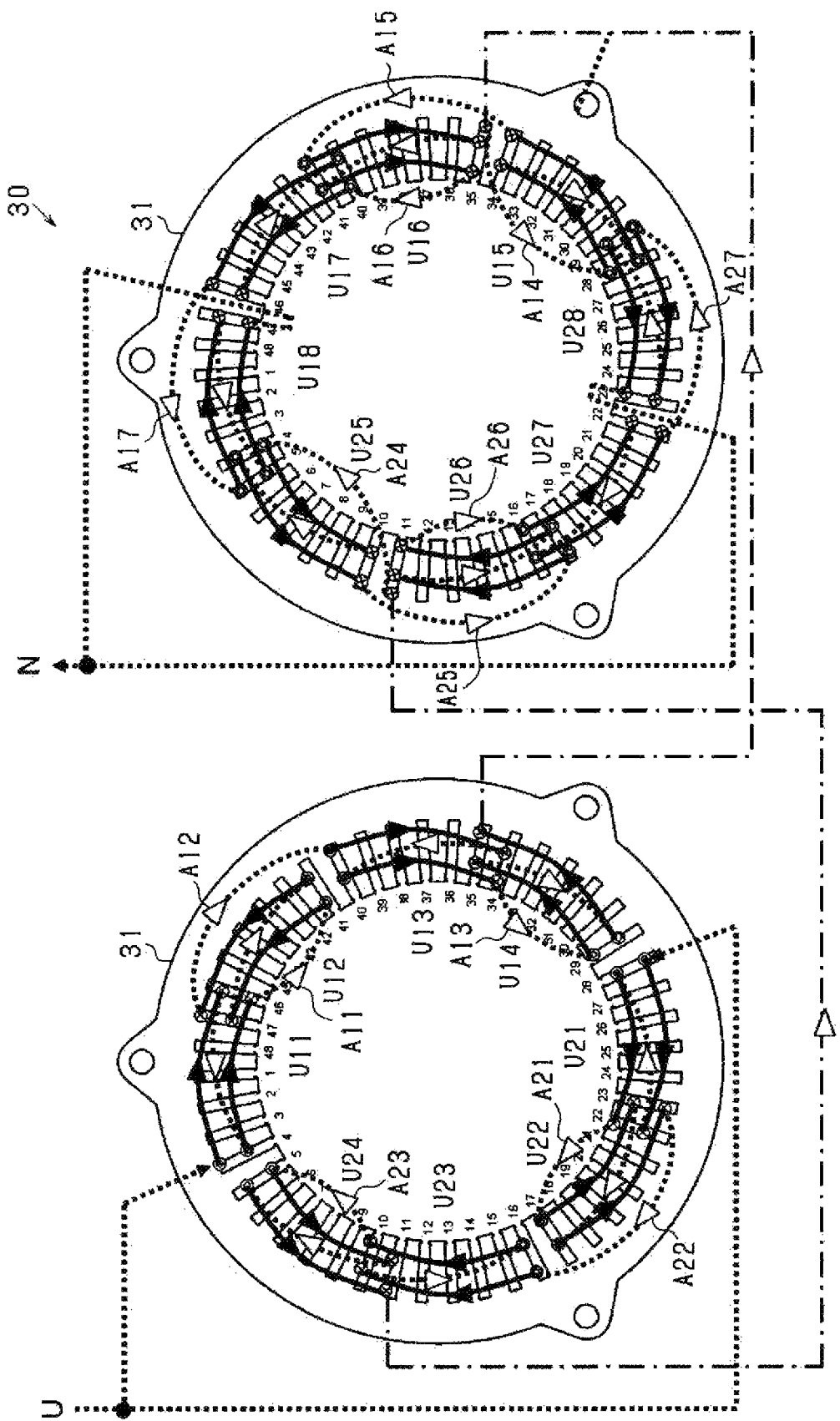
FIG. 25 is a diagram of a winding state of the parallel-connection stator winding.

A configuration in FIG. 25 can be considered as a variation example in which a portion of the configuration in FIG. 20 is modified. In a manner similar to that in the configuration in FIG. 20, in the configuration in FIG. 25, in the first series-connection coil group G1, the unit coils U11 to U14 are arranged to be wound in the clockwise direction. In addition, the remaining unit coils U15 to U18 are arranged to be wound in the counter-clockwise direction. Furthermore, in the second series-connection coil group G2, the unit coils U21 to U24 are arranged to be wound in the clockwise direction. In addition, the remaining unit coils U25 to U28 are arranged to be wound in the counter-clockwise direction.

In the configuration in FIG. 25, the crossover portions are provided in the following manner. That is, when viewed with the U-phase terminal T1 as the starting point, in the series-connection coil group G1, the crossover direction of the crossover portions A11 to A14 is the clockwise direction. The crossover direction of the crossover portions A15 to A17 is the counter-clockwise direction. In this case, the crossover portion A15 is a reverse crossover portion in which the crossover direction is reversed in relation to that of the preceding crossover portion A14. In addition, in the series-connection coil group G2, the crossover direction of the crossover portions A21 to A24 is the clockwise direction. The crossover direction of the crossover portions A25 to A27 is the counter-clockwise direction. In this case, the crossover portion A25 is a reverse crossover portion in which the crossover direction is reversed in relation to that of the preceding crossover portion A24.

In the configuration in FIG. 25, compared to the configuration in FIG. 20, the crossover portions A14 and A24 that are provided in intermediate positions are each configured to cross between a position that is on the outer side in the radial direction and a position that is on the inner side in the radial direction. In addition, the crossover portion that serves as the reverse crossover portion differs.

The slot pitch of the unit coils U11 to U18 and the slot pitch of the unit coils U21 to U28 are both a six-slot pitch that is a slot pitch that amounts to a single magnetic pole. In addition, among the crossover portions A11 to A17 and A21 to A27, the crossover portions A11, A13, . . . , A21, A23, . . . and the like that are arranged on the inner side in the radial direction have a five-slot pitch. The crossover portions A12, A15, . . . , A22, A25, . . . and the like that are arranged on the outer side in the radial direction, and the crossover portions A14 and A24 that cross between the inner and outer sides in the radial direction have a seven-slot pitch.

Figure 26A:
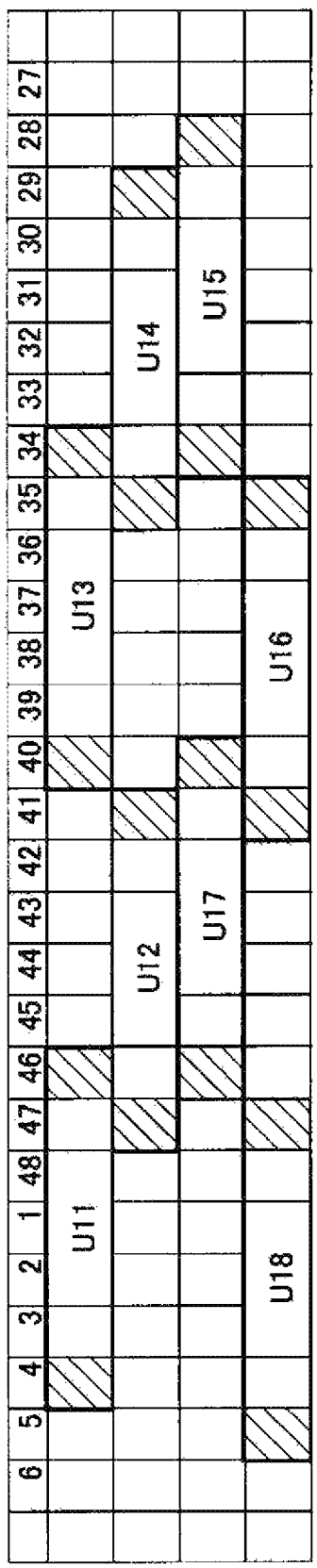
FIGS. 26A and 26B are diagrams of the slot housing positions of the unit coils.
Figure 26B:
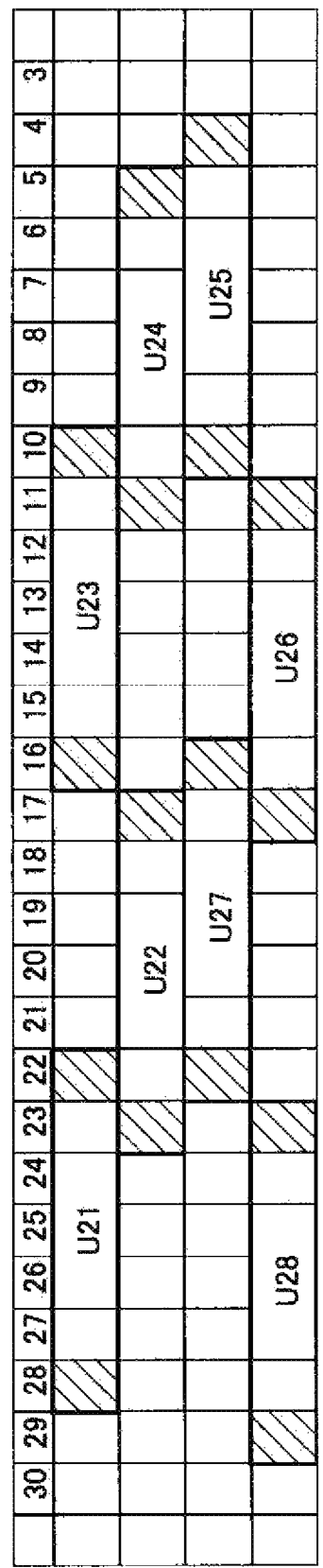

The slot housing positions of the unit coils will be described with reference to FIGS. 26A and 26B. FIG. 26A is a diagram of the slot housing positions of the unit coils in the series-connection coil group G1. FIG. 26B is a diagram of the slot housing positions of the unit coils in the series-connection coil group G2.

As shown in FIGS. 26A and 26B, in the U-phase coil 32U, when a k-th unit coil in the order of connection from the U-phase terminal T1 and a k-th unit coil in the order of connection from the neutral point N are considered to be symmetrical coils, the configuration is such that respective both first and second ends in the circumferential direction of the symmetrical coils from the U-phase terminal T1 to the neutral point N are housed in slots of the same phase within the same magnetic pole.

Specifically, when k=1, the symmetrical coils are the combination of: (i) the unit coils U11 and U21; and (ii) the unit coils U18 and U28. In this case, respective both first and second ends in the circumferential direction of the unit coil U11 and the unit coil U18 are housed in the adjacent 4th and 5th slots and the adjacent 47th and 48th slots. In addition, respective both first and second ends in the circumferential direction of the unit coil U21 and the unit coil U28 are housed in the adjacent 28th and 29th slots and the adjacent 22nd and 23rd slots.

When k=2, the symmetrical coils are the combination of: (i) the unit coils U12 and U22; and (ii) the unit coils U17 and U27. In this case, respective both first and second ends in the circumferential direction of the unit coil U12 and the unit coil U17 are housed in the adjacent 46th and 47th slots and the adjacent 40th and 41st slots. In addition, respective both first and second ends in the circumferential direction of the unit coil U22 and the unit coil U27 are housed in the adjacent 22nd and 23rd slots and the adjacent 16th and 17th slots.

When k=3, the symmetrical coils are the combination of: (i) the unit coils U13 and U23; and (ii) the unit coils U16 and U26. In this case, respective both first and second ends in the circumferential direction of the unit coil U13 and the unit coil U16 are housed in the adjacent 40th and 41st slots and the adjacent 34th and 35th slots. In addition, respective both first and second ends in the circumferential direction of the unit coil U23 and the unit coil U26 are housed in the adjacent 16th and 17th slots and the adjacent 10th and 11th slots.

When k=4, the symmetrical coils are the combination of: (i) the unit coils U14 and U24; and (ii) the unit coils U15 and U25. In this case, respective both first and second ends in the circumferential direction of the unit coil U14 and the unit coil U15 are housed in the adjacent 34th and 35th slots and the adjacent 28th and 29th slots. In addition, respective both first and second ends in the circumferential direction of the unit coil U24 and the unit coil U25 are housed in the adjacent 10th and 11th slots and the adjacent 4th and 5th slots.

The arrangements of the unit coils shown in FIGS. 26A and 26B form a configuration that can contribute to suppression of the primary resonance.

In addition, in the configuration in FIG. 25, in the first-half coil group of each of the series-connection coil groups G1 and G2, when an m-th unit coil in the order of connection from the U-phase terminal T1 and an m-th unit coil in the order of connection from the intermediate point are considered to be first symmetrical coils, the configuration is such that at least respective first ends in the circumferential direction of the first symmetrical coils that are present from the U-phase terminal T1 to the intermediate point are housed in slots of the same phase within the same magnetic pole. Furthermore, in the second-half coil group, when an m-th unit coil in the order of connection from the neutral point N and an m-th unit coil in the order of connection from the intermediate point are considered to be second symmetrical coils, the configuration is such that at least respective first ends in the circumferential direction of the second symmetrical coils that are present from the neutral point N to the intermediate point are housed in slots of the same phase within the same magnetic pole.

A specific configuration of the foregoing configuration will be described with reference to FIGS. 26A and 26B.

In the first-half coil group, when m=1, the first symmetrical coils are the combination of: (i) the unit coils U11 and U21; and (ii) the unit coils U14 and U24. In this case, respective first ends in the circumferential direction of the unit coil U11 and the unit coil U24 are housed in adjacent 4th and 5th slots. Respective first ends in the circumferential direction of the unit coil U21 and the unit coil U14 are housed in adjacent 28th and 29th slots.

In the first-half coil group, when m=2, the first symmetrical coils are the combination of: (i) the unit coils U12 and U22; and (ii) the unit coils U13 and U23. In this case, respective first ends in the circumferential direction of the unit coil U12 and the unit coil U13 are housed in adjacent 40th and 41st slots. Respective first ends in the circumferential direction of the unit coil U22 and the unit coil U23 are housed in adjacent 16th and 17th slots.

Furthermore, in the second-half coil group, when m=1, the second symmetrical coils are the combination of: (i) the unit coils U15 and U25; and (ii) the unit coils U18 and U28. In this case, respective first ends in the circumferential direction of the unit coil U15 and the unit coil U28 are housed in adjacent 28th and 29th slots. Respective first ends in the circumferential direction of the unit coil U25 and the unit coil U18 are housed in adjacent 4th and 5th slots.

In the second-half coil group, when m=2, the second symmetrical coils are the combination of: (i) the unit coils U16 and U26; and (ii) the unit coils U17 and U27. In this case, respective first ends in the circumferential direction of the unit coil U16 and the unit coil U17 are housed in adjacent 40th and 41st slots. Respective first ends in the circumferential direction of the unit coil U26 and the unit coil U27 are housed in adjacent 16th and 17th slots.

In the configuration in FIG. 25 as well, in a manner similar to that in the configuration in FIG. 20, at least respective first ends in the circumferential direction of the i-th unit coil in the first series-connection coil group G1 and the j-th unit coil in the second series-connection coil group G2 are housed in slots of the same phase within the same magnetic pole, and i≠j. In addition, the i-th unit coil includes that in which n/4<i≤3n/4 is established. The j-th unit coil includes that in which at least one of j≤n/4 and j>3n/4 is established.

As a result of the unit coils being arranged as described above, mutual magnetic coupling can occur between the coils that are housed in slots of the same phase within the same magnetic pole. The surge voltage that is generated in the primary and secondary resonance phenomena can be reduced.

In the configuration shown in FIG. 25, the first and second series-connection coil groups G1 and G2 of the U-phase coil 32 include the unit coils that are wound on the first side in the circumferential direction and the unit coils that are wound on the second side in the circumferential direction. The i-th coil from the U-phase terminal T1 is arranged in the foldback position in the winding direction. In addition, in the first and second series-connection coil groups G1 and G2, a first end in the circumferential direction of the i-th unit coil and respective first ends in the circumferential direction of the (i-1)-th unit coil and the (i+1)-th unit coil are housed in slots of the same phase within the same magnetic pole. Furthermore, respective both first and second ends in the circumferential direction of the (i-1)-th unit coil and the (i+1)-th unit coil are housed in slots of the same phase within the same magnetic pole.

Specifically, as shown in FIG. 26A, the fifth unit coil U15 from the U-phase terminal T1 is arranged in the foldback position in the circumferential direction of the first series-connection coil group G1. In addition, as shown in FIG. 26B, the fifth unit coil U25 from the U-phase terminal T1 is arranged in the foldback position in the circumferential direction of the second series-connection coil group G2.

In addition, on a first end side (left end side in the drawing) in the circumferential direction of the unit coil 15, one the first end of the unit coil U15 and respective first ends in the circumferential direction of the unit coils U14 and U16 that are the fourth and sixth unit coils are housed in slots of the same phase within the same magnetic pole. Furthermore, respective both first and second ends in the circumferential direction of the unit coil U14 and the unit coil U16 are housed in slots of the same phase within the same magnetic pole.

In a similar manner, on a first end side (left end side in the drawing) in the circumferential direction of the unit coil 25, a first end of the unit coil U25 and respective first ends in the circumferential direction of the unit coils U24 and U26 that are the fourth and sixth unit coils are housed in slots of the same phase within the same magnetic pole. Furthermore, respective both first and second ends in the circumferential direction of the unit coil U24 and the unit coil U26 are housed in slots of the same phase within the same magnetic pole.

In the rotating electric machine 10, a winding structure that is similar to that in FIG. 25, FIG. 26A, and FIG. 26B may be used for the V-phase coil 32V and the W-phase coil 32W, other than the U-phase coil 32U, as well. As a result, the primary resonance and the secondary resonance are appropriately suppressed in the phase coil of each phase.

In the configuration in FIG. 25, the crossover portions A14 and A24 are configured to cross between a position that is on the outer side in the radial direction and a position that is on the inner side in the radial direction. The crossover portions A14 and A24 are each provided so as to straddle a coil end of the unit coil. That is, in a structure in which the winding direction of the series-connection coil group is folded back, the crossover portion crosses over in not only the circumferential direction, but also the radial direction.

Regarding this point, in the configuration in FIG. 20, the crossover portion is not required to cross over in the radial direction. The configuration is advantageous in terms of suppressing complexness of the structure and increase in dimension in an axial length direction. That is, in the configuration in FIG. 20, the foldback position is shifted by an amount amounting to a unit coil. The crossover portion when the series-connection coil group is folded back connects outermost sides in the radial direction to each other or innermost sides in the radial direction to each other.

According to the present embodiment described in detail above, the following excellent effects can be obtained.

In the rotating electric machine 10 configured as described above, each of the phase coils 32U, 32V, and 32W of the stator winding 32 has a plurality of series-connection coil groups G1 and G2 that are each made of n unit coils. In each of the series-connection coil groups G1 and G2, a first end is connected to the phase terminal of each phase and a second end is connected to the neutral point N. The series-connection coil groups G1 and G2 are connected in parallel to each other in this state. In this case, the configuration is advantageous in terms of achieving higher output in the rotating electric machine 10.

In addition, each of the phase coils 32U, 32V, and 32W is configured such that at least first end in the circumferential direction of the i-th unit coil in the order of connection from the phase terminal and respective first ends in the circumferential direction of the (i−1)-th unit coil and the (i+1)-th unit coil are housed in slots of the same phase within the same magnetic pole. In addition, respective both first and second ends in the circumferential direction of the (i−1)-th unit coil and the (i+1)-th unit coil are housed in slots of the same phase within the same magnetic pole. In this case, the resonance phenomenon can be suppressed as a result of magnetic coupling between the (i−1)-th unit coil and the (i+1)-th unit coil.

That is, as a result of the voltage at one unit coil being transmitted to the voltage at another unit coil in the slots of the same phase within the same magnetic pole, canceling of the resonance voltage can be achieved. As a result, an increase in the voltage difference (shared voltage) between the unit coils can be suppressed. Moreover, improvement in insulation performance can be suitably implemented. In addition, in the rotating electric machine 10, a more compact and higher-density stator winding 32 and improved insulation performance can both be achieved.

In each of the first and second series-connection coil groups G1 and G2, the winding direction of the unit coils is folded back by the i-th unit coil from the phase terminal. In addition, the configuration is such that, with reference to the i-th unit coil that is arranged at the foldback position, the (i−1)-th unit coil and the (i+1)-th unit coil are housed in slots of the same phase within the same magnetic pole. As a result, the configuration in which the (i±1)-th unit coils are housed in slots of the same phase within the same magnetic pole can be suitably obtained.

The first and second series-connection coil groups G1 and G2 are each provided over a circumferential-direction region that is less than a single revolution around the stator core 31. The first and second series-connection coil groups G1 and G2 that differ from each other are arranged so as to be arrayed in the circumferential direction. As a result, the unit coils on the phase terminal side and the unit coils on the neutral point N side can be housed in slots of the same phase within the same magnetic pole, between the first and second series-connection coil groups G1 and G2. Therefore, the resonance voltage can be reduced between the first and second series-connection coil groups G1 and G2 that differ from each other as a result of magnetic coupling between the first and second series-connection coil groups G1 and G2.

At least respective first ends in the circumferential direction of the i-th unit coil in one series-connection coil group, among the first and second series-connection coil groups G1 and G2 that are included in phase coils of the same phase, and the j-th unit coil in the other series-connection group are housed in slots of the same phase within the same magnetic pole, and i≠j. In this case, a configuration for suppressing the resonance phenomenon can be easily obtained by a combination of unit coils being housed in slots of the same phase within the same magnetic pole. In addition, a suitable configuration for suppressing the secondary resonance in addition to the primary resonance can be obtained.

The i-th unit coil includes that in which n/4<i≤3n/4 is established. The j-th unit coil includes that in which at least one of j≤n/4 and j>3n/4 is established. In this case, the combination of the unit coils that are housed in slots of the same phase within the same magnetic pole is a combination of a unit coil that is close to the phase terminal or the neutral point N and a unit coil that is close to a center position from the phase terminal to the neutral point N. A configuration that has a high suppression effect regarding the secondary resonance can be obtained.

In the phase coils 32U, 32V, and 32W, when a k-th unit coil in the order of connection from the U-phase terminal T1 and a k-th unit coil in the order of connection from the neutral point N are considered to be symmetrical coils, the configuration is such that at least respective first ends in the circumferential direction of the symmetrical coils that are present from the phase terminal to the neutral point N are housed in slots of the same phase within the same magnetic pole. Consequently, the resonance phenomenon can be suppressed as a result of the magnetic coupling between the unit coil on the phase terminal side and the unit coil on the neutral point N side that compose the symmetrical coils. That is, as a result of the voltage at one unit coil being transmitted to the voltage at the other unit coil in the slots of the same phase within the same magnetic pole, canceling of the resonance voltage can be achieved.

In the first and second series-connection coil groups G1 and G2 of each of the phase coils 32U, 32V, and 32W, in the n/2 unit coils from the phase terminal to the intermediate point and the n/2 unit coils from the neutral point N to the intermediate point, the first symmetrical coils and the second symmetrical coils in which magnetic coupling between each other occurs are prescribed, and the secondary resonance is suppressed as a result of magnetic coupling therebetween. As a result, an increase in the voltage difference (shared voltage) between the unit coils attributed to the secondary resonance can be suppressed.

The unit coils are provided such that conducting wires that are wound by lap winding are arrayed in a plurality of layers in the radial direction inside the slots 35. The unit coils that are adjacent to each other in the circumferential direction are connected on the innermost side or the outermost side in the radial direction by the crossover portion. In this case, in the configuration in which the unit coils of the same phase are housed in the slots 35 that are provided two for a respective phase for a respective magnetic pole, the crossover portions are provided at at least one of the y-slot pitch or the (y±1)-slot pitch. As a result, a configuration that is suitable in terms of reversing the extending direction at the crossover portion (the winding orientation in the circumferential direction) is obtained. In addition, a length of the crossover portion can be made as short as possible.

Second Embodiment

A second embodiment differs from the first embodiment in that each of the phase coils 32U, 32V, and 32W has a configuration of four-parallel connection. A diagram of a coil connection thereof is shown in FIG. 27.

Figure 27:
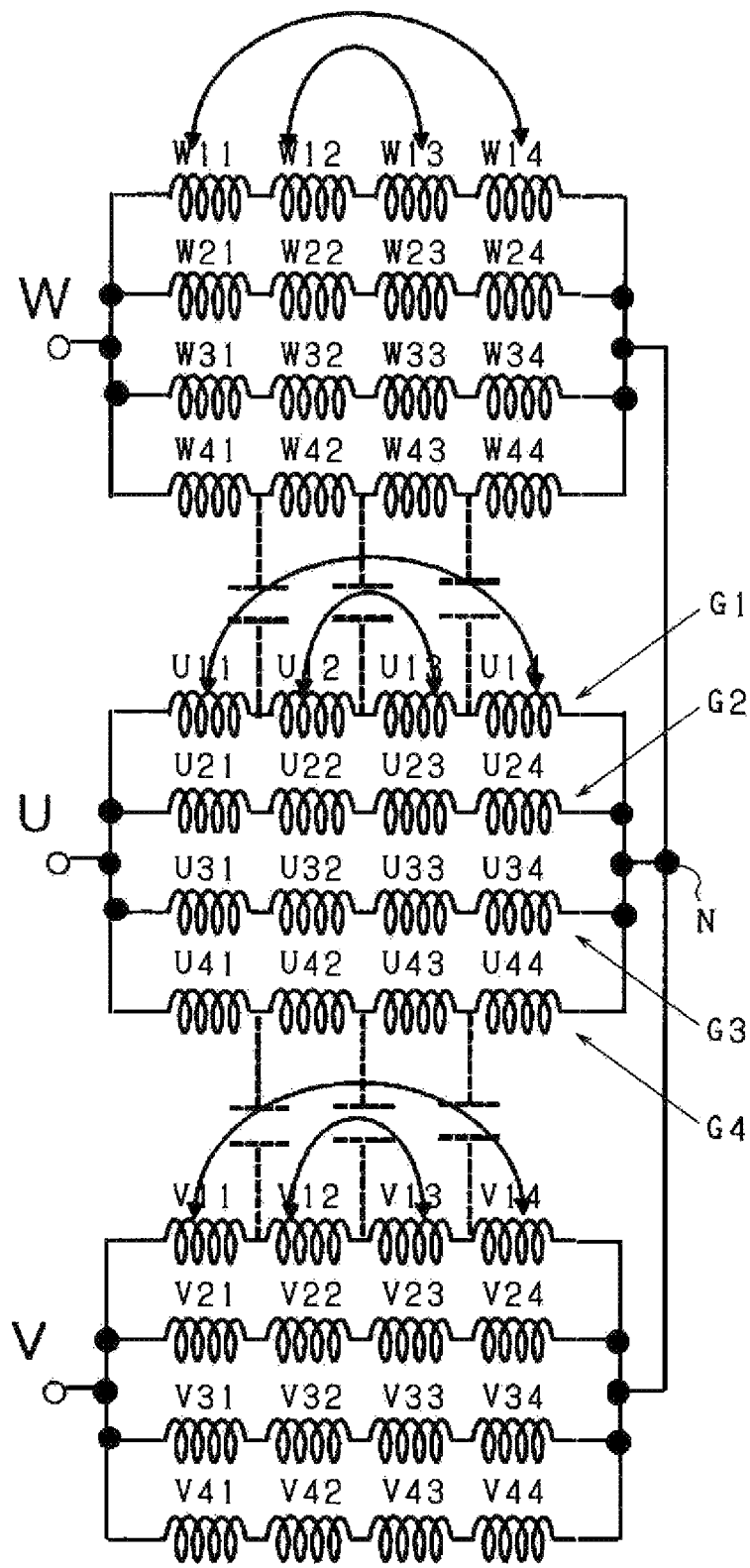
FIG. 27 is a diagram of coil connection in a stator winding according to a second embodiment.

As shown in FIG. 27, the U-phase coil 32U has a first, second, third, and fourth series-connection coil groups G1, G2, G3, and G4 that are connected to be in four-parallel connection. The first series-connection group G1 is made of four unit coils U11, U12, U13, and U14. The second series-connection group G2 is made of four unit coils U21, U22, U23, and U24. The third series-connection group G3 is made of four unit coils U31, U32, U33, and U34. The fourth series-connection group G4 is made of four unit coils U41, U42, U43, and U44. The V-phase coil 32V and the W-phase coil 32W are also similarly configured. Here, in each of the phase coils 32U, 32V, and 32W, the number of series-connection coils in each of the first to fourth series-connection coil groups G1 to G4 need not be four and may, for example, be eight.

Figure 28:
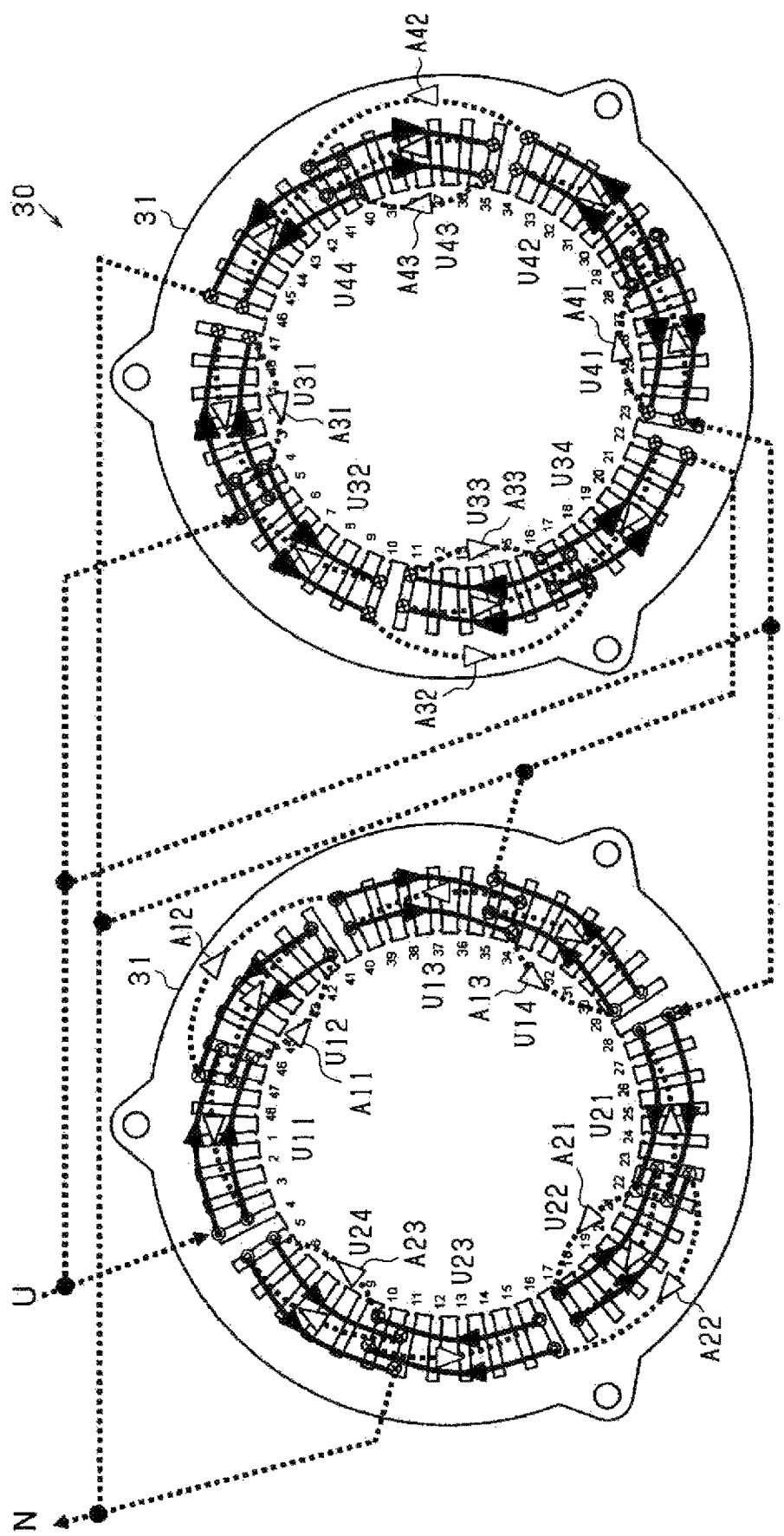
FIG. 28 is a diagram of a winding state of the parallel-connection stator winding.

In a configuration in FIG. 28, as shown in the left-hand drawing in FIG. 28, the unit coils U11 to U14 of the first series-connection group G1 and the unit coils U21 to U24 of the second series-connection group G2 are each arranged to be wound in the clockwise direction. In addition, as shown in the right-hand drawing in FIG. 28, the unit coils U31 to U34 of the third series-connection group G3 and the unit coils U41 to U44 of the fourth series-connection group G4 are each arranged to be wound in the counter-clockwise direction.

In the configuration in FIG. 28, the crossover portions are provided in the following manner. That is, when viewed with the U-phase terminal T1 as the starting point, the extending direction at the crossover portions A11 to A13 of the first series-connection coil group G1 and the extending direction at the crossover portions A21 to A23 of the second series-connection coil group G2 are both the clockwise direction. In addition, the extending direction at the crossover portions A31 to A33 of the third series-connection coil group G3 and the extending direction at the crossover portions A41 to A43 of the forth series-connection coil group G4 are both the counter-clockwise direction.

The slot pitches of the unit coils of the first to fourth series-connection coil groups G1 to G4 are all a six-slot pitch that is a slot pitch that amounts to a single magnetic pole. In addition, among the crossover portions of the first to fourth series-connection coil groups G1 to G4, the crossover portions A11, A13, . . . , A21, A23, . . . and the like that are arranged on the inner side in the radial direction have a five-slot pitch. The crossover portions A12, A22, . . . and the like that are arranged on the outer side in the radial direction have a seven-slot pitch.

Figure 29:
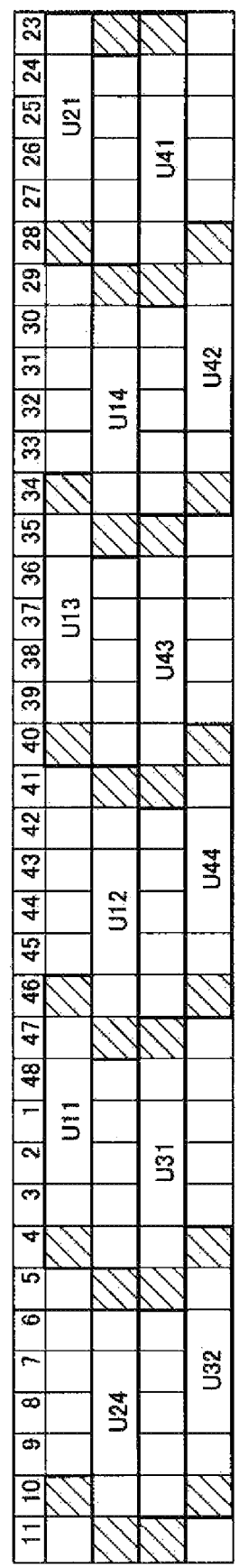
FIG. 29 is a diagram of the slot housing positions of the unit coils.

The slot housing positions of the unit coils will be described with reference to FIG. 29. FIG. 29 shows the slot housing positions of the unit coils within a slot area that includes at least the unit coils U11 to U14 of the first series-connection coil group G1. Here, in FIG. 29, the unit coils of the first to fourth series connection coil groups G1 to G4 are shown two rows each from the top.

As shown in FIG. 29, in the U-phase coil 32U, when a k-th unit coil in the order of connection from the U-phase terminal T1 and a k-th unit coil in the order of connection from the neutral point N are considered to be symmetrical coils, the configuration is such that at least respective first ends in the circumferential direction of the symmetrical coils from the U-phase terminal T1 to the neutral point N are housed in slots of the same phase within the same magnetic pole.

Specifically, for example, regarding the unit coil U11 of the first series-connection coil group G1, a first end in the circumferential direction of the unit coil U11 and a first end in the circumferential direction of the unit coil U24 of the second series-connection coil group G2 are housed in adjacent 4th and 5th slots. A second end in the circumferential direction of the unit coil U11 and a first end in the circumferential direction of the unit coil U44 of the fourth series-connection coil group G4 are housed in the same 48th slot. In addition, regarding the unit coil U14 of the first series-connection coil group G1, a first end in the circumferential direction of the unit coil U14, and a first end of the unit coil U21 of the second series-connection coil group G2 and a first end of the unit coil U41 of the fourth series-connection coil group G4 are housed in a same and adjacent 28th and 29th slots. As a result, the primary resonance can be suppressed.

In addition, in the configuration in FIG. 29, in the first-half coil group of each of the first to fourth series-connection coil groups G1 to G4, when an m-th unit coil in the order of connection from the U-phase terminal T1 and an m-th unit coil in the order of connection from the intermediate point are considered to be first symmetrical coils (such as the unit coils U11 and U12), the configuration is such that at least respective first ends in the circumferential direction of the first symmetrical coils that are present from the U-phase terminal T1 to the intermediate point are housed in slots of the same phase within the same magnetic pole.

In addition, in the second-half coil group, when an m-th unit coil in the order of connection from the neutral point N and an m-th unit coil in the order of connection from the intermediate point are considered to be second symmetrical coils (such as the unit coils U13 and U14), the configuration is such that at least respective first ends in the circumferential direction of the second symmetrical coils that are present from the neutral point N to the intermediate point are housed in slots of the same phase within the same magnetic pole. As a result, the secondary resonance can be suppressed.

Furthermore, in the U-phase coil 32U, the first end in the circumferential direction of the i-th unit coil from the U-phase terminal T1 and respective first ends in the circumferential direction of the (i−1)-th unit coil and the (i+1)-th unit coil are housed in slots of the same phase within the same magnetic pole. In addition, respective both first and second ends in the circumferential direction of the (i−1)-th unit coil and the (i+1)-th unit coil are housed in slots of the same phase within the same magnetic pole.

Specifically, for example, on a first end side (left end side in the drawings) in the circumferential direction of the unit coil U13 that is the third unit coil from the U-phase terminal T1, a first end of the unit coil U13 and respective first ends in the circumferential direction of the unit coils U12 and U44 that are the second and fourth unit coils are housed in adjacent 40th and 41st slots. In addition, respective both first and second ends in the circumferential direction of the unit coils U12 and U44 are housed in adjacent slots.

In a similar manner, on a second end side (right end side in the drawings) in the circumferential direction of the unit coil U13, the second end of the unit coil U13 and respective first ends in the circumferential direction of the unit coils U14 and U42 that are the second and fourth unit coils are housed in adjacent 28th and 29th slots. In addition, respective both first and second ends in the circumferential direction of the unit coils U14 and U42 are housed in adjacent slots.

In the rotating electric machine 10, a winding structure that is similar to that in FIGS. 28 and 29 may be used for the V-phase coil 32V and the W-phase coil 32W, other than the U-phase coil 32U, as well. As a result, the primary resonance and the secondary resonance are appropriately suppressed in the phase coil of each phase.

First Variation Example According to the Second Embodiment

Figure 30:
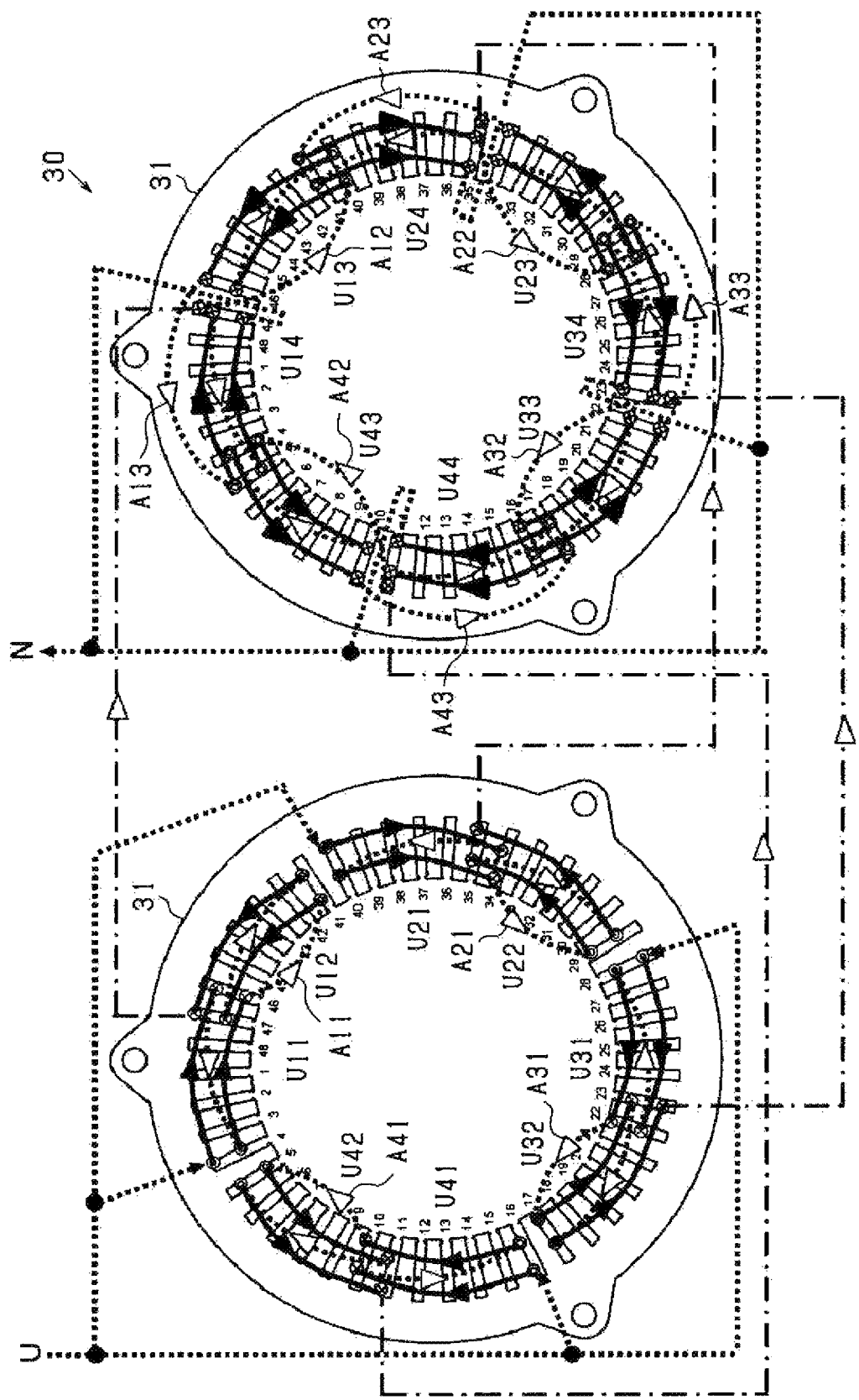
FIG. 30 is a diagram of a winding state of the parallel-connection stator winding.

As a variation example in which a portion of the configuration in FIG. 28 is modified, a configuration in FIG. 30 can be considered. In the configuration in FIG. 30, in the first to fourth series-connection coil groups G1 to G4, a first half of the unit coils in the order of connection from the phase terminal are arranged to be wound in the clockwise direction and a second half of the unit coils are arranged to be wound in the counter-clockwise direction.

In the configuration in FIG. 30, the crossover portions are provided in the following manner. That is, when viewed with the U-phase terminal T1 as the starting point, in the first series-connection coil group G1, the extending direction at the crossover portions A11 and A12 is the clockwise direction. The extending direction at the crossover portion A13 is the counter-clockwise direction. In this case, the crossover portion A13 is a reverse crossover portion in which the crossover direction is reversed in relation to that of the preceding crossover portion A12. This configuration similarly applies to the second to fourth series-connection coil groups G2 to G4. In addition, in the first series-connection coil groups G1 to G4, the crossover portions A12 and A22 that are provided in the intermediate positions are each configured to cross between a position on the outer side in the radial direction and a position on the inner side in the radial direction.

The slot pitches of the unit coils of the first to fourth series-connection coil groups G1 to G4 are all a six-slot pitch that is a slot pitch that amounts to a single magnetic pole. In addition, among the crossover portions of the first to fourth series-connection coil groups G1 to G4, the crossover portions A11, A21, . . . and the like that are arranged on the inner side in the radial direction have a five-slot pitch. The other crossover portions A12, A13, A22, A23, . . . and the like have a seven-slot pitch.

Figure 31:
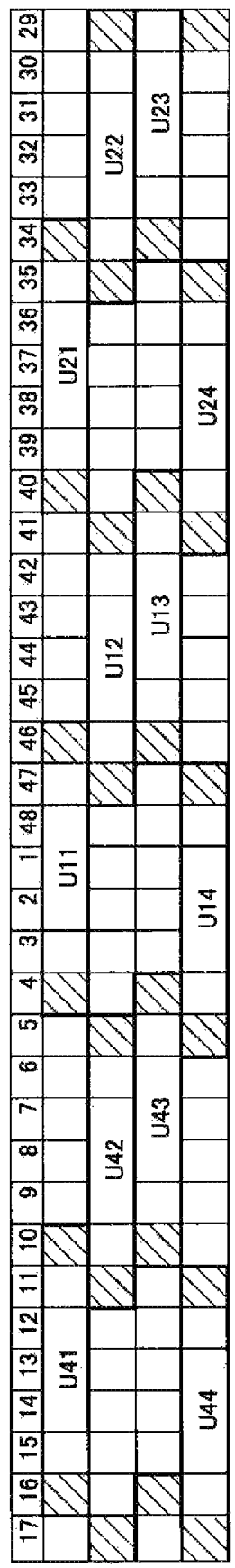
FIG. 31 is a diagram of the slot housing positions of the unit coils.

The slot housing positions of the unit coils will be described with reference to FIG. 31. FIG. 31 shows the slot housing positions of the unit coils within a slot area that includes at least the unit coils U11 to U14 of the first series-connection coil group G1.

In a manner similar to that described above, in FIG. 31 as well, in the U-phase coil 32U, when a k-th unit coil in the order of connection from the U-phase terminal T1 and a k-th unit coil in the order of connection from the neutral point N are considered to be symmetrical coils, the configuration is such that at least respective first ends in the circumferential direction of the symmetrical coils from the U-phase terminal T1 to the neutral point N are housed in slots of the same phase within the same magnetic pole. In addition, in the first-half coils and the second-half coils of each of the series-connection coil groups G1 to G4, the unit coils that are symmetrical to each other are housed in slots of the same phase within the same magnetic pole.

Furthermore, in the U-phase coil 32U, a first end in the circumferential direction of the i-th unit coil from the U-phase terminal T1 and respective first ends in the circumferential direction of the (i−1)-th unit coil and the (i+1)-th unit coil are housed in slots of the same phase within the same magnetic pole. In addition, respective both first and second ends in the circumferential direction of the (i−1)-th unit coil and the (i+1)-th unit coil are housed in slots of the same phase within the same magnetic pole.

Specifically, for example, on a first end side (left end side in the drawings) in the circumferential direction of the unit coil U13 that is the third unit coil from the U-phase terminal T1, a first end of the unit coil U13 and respective first ends in the circumferential direction of the unit coils U12 and U14 that are the second and fourth unit coils are housed in adjacent 46th and 47th slots. In addition, respective both first and second ends in the circumferential direction of the unit coils U12 and U14 are housed in adjacent slots.

In the rotating electric machine 10, a winding structure that is similar to that in FIGS. 30 and 31 may be used for the V-phase coil 32V and the W-phase coil 32W, other than the U-phase coil 32U, as well.

Second Variation Example According to the Second Embodiment

Figure 32:
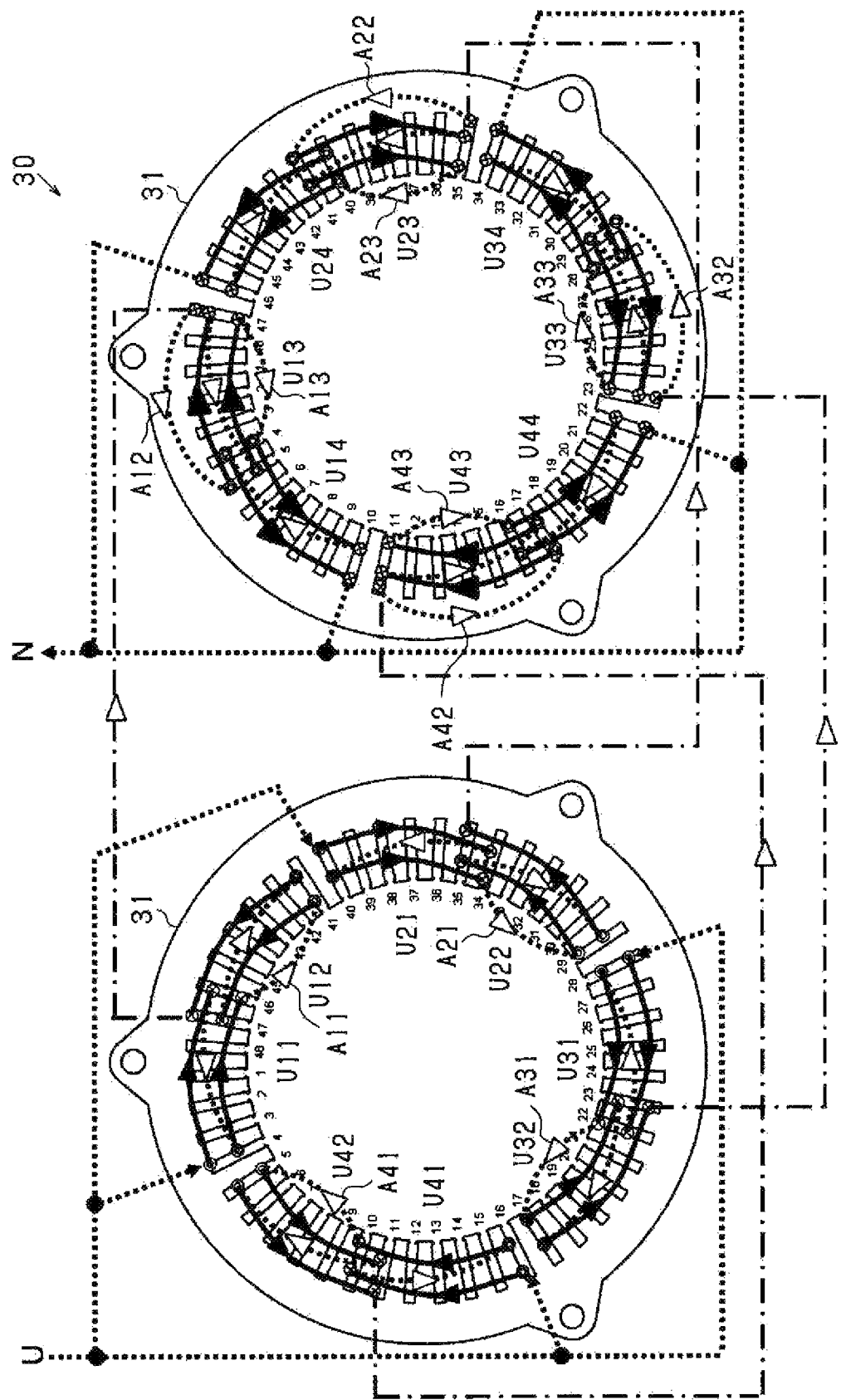
FIG. 32 is a diagram of a winding state of the parallel-connection stator winding.

In a manner similar to the configuration in FIG. 30, in a configuration in FIG. 32 as well, in the first to fourth series-connection coil groups G1 to G4, a first half of the unit coils in the order of connection from the phase terminal are arranged to be wound in the clockwise direction and a second half of the unit coils are arranged to be wound in the counter-clockwise direction.

In the configuration in FIG. 32, the crossover portions are provided in the following manner. That is, when viewed with the U-phase terminal T1 as the starting point, in the first series-connection coil group G1, the crossover direction of the crossover portion A11 is the clockwise direction. The crossover direction of the crossover portions A12 and A13 is the counter-clockwise direction. In this case, the crossover portion A12 is a reverse crossover portion in which the crossover direction is reversed in relation to that of the preceding crossover portion A11. This configuration similarly applies to the second to fourth series-connection coil groups G2 to G4.

The slot pitches of the unit coils of the first to fourth series-connection coil groups G1 to G4 are all a six-slot pitch that is a slot pitch that amounts to a single magnetic pole. In addition, among the crossover portions of the first to fourth series-connection coil groups G1 to G4, the crossover portions A11, A13, A21, A23, . . . and the like that are arranged on the inner side in the radial direction have a five-slot pitch. The other crossover portions A12, A22, . . . and the like have a seven-slot pitch.

Figure 33:
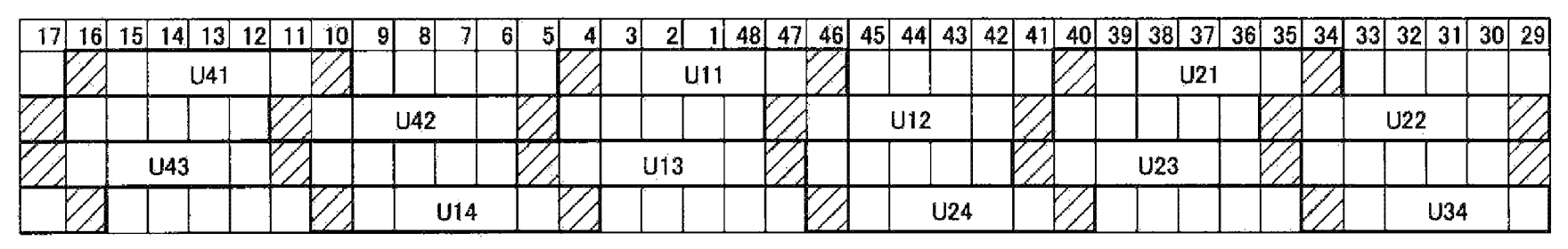

The slot housing positions of the unit coils will be described with reference to FIG. 33. FIG. 33 shows the slot housing positions of the unit coils within a slot area that includes at least the unit coils U11 to U14 of the first series-connection coil group G1.

In a manner similar to that described above, in FIG. 33 as well, in the U-phase coil 32U, when a k-th unit coil in the order of connection from the U-phase terminal T1 and a k-th unit coil in the order of connection from the neutral point N are considered to be symmetrical coils, the configuration is such that at least respective first ends in the circumferential direction of the symmetrical coils from the U-phase terminal T1 to the neutral point N are housed in slots of the same phase within the same magnetic pole. In addition, in the first-half coils and the second-half coils of each of the first to fourth series-connection coil groups G1 to G4, the unit coils that are symmetrical to each other are housed in slots of the same phase within the same magnetic pole.

Furthermore, in the U-phase coil 32U, a first end in the circumferential direction of the i-th unit coil from the U-phase terminal T1 and respective first ends in the circumferential direction of the (i−1)-th unit coil and the (i+1)-th unit coil are housed in slots of the same phase within the same magnetic pole. In addition, respective both first and second ends in the circumferential direction of the (i−1)-th unit coil and the (i+1)-th unit coil are housed in slots of the same phase within the same magnetic pole.

Specifically, for example, on a first end side (left end side in the drawings) in the circumferential direction of the unit coil U12 that is the second unit coil from the U-phase terminal T1, a first end of the unit coil U12 and respective first ends in the circumferential direction of the unit coils U11 and U13 that are the first and third unit coils are housed in adjacent 46th and 47th slots. In addition, respective both first and second ends in the circumferential direction of the unit coils U11 and U13 are housed in adjacent slots.

In addition, on the second end side (right end side in the drawings) in the circumferential direction of the unit coil U12, the second end of the unit coil U12 and respective first ends in the circumferential direction of the unit coils U21 and U23 that are the first and third unit coils are housed in adjacent 40th and 41st slots. In addition, respective both first and second ends in the circumferential direction of the unit coils U21 and U23 are housed in adjacent slots.

In the rotating electric machine 10, a winding structure that is similar to that in FIGS. 32 and 33 may be used for the V-phase coil 32V and the W-phase coil 32W, other than the U-phase coil 32U, as well.

Third Embodiment

The rotating electric machine 10 according to the embodiments described up to this point is configured to have eight magnetic poles, four pole pairs, and forty-eight slots. However, the rotating electric machine 10 may be configured otherwise. According to a present embodiment, the rotating electric machine 10 is configured to have twelve magnetic poles, six pole pairs, and seventy-two slots. Here, aside from having differing numbers of pole pairs and slots, the rotating electric machine 10 according to the present embodiment has a configuration that is substantially similar to that of the rotating electric machine 10 according to the embodiments described up to this point. The stator winding 32 has the segment structure.

Figure 34A:
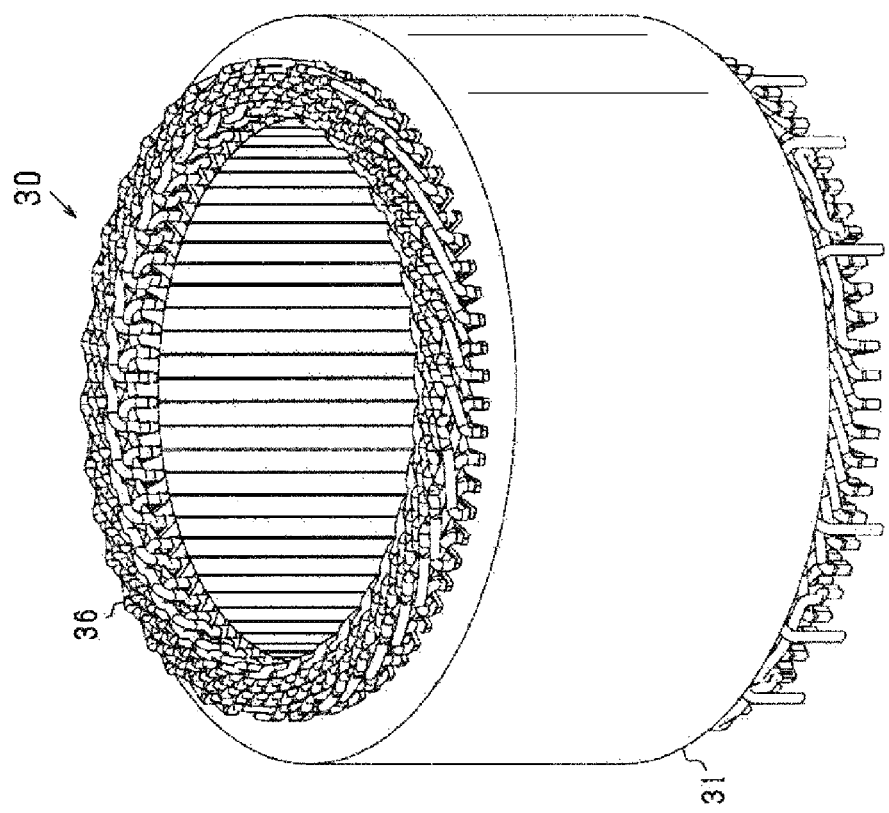
FIGS. 34A and 34B are perspective views of a configuration of a stator according to a third embodiment.
Figure 34B:
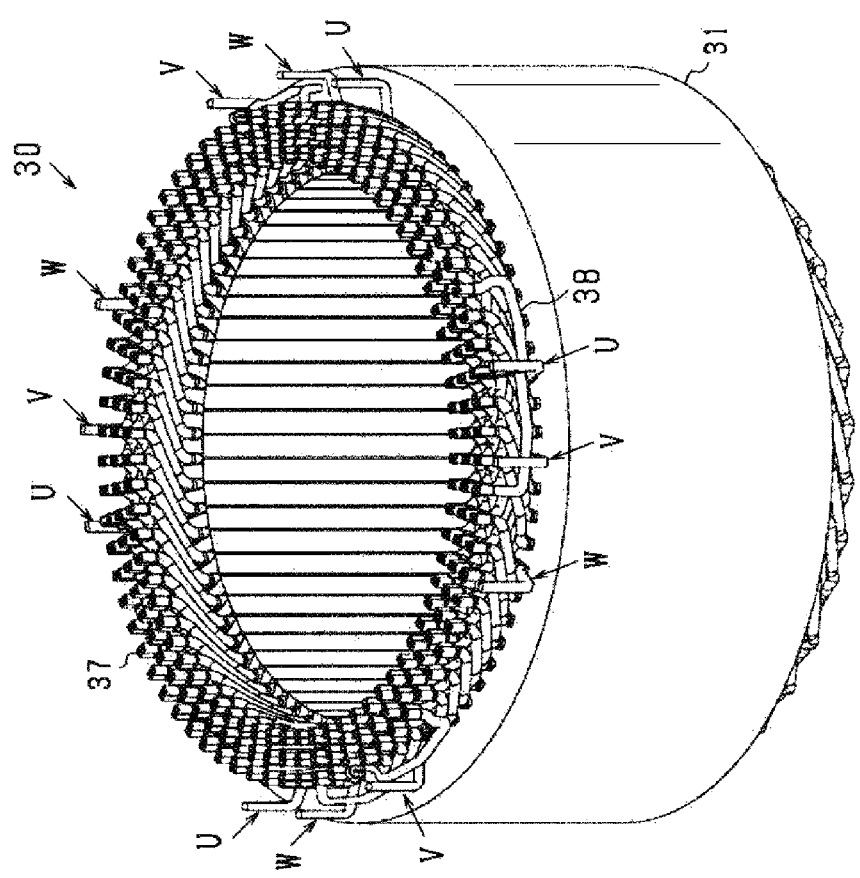

FIGS. 34A and 34B show the stator 30 that has a 72-slot structure. Of the drawings, FIG. 34A is a diagram of the stator winding 30 viewed from a joining portion side, the joining portion being a portion in which the conductor segments 50 are joined by welding or the like. FIG. 34B is a diagram of the stator 30 viewed from a turn portion 52 side of the conductor segment 50.

In the stator 30, a winding terminal on the phase terminal side of each phase is provided in one coil end portion 37 of coil end portions 36 and 37 on both ends in the axial direction. In the configuration in FIGS. 34A and 34B, each of the phase coils 32U, 32V, and 32W of each phase has a configuration of four-parallel connection. Four winding terminals are provided for a respective phase. In addition, the winding terminal on the neutral point N side of each phase is connected by a neutral line 38.

Here, the four-parallel connection of each of the phase coils 32U, 32V, and 32W are similar to that in FIG. 27. However, the four-parallel connection of each of the phase coils 32U, 32V, and 32W differs in that, in the present configuration, six unit coils are connected in series for a respective of the series-connection coil groups. That is, for example, the U-phase coil 32U has the first to fourth series-connection coil groups G1 to G4 that are connected to be in four-parallel connection. The first series-connection coil group G1 is made of six unit coils U11 to U16. The second series-connection coil group G2 is made of six unit coils U21 to U26. The third series-connection coil group G3 is made of six unit coils U31 to U36. The fourth series-connection coil group G4 is made of six unit coils U41 to U46.

Figure 35:
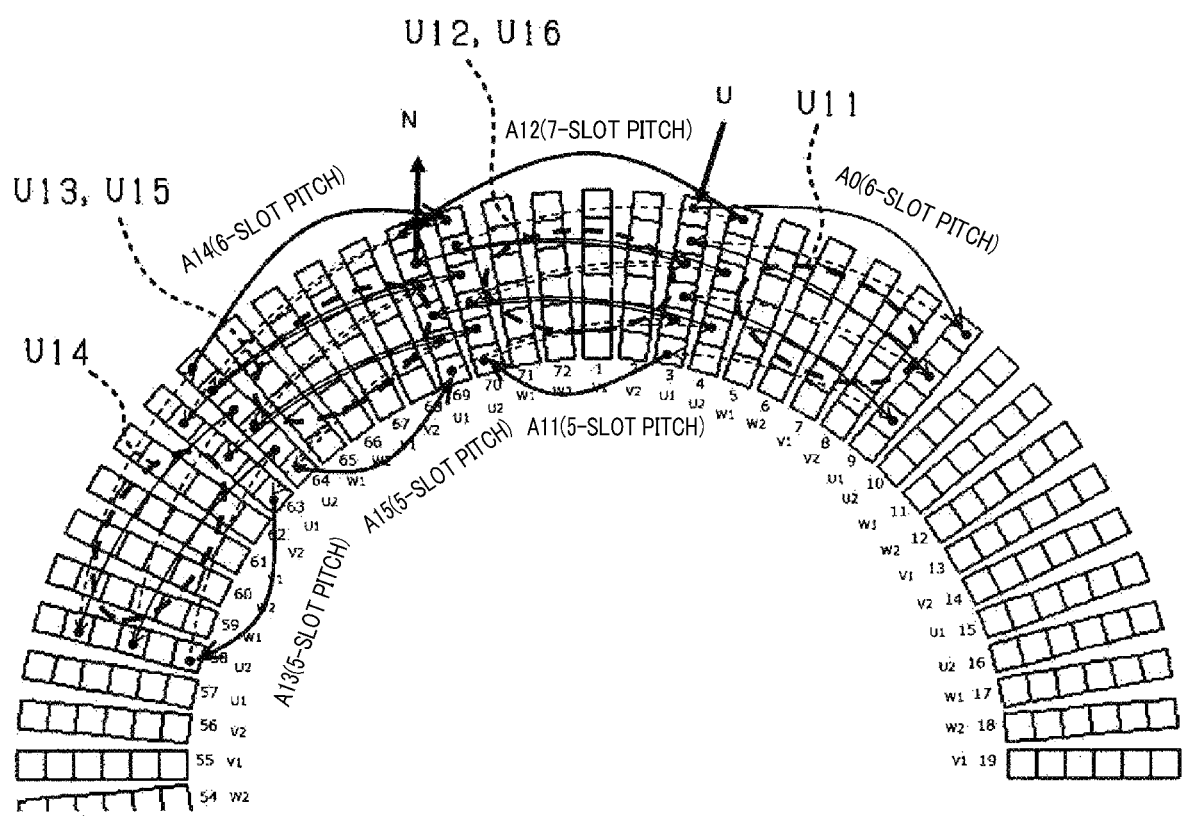
FIG. 35 is a diagram of an order of connection of a plurality of unit coils in a stator core.

FIG. 35 is a diagram of an order of connection of a plurality of unit coils in the stator core 31, from a planar view. FIG. 35 shows only the first series-connection coil group G1 (unit coils U11 to U16) of the U-phase coil 32U. In FIG. 35, a portion of numbers 1 to 72 are given as the slot numbers. In addition, in FIG. 35, the order of connection is indicated by an arrow with the U-phase terminal as the starting point. The turn portion 52 side of the conductor segment 50 is indicated by a solid line. The joining portion side of the conductor segment 50 is indicated by a broken line.

In the configuration in FIG. 35, in the first series-connection coil group G1, the unit coils U11 to U14 are arranged to be wound in the counter-clockwise direction. In addition, the remaining two unit coils U15 and U16 are arranged to be wound in the clockwise direction.

The unit coils U11 to U16 are connected by the crossover portions A11 to A15. The configuration of the crossover portions A11 to A15 is as follows. That is, when viewed with the U-phase terminal as the starting point, the crossover direction of the crossover portions A11 to A13 is the counter-clockwise direction. The crossover direction of the crossover portions A14 and A15 is the clockwise direction. In this case, the crossover portion A14 is a reverse crossover portion in which the crossover direction is reversed in relation to that of the preceding crossover portion A13. Although not shown, this configuration similarly applies to the other series-connection coil groups G2 to G4.

The slot pitches of the unit coils U11 to U16 are all a six-slot pitch that is a slot pitch that amounts to a single magnetic pole. In addition, among the crossover portions A11 to A15, the crossover portions A11, A13, and A15 that are arranged on the inner side in the radial direction have a five-slot pitch. The crossover portions A14 and A16 on the outer side in the radial direction have a seven-slot pitch.

In addition, in the configuration in FIG. 35, in the first series-connection coil group G1, when a k-th unit coil in the order of connection from the U-phase terminal and a k-th unit coil in the order of connection from the neutral point N are considered to be symmetrical coils, the configuration is such that at least respective first ends in the circumferential direction of the symmetrical coils from the U-phase terminal T1 to the neutral point N are housed in slots of the same phase within the same magnetic pole. Specifically, for example, the unit coil U11 and the unit coil U16 are housed in the same 3rd slot. The unit coil U12 and the unit coil U15 are housed in the same 70th slot. The unit coil U13 and the unit coil U14 are housed in adjacent 63rd and 64th slots.

In the rotating electric machine 10, a winding structure that is similar to that in FIG. 35 may be used for the V-phase coil 32V and the W-phase coil 32W, other than the U-phase coil 32U, as well.

In FIG. 35, the crossover portions A11, A13, and A15 are provided at the five-slot pitch on the innermost side in the radial direction. The crossover portions A12 and A14 are provided at the seven-slot pitch on the outermost side in the radial direction. However, the configuration of the crossover portions A11 to A15 (the slot pitches of the crossover portions) may be that in which the slot pitch on the inner side in the radial direction and the slot pitch on the outer side in the radial direction are reversed from that described above. Here, in FIG. 35, the conductor segment 50 of the unit coil U11 that is connected to the U-phase terminal T1 is denoted by A0.

Figure 36A:
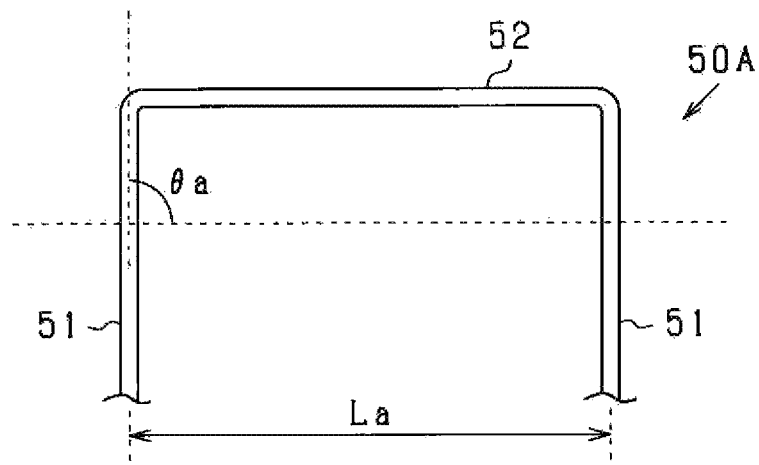
FIGS. 36A to 36C are diagrams of an overall configuration of a conductor segment.
Figure 36B:
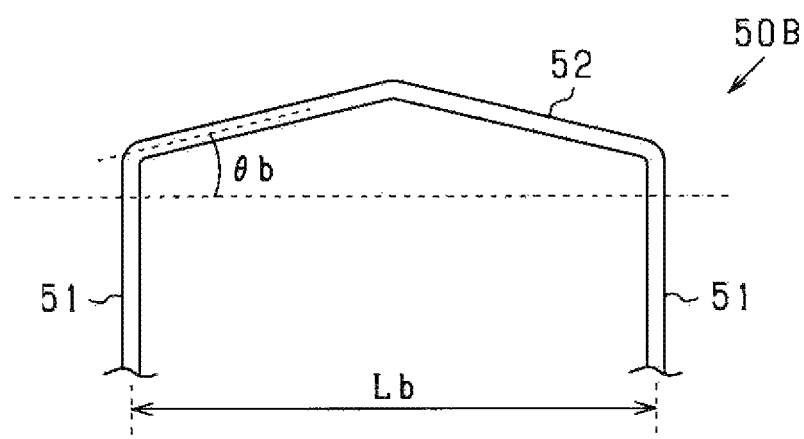
Figure 36C:
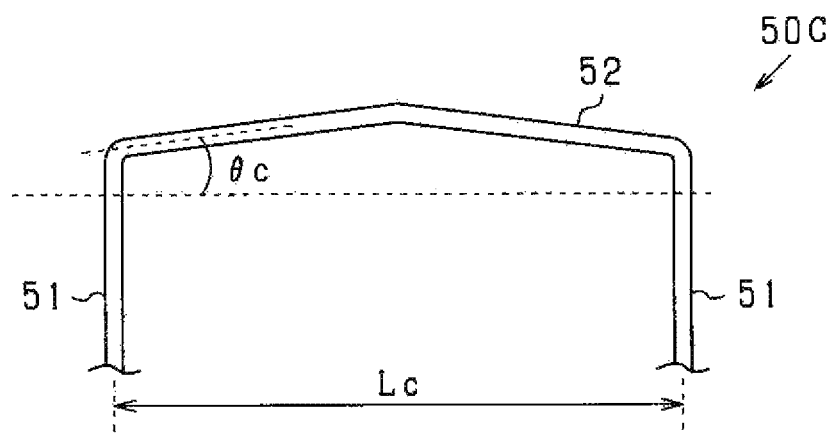

According to the present embodiment, the crossover portions that have differing slot pitches are obtained by width dimensions in the circumferential direction of the turn portions 52 of the conductor segments 50 being made to differ. FIGS. 36A to 36C show an overall configuration of the conductor segment 50. Of the drawings, FIG. 36A shows a conductor segment 50A for the five-slot pitch. FIG. 36B shows the conductor segment 50B for the six-slot pitch. FIG. 36C shows the conductor segment 50C for the seven-slot pitch.

In each of the conductor segments 50A to 50C shown in FIGS. 36A to 36C, a conductor length of the turn portion 52 is the same. However, as a result of a shape of the turn portion 52 being made to differ, width dimensions La, Lb, and Lc in the circumferential direction (that is, a lateral direction in FIGS. 36A to 36C) differ. Specifically, a rise angle of the turn portion 52 in relation to a direction that is orthogonal to the axial direction (that is, a rise angle in relation to an end surface of the stator core 31 in the axial direction) differs among the conductor segments 50A to 50C. The respective rise angles are θa>θb>θc. As a result, the conductor segments 50A to 50C of which the width dimensions La, Lb, and Lc in the circumferential direction differ, while the conductor lengths of the turn portions 52 are the same, are formed. In this case, the coil end height can be reduced.

In the configuration shown in FIG. 35, the conductor segment 50A for the five-slot pitch is used for the crossover portions A11, A13, and A15 on the innermost side in the radial direction. In addition, the conductor segments 50B and 50C for the six- and seven-slot pitches are used for the crossover portions A12 and A14 on the outermost side in the radial direction.

Figure 37A:
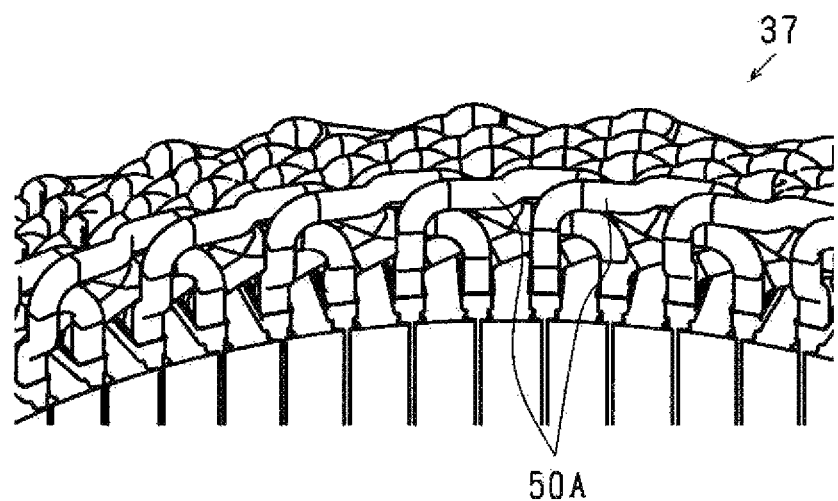
FIGS. 37A and 37B are enlarged perspective views of a configuration of a coil end portion of a stator.
Figure 37B:
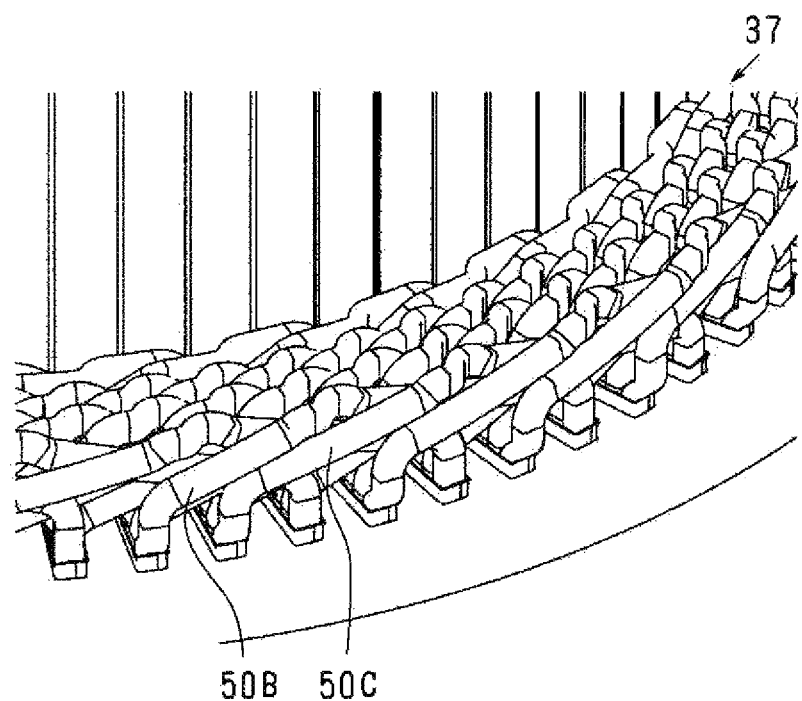

FIGS. 37A and 37B are enlarged perspective views of a configuration of the coil end portion 37 (turn portion 52 side). Of the drawings, FIG. 37A is a diagram of the coil end portion 37 viewed from the inner side in the radial direction. FIG. 37B is a diagram of the coil end portion 37 viewed from the outer side in the radial direction. As shown in FIG. 37A and FIG. 37B, each conductor segment 50 is provided with a bent portion for interference prevention in the radial or axial direction. The bent portion is provided to prevent interference between the conductor segments 50.

As described above, whereas the slot pitches differ on the turn portion 52 side of the conductor segments 50 that are used as the crossover portions, the slot pitches are all the six-slot pitch on the joining portion side of the conductor segments 50. Therefore, joining work, such as welding, can be facilitated, and improvement in productivity can be implemented.

Other Embodiments

For example, the above-described embodiments may be modified in the following manner.

According to the above-described embodiments, all of the phase coils 32U, 32V, and 32W of the phases have a characteristic configuration in that at least a first end in the circumferential direction of the i-th unit coil and respective first ends in the circumferential direction of the (i−1)-th unit coil and the (i+1)-th unit coil are housed in slots of the same phase within the same magnetic pole. In addition, respective both first and second ends in the circumferential direction of the (i−1)-th unit coil and the (i+1)-th unit coil are housed in slots of the same phase within the same magnetic pole. This may be modified such that at least one phase coil has the above-described characteristic configuration. In addition, at least one of the plurality of series-connection coil groups included in each of the phase coils 32U, 32V, and 32W may have the above-described characteristic configuration.

The number of slots for a respective phase for a respective magnetic pole in the stator 31 may be equal to or greater than two and, for example, may be four.

The rotating electric machine 10 may be an outer-rotor-structure rotating electric machine. In addition, application of the rotating electric machine 10 may be other than a traveling motor for a vehicle. The rotating electric machine 10 may be a rotating electric machine that is widely used in moving bodies, or a rotating electric machine that is used in industrial or household electrical equipment.

What is claimed is:

1. A rotating electric machine comprising:
a stator that includes a stator core that has a plurality of slots that are arranged in a circumferential direction and a stator winding that has a plurality of phase coils that are wound in the slots; and
a rotor that is arranged so as to oppose the stator in a radial direction and has a plurality of magnetic poles in the circumferential direction, wherein
each of the phase coils has a plurality of series-connection coil groups that each comprises n unit coils that are arranged to be wound in the circumferential direction,
in each of the series-connection coil groups, a first end thereof is connected to a phase terminal for a respective phase and a second end is connected to a neutral point, and the series-connection coil groups are connected in parallel, and
in at least any of the phase coils, at least a first end in the circumferential direction of an i-th unit coil, i being a natural number that is any of 1 to n, in an order of connection from the phase terminal and respective first ends in the circumferential direction of an (α+1)-th unit coil, α being a remainder of i divided by n, and a (β+1)-th unit coil, β being a remainder of i−2 divided by n, are housed in slots of a same phase within a same magnetic pole, and respective both first and second ends in the circumferential direction of the (α+1)-th unit coil and the (β+1)-th unit coil are housed in slots of the same phase within the same magnetic pole.

2. The rotating electric machine according to claim 1, wherein:
the series-connection coil group includes the unit coil that is wound on a first side in the circumferential direction from the phase terminal to the neutral point and the unit coil that is wound on a second side in the circumferential direction, and the i-th unit coil is arranged in a foldback position in the winding direction.

3. The rotating electric machine according to claim 2, wherein:
each of the series-connection coil groups is provided in a circumferential-direction region that is less than a single revolution around the stator core, and the series-connection coil groups that differ from each other are arranged so as to be arrayed in the circumferential direction.

4. The rotating electric machine according to claim 3, wherein:
at least respective first ends in the circumferential direction of the i-th unit coil in one series-connection coil group of two series-connection coil groups that are included in the phase coil of a same phase and a j-th unit coil in the other series-connection coil group are housed in slots of the same phase within the same magnetic pole, and i≠j.

5. The rotating electric machine according to claim 4, wherein:
in the i-th unit coil, n/4<i≤3n/4 is established, and
in the j-th unit coil, at least one of j≤n/4 and j>3n/4 is established.

6. The rotating electric machine according to claim 5, wherein:
in at least any of the phase coils, when a k-th unit coil in the order of connection from the phase terminal and a k-th unit coil in the order of connection from the neutral point are considered to be symmetrical coils, at least respective first ends in the circumferential direction of the symmetrical coils that are present from the phase terminal to the neutral point are housed in slots of the same phase within the same magnetic pole.

7. The rotating electric machine according to claim 6, wherein:
in the series-connection coil group of at least any of the phases,
in n/2 unit coils from the phase terminal to an intermediate point, when an m-th unit coil in the order of connection from the phase terminal and an m-th unit coil in the order of connection from the intermediate point are first symmetrical coils, at least respective first ends of the first symmetrical coils that are present from the phase terminal to the intermediate point are housed in slots of the same phase within the same magnetic pole, and
in n/2 unit coils from the neutral point to an intermediate point, when an m-th unit coil in the order of connection from the neutral point and an m-th unit coil in the order of connection from the intermediate point are second symmetrical coils, at least respective first ends of the second symmetrical coils that are present from the phase terminal to the intermediate point are housed in slots of the same phase within the same magnetic pole.

8. A rotating electric machine comprising:
a stator that includes a stator core that has a plurality of slots that are arranged in a circumferential direction and a stator winding that has a plurality of phase coils that are wound in the slots; and
a rotor that is arranged so as to oppose the stator in a radial direction and has a plurality of magnetic poles in the circumferential direction, wherein
each of the phase coils has a plurality of series-connection coil groups that each comprises n unit coils that are arranged to be wound in the circumferential direction,
in each of the series-connection coil groups, a first end thereof is connected to a phase terminal for a respective phase and a second end is connected to a neutral point, and the series-connection coil groups are connected in parallel, and
in at least any of the phase coils, when a k-th unit coil in the order of connection from the phase terminal and a k-th unit coil in the order of connection from the neutral point are considered to be symmetrical coils, at least respective first ends in the circumferential direction of the symmetrical coils that are present from the phase terminal to the neutral point are housed in slots of the same phase within the same magnetic pole.

9. The rotating electric machine according to claim 8, wherein:
the series-connection coil group includes the unit coil that is wound on a first side in the circumferential direction from the phase terminal to the neutral point and the unit coil that is wound on a second side in the circumferential direction, each of the series-connection coil groups is provided in a circumferential-direction region that is less than a single revolution around the stator core, and the series-connection coil groups that differ from each other are arranged so as to be arrayed in the circumferential direction.

10. The rotating electric machine according to claim 9, wherein:
in the series-connection coil group of at least any of the phases,
in n/2 unit coils from the phase terminal to an intermediate point, when an m-th unit coil in the order of connection from the phase terminal and an m-th unit coil in the order of connection from the intermediate point are first symmetrical coils, at least respective first ends of the first symmetrical coils that are present from the phase terminal to the intermediate point are housed in slots of the same phase within the same magnetic pole, and
in n/2 unit coils from the neutral point to an intermediate point, when an m-th unit coil in the order of connection from the neutral point and an m-th unit coil in the order of connection from the intermediate point are second symmetrical coils, at least respective first ends of the second symmetrical coils that are present from the phase terminal to the intermediate point are housed in slots of the same phase within the same magnetic pole.

11. The rotating electric machine according to claim 10, wherein:
a number of slots for a respective phase for a respective magnetic pole in the stator core is 2x (x being a natural number);
the phase coil has a crossover portion that connects unit coils to each other in the series-connection coil group;
the unit coils are provided such that conducting wires that are wound by lap winding are arrayed in a plurality of layers in the radial direction inside the slots, and a slot pitch that is an interval in the circumferential direction at which the unit coils are housed in the slots is a y-slot pitch that is a slot pitch that amounts to a single magnetic pole; and
the crossover portions are provided at at least any of the y-slot pitch, a (y−1)-slot pitch, and a (y+1)-slot pitch.

12. The rotating electric machine according to claim 1, wherein:
each of the series-connection coil groups is provided in a circumferential-direction region that is less than a single revolution around the stator core, and the series-connection coil groups that differ from each other are arranged so as to be arrayed in the circumferential direction.

13. The rotating electric machine according to claim 1, wherein:
at least respective first ends in the circumferential direction of the i-th unit coil in one series-connection coil group of two series-connection coil groups that are included in the phase coil of a same phase and a j-th unit coil in the other series-connection coil group are housed in slots of the same phase within the same magnetic pole, and i≠j.

14. The rotating electric machine according to claim 1, wherein:
in at least any of the phase coils, when a k-th unit coil in the order of connection from the phase terminal and a k-th unit coil in the order of connection from the neutral point are considered to be symmetrical coils, at least respective first ends in the circumferential direction of the symmetrical coils that are present from the phase terminal to the neutral point are housed in slots of the same phase within the same magnetic pole.

15. The rotating electric machine according to claim 8, wherein:
in the series-connection coil group of at least any of the phases,
in n/2 unit coils from the phase terminal to an intermediate point, when an m-th unit coil in the order of connection from the phase terminal and an m-th unit coil in the order of connection from the intermediate point are first symmetrical coils, at least respective first ends of the first symmetrical coils that are present from the phase terminal to the intermediate point are housed in slots of the same phase within the same magnetic pole, and
in n/2 unit coils from the neutral point to an intermediate point, when an m-th unit coil in the order of connection from the neutral point and an m-th unit coil in the order of connection from the intermediate point are second symmetrical coils, at least respective first ends of the second symmetrical coils that are present from the phase terminal to the intermediate point are housed in slots of the same phase within the same magnetic pole.

16. The rotating electric machine according to claim 1, wherein:
a number of slots for a respective phase for a respective magnetic pole in the stator core is 2x, x being a natural number;
the phase coil has a crossover portion that connects unit coils to each other in the series-connection coil group;
the unit coils are provided such that conducting wires that are wound by lap winding are arrayed in a plurality of layers in the radial direction inside the slots, and a slot pitch that is an interval in the circumferential direction at which the unit coils are housed in the slots is a y-slot pitch that is a slot pitch that amounts to a single magnetic pole; and
the crossover portions are provided at at least any of the y-slot pitch, a (y−1)-slot pitch, and a (y+1)-slot pitch.

17. The rotating electric machine according to claim 8, wherein:
a number of slots for a respective phase for a respective magnetic pole in the stator core is 2x (x being a natural number);
the phase coil has a crossover portion that connects unit coils to each other in the series-connection coil group;
the unit coils are provided such that conducting wires that are wound by lap winding are arrayed in a plurality of layers in the radial direction inside the slots, and a slot pitch that is an interval in the circumferential direction at which the unit coils are housed in the slots is a y-slot pitch that is a slot pitch that amounts to a single magnetic pole; and
the crossover portions are provided at at least any of the y-slot pitch, a (y−1)-slot pitch, and a (y+1)-slot pitch.

* * * * *